(12) United States Patent
Choi

(10) Patent No.: US 7,333,941 B1
(45) Date of Patent: Feb. 19, 2008

(54) SYSTEM AND METHOD FOR OPTIMIZING REVENUE AND/OR BOOKINGS FROM COLLECTED DEMAND DATA IN A BUYER DRIVEN COMMERCE SYSTEM

(75) Inventor: Sunmee Choi, Dryden, NY (US)

(73) Assignee: priceline.com Incorporated, Norwalk, CT (US)

( * ) Notice: Subject to any disclaimer, the term of this patent is extended or adjusted under 35 U.S.C. 154(b) by 1299 days.

(21) Appl. No.: 09/944,293

(22) Filed: Aug. 31, 2001

Related U.S. Application Data

(60) Provisional application No. 60/231,456, filed on Sep. 8, 2000, provisional application No. 60/231,145, filed on Sep. 8, 2000.

(51) Int. Cl.
*G06Q 10/00* (2006.01)
(52) U.S. Cl. .............. 705/5; 705/1; 705/6; 705/10; 705/26; 705/37
(58) Field of Classification Search .......... 705/1, 705/5–6, 10
See application file for complete search history.

(56) References Cited

U.S. PATENT DOCUMENTS

| | | | | |
|---|---|---|---|---|
| 5,255,184 | A * | 10/1993 | Hornick et al. | 705/6 |
| 5,794,207 | A * | 8/1998 | Walker et al. | 705/1 |
| 6,134,534 | A * | 10/2000 | Walker et al. | 705/37 |
| 6,826,543 | B1 * | 11/2004 | Harford et al. | 705/37 |
| 6,839,682 | B1 * | 1/2005 | Blume et al. | 705/26 |
| 6,873,969 | B2 * | 3/2005 | Stone et al. | 705/26 |
| 6,993,503 | B1 * | 1/2006 | Heissenbuttel et al. | 705/37 |

FOREIGN PATENT DOCUMENTS

WO  WO 01/59649  * 8/2001

OTHER PUBLICATIONS

Anonymous; Fare Play; Oct. 18, 1998; The Sunday Times (United Kingdom); Dialog copy, pp. 1-6.*

* cited by examiner

*Primary Examiner*—John W. Hayes
*Assistant Examiner*—Daniel P Vetter
(74) *Attorney, Agent, or Firm*—Walter G. Hanchuk; Chadbourne & Parke LLP

(57) ABSTRACT

Methods for optimizing hotel revenues for a predetermined sale margin, optimizing room nights for a predetermined amount of margin, optimizing margin amounts for a predetermined amount of room nights, and reports based on the same are disclosed. Demand data is collected from conditional purchase offers submitted to the buyer-driven commerce system by potential buyers. Those conditional purchase offers which preferably are rejected are analyzed in order to determine parameters, which may result in increased revenues for the system operator of the buyer-driven commerce system or for participants who sell room nights through the system. Collected demand data may include an offer price, during which the buyer would like to purchase the room nights, or a promotional bump amount. Reports of expected changes in demand based upon the simulated changes to the business parameters are generated and presented to hotel operators, who may change acceptance parameters based on the reports.

74 Claims, 75 Drawing Sheets

| CUSTOMER IDENTIFIER 34 | REQUESTED DATES 36 | OFFER PRICE 38 | REQUESTED STAR RATING 40 | PARTICIPATED IN PROMOTION 42 | RESUBMITTED 44 |
|---|---|---|---|---|---|
| JOHN WHITE | 9/7/2000 | $60.00 | >3 | YES | NO |
| MARY BLUE | 9/8/2000 - 9/10/2000 | $210.00 | >1 | YES | NO |
| JOSEPH RED | 10/2/2000 - 10/10/2000 | $350.00 | 5 | NO | YES |

FIG. 3

| SELLER IDENTIFIER 48 | STAR RATING 50 | GEOGRAPHIC LOCATION 52 | MINIMUM ACCEPTABLE PRICE 54 | MARGIN REQUIRED 56 | SUBSIDY AVAILABLE 58 |
|---|---|---|---|---|---|
| HOLIDAY INN | 3 | BOSTON, MA | $100.00/NIGHT | 6% | NO |
| DAYS INN | 2 | NEW YORK, NY | $79.99/NIGHT | 8% | NO |
| FOUR SEASONS | 5 | WASHINGTON, D.C. | $250.00/NIGHT | 10% | YES |

FIG. 4

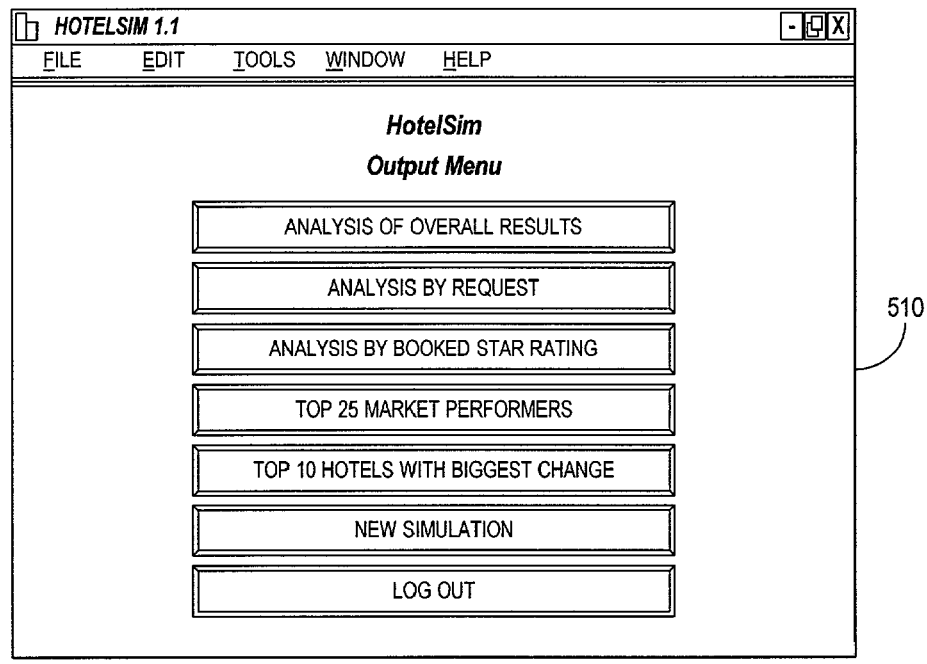
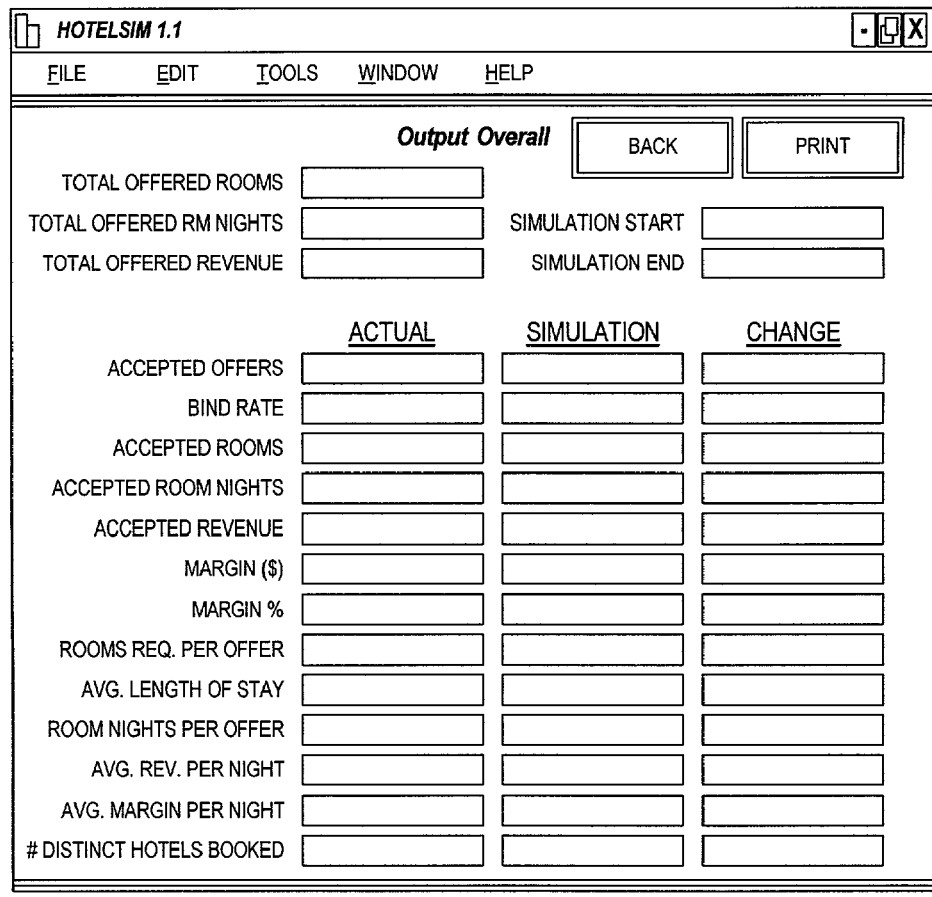
FIG. 16

HOTELSIM 1.1

FILE  EDIT  TOOLS  WINDOW  HELP

*Output Overall*  [BACK]  [PRINT]

| | | | |
|---|---|---|---|
| TOTAL OFFERED ROOMS | 4,995 | | |
| TOTAL OFFERED RM NIGHTS | 10,573 | SIMULATION START | 08/17/99 |
| TOTAL OFFERED REVENUE | $640,557.00 | SIMULATION END | 08/17/99 |

| | ACTUAL | SIMULATION | CHANGE |
|---|---|---|---|
| ACCEPTED OFFERS | 1,112 | 1,168 | 66 |
| BIND RATE | 25.24% | 26.74% | 1.50% |
| ACCEPTED ROOMS | 1,215 | 1,293 | 78 |
| ACCEPTED ROOM NIGHTS | 2,327 | 2,499 | 172 |
| ACCEPTED REVENUE | $163,060.00 | $170,662.79 | $7,602.79 |
| MARGIN ($) | $3,189.12 | $2,361.33 | ($827.79) |
| MARGIN % | 1.96% | 1.39% | -.57% |
| ROOMS REQ. PER OFFER | 1.09 | 1.10 | 0.01 |
| AVG. LENGTH OF STAY | 1.92 | 1.94 | 0.02 |
| ROOM NIGHTS PER OFFER | 2.09 | 2.12 | 0.03 |
| AVG. REV. PER NIGHT | $70.07 | $68.29 | ($1.78) |
| AVG. MARGIN PER NIGHT | $1.37 | $0.94 | ($0.45) |
| # DISTINCT HOTELS BOOKED | 475 | 499 | 24 |

FIG. 17

Output by Top 25 City Performers

| RANK | CITY | OFFERS | ACCEPTED OFFERS | | | | | | RM. NIGHTS | | | MARGIN | | |
|---|---|---|---|---|---|---|---|---|---|---|---|---|---|---|
| | | | ACT | BIND | SIM | BIND | CHG | BIND | ACT | SIM | CHG | ACT | SIM | CHG |
| 1 | NEW YORK CITY | | | | | | | | | | | | | |
| 2 | CHICAGO | | | | | | | | | | | | | |
| 3 | SAN FRANCISCO | | | | | | | | | | | | | |
| 4 | ORLANDO | | | | | | | | | | | | | |
| 5 | LAS VEGAS | | | | | | | | | | | | | |
| 6 | WASHINGTON DC | | | | | | | | | | | | | |
| 7 | LOS ANGELES | | | | | | | | | | | | | |
| 8 | ATLANTA | | | | | | | | | | | | | |
| 9 | SAN DIEGO | | | | | | | | | | | | | |
| 10 | SEATTLE | | | | | | | | | | | | | |
| 11 | PHOENIX | | | | | | | | | | | | | |
| 12 | ST. LOUIS | | | | | | | | | | | | | |
| 13 | DENVER | | | | | | | | | | | | | |
| 14 | NEW ORLEANS | | | | | | | | | | | | | |
| 15 | HOUSTON | | | | | | | | | | | | | |
| 16 | MEMPHIS | | | | | | | | | | | | | |
| 17 | NASHVILLE | | | | | | | | | | | | | |
| 18 | CINCINNATI | | | | | | | | | | | | | |
| 19 | DETROIT | | | | | | | | | | | | | |
| 20 | CLEVELAND | | | | | | | | | | | | | |
| 21 | BOSTON | | | | | | | | | | | | | |
| 22 | MINN. ST. PAUL | | | | | | | | | | | | | |
| 23 | MIAMI | | | | | | | | | | | | | |
| 24 | PORTLAND, OR | | | | | | | | | | | | | |
| 25 | KANSAS CITY, MO | | | | | | | | | | | | | |

FIG. 18 (CONT.)

| | | | | |
|---|---|---|---|---|
| SIMULATION PERIOD | 08/16/1999 | TO | 08/16/1999 | |
| TOTAL OFFERS | 3,939 | | | |
| TOTAL OFFERED ROOMS | 4,445 | | | |
| TOTAL OFFERED ROOM NIGHTS | 9,065 | | | |
| TOTAL OFFERED REVENUE | $571,340.00 | | | |

580

INPUT...

...ACTUAL PARAMETER VALUES

| STAR RATING | MARGIN AMOUNT | MARGIN % | SUBSIDY AMT. | SUBSIDY % | SUBSIDY CAP |
|---|---|---|---|---|---|
| 1 | | 20% | | 47.00% | $300.00 |
| 2 | | 17% | | 51.00% | |
| 3 | | 15% | | 49.00% | |
| 4 | | 15% | | 40.00% | |
| 5 | | 15% | | 35.00% | |

| | |
|---|---|
| CURRENT MARGIN MEASURE TYPE | % |
| CURRENT SUBSIDY MEASURE TYPE | % |

590

...SIMULATION PARAMETER VALUES

| STAR RATING | MARGIN AMOUNT | MARGIN % | SUBSIDY AMT. | SUBSIDY % | SUBSIDY CAP |
|---|---|---|---|---|---|
| 1 | | 20% | | 47.00% | $300.00 |
| 2 | | 17% | | 51.00% | |
| 3 | | 15% | | 49.00% | |
| 4 | | 15% | | 40.00% | |
| 5 | | 15% | | 35.00% | |

| | |
|---|---|
| CURRENT MARGIN MEASURE TYPE | % |
| CURRENT SUBSIDY MEASURE TYPE | % |

OUTPUT...

| | ACTUAL | SIMULATED | CHANGE |
|---|---|---|---|
| ACCEPTED OFFERS | 1,032 | 1,101 | 69 |
| BIND RATE | 26.20% | 27.95% | 1.75% |
| ACCEPTED ROOMS | 1,170 | 1,263 | 93 |
| ACCEPTED ROOM NIGHTS | 2,211 | 2,442 | 231 |
| ACCEPTED REVENUE | $151,357.00 | $159,563.65 | $8,206.65 |
| MARGIN $ (CONTRIBUTION) | $3,019.72 | $2,069.07 | ($950.65) |
| MARGIN % | 2.0% | 1.3% | -0.7% |
| ROOMS REQUESTED PER OFFER | 1.13 | 1.15 | 0.02 |
| AVG. LENGTH OF STAY PER ROOM | 1.89 | 1.93 | 0.04 |
| ROOM NIGHTS PER OFFER SOLD | 2.14 | 2.22 | 0.08 |
| AVG. REVENUE / NIGHT | $68.46 | $65.34 | ($3.12) |
| AVG. MARGIN / NIGHT | $1.37 | $0.85 | ($0.52) |
| # OF DISTINCT HOTELS BOOKED AT | 467 | 491 | 24 |

DISTRIBUTION OF ACCEPTED OFFERS

| STAR | ACTUAL | SIMULATION | CHANGE |
|---|---|---|---|
| 1 | 18 | 19 | 1 |
| 2 | 267 | 286 | 19 |
| 3 | 611 | 646 | 35 |
| 4 | 206 | 209 | 3 |
| 5 | 3 | 3 | 0 |

DISTRIBUTION OF ACCEPTED ROOMS

| STAR | ACTUAL | SIMULATION | CHANGE |
|---|---|---|---|
| 1 | 19 | 21 | 2 |
| 2 | 288 | 311 | 23 |
| 3 | 675 | 719 | 44 |
| 4 | 223 | 229 | 6 |
| 5 | 3 | 3 | 0 |

DISTRIBUTION OF ACCEPTED ROOM NIGHTS

| STAR | ACTUAL | SIMULATION | CHANGE |
|---|---|---|---|
| 1 | 47 | 49 | 2 |
| 2 | 528 | 582 | 54 |
| 3 | 1283 | 1392 | 109 |
| 4 | 450 | 467 | 17 |
| 5 | 5 | 5 | 0 |

DISTRIBUTION OF ACCEPTED REVENUE

| STAR | ACTUAL | SIMULATION | CHANGE |
|---|---|---|---|
| 1 | $867 | $942.2 | $76 |
| 2 | $14,584 | $16,293.23 | $1,709 |
| 3 | $41,406 | $45,589.28 | $4,184 |
| 4 | $17,856 | $19,254.85 | $1,399 |
| 5 | $332 | $332 | $0 |

DISTRIBUTION OF ACCEPTED MARGIN AMOUNT

| STAR | ACTUAL | SIMULATION | CHANGE |
|---|---|---|---|
| 1 | ($52.50) | -$69.20 | ($16.70) |
| 2 | $154.24 | -$93.23 | ($247.47) |
| 3 | $952.39 | $453.72 | ($498.67) |
| 4 | $416.10 | $426.15 | $10.05 |
| 5 | ($32.00) | -$32.00 | $0 |

| | |
|---|---|
| TOTAL OFFERS | 4,406 |
| TOTAL OFFERED ROOMS | 4,995 |
| TOTAL OFFERED RM NIGHTS | 10,373 |
| TOTAL OFFERED REVENUE | 640,537 |

FIG. 21

| BOOKED AT 1 STAR HOTELS | ACTUAL | SIMULATION | CHANGE |
|---|---|---|---|
| ACCEPTED OFFERS | 18 | 19 | 1 |
| ACCEPTED ROOMS | 19 | 21 | 2 |
| ACCEPTED ROOM NIGHTS | 47 | 49 | 2 |
| ACCEPTED REVENUE | $866.50 | $942 | $76 |
| MARGIN $ (CONTRIBUTION) | ($52.50) | ($69.20) | ($16.70) |
| MARGIN % | -6.06% | -7.34% | -1.29% |
| ROOMS REQUESTED PER OFFER | 1.06 | 1.11 | 0.05 |
| AVG. LENGTH OF STAY PER ROOM | 2.47 | 2.33 | 0.14 |
| ROOM NIGHTS PER OFFER SOLD | 2.61 | 2.58 | 0.03 |
| AVG. REVENUE / NIGHT | $18.44 | $19.23 | $0.79 |
| AVG. MARGIN / NIGHT | ($1.12) | ($1.41) | ($0.30) |

| BOOKED AT 2 STAR HOTELS | ACTUAL | SIMULATION | CHANGE |
|---|---|---|---|
| ACCEPTED OFFERS | 267 | 286 | 19 |
| ACCEPTED ROOMS | 288 | 311 | 23 |
| ACCEPTED ROOM NIGHTS | 528 | 582 | 54 |
| ACCEPTED REVENUE | $14,583.76 | $16,293 | $1,709 |
| MARGIN $ (CONTRIBUTION) | $154.24 | ($93.92) | ($247.47) |
| MARGIN % | 1.06% | -0.57% | -1.63% |
| ROOMS REQUESTED PER OFFER | 1.08 | 1.09 | 0.01 |
| AVG. LENGTH OF STAY PER ROOM | 1.83 | 1.87 | 0.04 |
| ROOM NIGHTS PER OFFER SOLD | 1.98 | 2.03 | 0.05 |
| AVG. REVENUE / NIGHT | $27.62 | $28.00 | $0.37 |
| AVG. MARGIN / NIGHT | $0.29 | ($0.16) | ($0.45) |

| BOOKED AT 3 STAR HOTELS | ACTUAL | SIMULATION | CHANGE |
|---|---|---|---|
| ACCEPTED OFFERS | 611 | 646 | 35 |
| ACCEPTED ROOMS | 675 | 719 | 44 |
| ACCEPTED ROOM NIGHTS | 1,283 | 1,392 | 109 |
| ACCEPTED REVENUE | $41,405.61 | $45,589 | $4,184 |
| MARGIN $ (CONTRIBUTION) | $952.39 | $453.72 | ($498.67) |
| MARGIN % | 2.30% | 1.00% | -1.30% |
| ROOMS REQUESTED PER OFFER | 1.10 | 1.11 | 0.01 |
| AVG. LENGTH OF STAY PER ROOM | 1.90 | 1.94 | 0.04 |
| ROOM NIGHTS PER OFFER SOLD | 2.10 | 2.15 | 0.05 |
| AVG. REVENUE / NIGHT | $32.27 | $32.75 | $0.48 |
| AVG. MARGIN / NIGHT | $0.74 | $0.33 | ($0.42) |

FIG. 21 (CONT.)

| BOOKED AT 4 STAR HOTELS | ACTUAL | SIMULATION | CHANGE |
|---|---|---|---|
| ACCEPTED OFFERS | 206 | 209 | 3 |
| ACCEPTED ROOMS | 223 | 229 | 6 |
| ACCEPTED ROOM NIGHTS | 450 | 467 | 17 |
| ACCEPTED REVENUE | $17,855.90 | $19,255 | $1,399 |
| MARGIN $ (CONTRIBUTION) | $416.10 | $426.15 | $10.05 |
| MARGIN % | 2.33% | 2.21% | -0.12% |
| ROOMS REQUESTED PER OFFER | 1.08 | 1.10 | 0.01 |
| AVG. LENGTH OF STAY PER ROOM | 2.02 | 2.04 | 0.02 |
| ROOM NIGHTS PER OFFER SOLD | 2.18 | 2.23 | 0.05 |
| AVG. REVENUE / NIGHT | $39.68 | $41.23 | $1.55 |
| AVG. MARGIN / NIGHT | $0.92 | $0.91 | ($0.01) |

| BOOKED AT 5 STAR HOTELS | ACTUAL | SIMULATION | CHANGE |
|---|---|---|---|
| ACCEPTED OFFERS | 3 | 3 | 0 |
| ACCEPTED ROOMS | 3 | 3 | 0 |
| ACCEPTED ROOM NIGHTS | 5 | 5 | 0 |
| ACCEPTED REVENUE | $332.00 | $332.00 | $0 |
| MARGIN $ (CONTRIBUTION) | ($32.00) | ($32.00) | $0 |
| MARGIN % | -9.64% | -9.64% | 0.00% |
| ROOMS REQUESTED PER OFFER | 1.00 | 1.00 | 0.00 |
| AVG. LENGTH OF STAY PER ROOM | 1.67 | 1.67 | 0.00 |
| ROOM NIGHTS PER OFFER SOLD | 1.67 | 1.67 | 0.00 |
| AVG. REVENUE / NIGHT | $66.40 | $66.40 | $0.00 |
| AVG. MARGIN / NIGHT | $6.40 | $6.40 | $0.00 |

DISTRIBUTION OF ACCEPTED OFFERS

| STAR | ACTUAL | SIMULATION | CHANGE |
|---|---|---|---|
| 1 | 116 | 112 | 4 |
| 2 | 402 | 469 | 67 |
| 3 | 423 | 413 | -10 |
| 4 | 161 | 166 | 5 |
| 5 | 3 | 3 | 0 |

DISTRIBUTION OF ACCEPTED ROOMS

| STAR | ACTUAL | SIMULATION | CHANGE |
|---|---|---|---|
| 1 | 130 | 131 | 1 |
| 2 | 436 | 510 | 74 |
| 3 | 465 | 457 | -8 |
| 4 | 174 | 182 | 8 |
| 5 | 3 | 3 | 0 |

DISTRIBUTION OF ACCEPTED ROOM NIGHTS

| STAR | ACTUAL | SIMULATION | CHANGE |
|---|---|---|---|
| 1 | 262 | 267 | 5 |
| 2 | 853 | 1009 | 156 |
| 3 | 832 | 836 | 4 |
| 4 | 361 | 378 | 17 |
| 5 | 5 | 5 | 0 |

DISTRIBUTION OF ACCEPTED REVENUE

| STAR | ACTUAL | SIMULATION | CHANGE |
|---|---|---|---|
| 1 | $6,420 | $6,360.49 | $121 |
| 2 | $23,563 | $29,129.41 | $5,586 |
| 3 | $29,837 | $30,058.53 | $221 |
| 4 | $15,092 | $16,531.90 | $1,440 |
| 5 | $332 | $332 | $0 |

DISTRIBUTION OF ACCEPTED MARGIN AMOUNT

| STAR | ACTUAL | SIMULATION | CHANGE |
|---|---|---|---|
| 1 | ($385.69) | -$371.49 | $14.20 |
| 2 | $834.13 | -$205.14 | ($1,039.27) |
| 3 | $556.69 | $849.97 | $293.28) |
| 4 | $456.10 | $444.10 | ($21.00) |
| 5 | ($32.00) | -$32.00 | $0 |

| | |
|---|---|
| TOTAL OFFERS | 4,406 |
| TOTAL OFFERED ROOMS | 4,995 |
| TOTAL OFFERED RM NIGHTS | 10,373 |
| TOTAL OFFERED REVENUE | 640,537 |

FIG. 22

| REQUESTING 1 STAR HOTELS | ACTUAL | SIMULATION | CHANGE |
|---|---|---|---|
| ACCEPTED OFFERS | 116 | 112 | -4 |
| BIND RATE | 14% | 14% | 0% |
| ACCEPTED ROOMS | 130 | 131 | 1 |
| ACCEPTED ROOM NIGHTS | 262 | 267 | 5 |
| ACCEPTED REVENUE | $6,239.69 | $6,360 | $121 |
| MARGIN $ (CONTRIBUTION) | ($385.69) | ($371.49) | $14.20 |
| MARGIN % | -6.18% | -5.84% | 0.34% |
| ROOMS REQUESTED PER OFFER | 1.12 | 1.17 | 0.05 |
| AVG. LENGTH OF STAY / ROOM | 2.02 | 2.04 | 0.02 |
| ROOM NIGHTS PER OFFER SOLD | 2.26 | 2.38 | 0.13 |
| AVG. REVENUE / NIGHT | $23.82 | $23.82 | $0.01 |
| AVG. MARGIN / NIGHT | ($1.47) | ($1.39) | $0.08 |
| AVG BOOKED STAR RATING | 2.4 | 2.3 | -0.1 |

| REQUESTING 2 STAR HOTELS | ACTUAL | SIMULATION | CHANGE |
|---|---|---|---|
| ACCEPTED OFFERS | 402 | 469 | 67 |
| BIND RATE | 23% | 27% | 4% |
| ACCEPTED ROOMS | 436 | 510 | 74 |
| ACCEPTED ROOM NIGHTS | 853 | 1009 | 156 |
| ACCEPTED REVENUE | $23,542.87 | $29,129 | $5,586 |
| MARGIN $ (CONTRIBUTION) | $834.13 | ($205.14) | ($1,039.27) |
| MARGIN % | 3.54% | -0.70% | -4.25% |
| ROOMS REQUESTED PER OFFER | 1.08 | 1.09 | 0.00 |
| AVG. LENGTH OF STAY / ROOM | 1.96 | 1.98 | 0.02 |
| ROOM NIGHTS PER OFFER SOLD | 2.12 | 2.15 | 0.03 |
| AVG. REVENUE / NIGHT | $27.60 | $28.87 | $1.27 |
| AVG. MARGIN / NIGHT | $0.98 | ($0.20) | ($1.18) |
| AVG BOOKED STAR RATING | 2.5 | 3.0 | 0.4 |

| REQUESTING 3 STAR HOTELS | ACTUAL | SIMULATION | CHANGE |
|---|---|---|---|
| ACCEPTED OFFERS | 423 | 413 | -10 |
| BIND RATE | 37% | 36% | -0.01% |
| ACCEPTED ROOMS | 465 | 457 | -8 |
| ACCEPTED ROOM NIGHTS | 832 | 836 | 17 |
| ACCEPTED REVENUE | $29,837.31 | $30,058 | $1,440 |
| MARGIN $ (CONTRIBUTION) | $556.69 | $849.97 | ($21.00) |
| MARGIN % | 1.87% | 2.83% | -0.40% |
| ROOMS REQUESTED PER OFFER | 1.10 | 1.11 | 0.02 |
| AVG. LENGTH OF STAY / ROOM | 1.79 | 1.83 | 0.00 |
| ROOM NIGHTS PER OFFER SOLD | 1.97 | 2.02 | 0.03 |
| AVG. REVENUE / NIGHT | $35.86 | $35.98 | $1.93 |
| AVG. MARGIN / NIGHT | $0.67 | $1.02 | ($0.11) |
| AVG BOOKED STAR RATING | 3.0 | 2.9 | 0.1 |

FIG. 22 (CONT.)

| REQUESTING 4 STAR HOTELS | ACTUAL | SIMULATION | CHANGE |
|---|---|---|---|
| ACCEPTED OFFERS | 161 | 166 | 5 |
| BIND RATE | 24% | 25% | 1% |
| ACCEPTED ROOMS | 174 | 182 | 8 |
| ACCEPTED ROOM NIGHTS | 361 | 378 | 17 |
| ACCEPTED REVENUE | $15,091.90 | $16,532 | $1,440 |
| MARGIN $ (CONTRIBUTION) | $465.10 | $441.10 | ($21.00) |
| MARGIN % | 3.08% | 2.69% | -0.40% |
| ROOMS REQUESTED PER OFFER | 1.08 | 1.10 | 0.02 |
| AVG. LENGTH OF STAY / ROOM | 2.07 | 2.08 | 0.00 |
| ROOM NIGHTS PER OFFER SOLD | 2.24 | 2.28 | 0.03 |
| AVG. REVENUE / NIGHT | $41.81 | $43.74 | $1.93 |
| AVG. MARGIN / NIGHT | $1.29 | $1.17 | ($0.11) |
| AVG BOOKED STAR RATING | 4.0 | 4.1 | 0.1 |

| REQUESTING 5 STAR HOTELS | ACTUAL | SIMULATION | CHANGE |
|---|---|---|---|
| ACCEPTED OFFERS | 3 | 3 | 0 |
| BIND RATE | 16% | 16% | 0% |
| ACCEPTED ROOMS | 3 | 3 | 0 |
| ACCEPTED ROOM NIGHTS | 5 | 5 | 0 |
| ACCEPTED REVENUE | $332 | $332 | $0 |
| MARGIN $ (CONTRIBUTION) | ($32.00) | ($32.00) | $0 |
| MARGIN % | -9.64% | -9.64% | 0.00% |
| ROOMS REQUESTED PER OFFER | 1.00 | 1.00 | 0.00 |
| AVG. LENGTH OF STAY / ROOM | 1.67 | 1.67 | 0.00 |
| ROOM NIGHTS PER OFFER SOLD | 1.67 | 1.67 | 0.00 |
| AVG. REVENUE / NIGHT | $66.40 | $66.40 | $0.00 |
| AVG. MARGIN / NIGHT | ($6.40) | ($6.40) | $0.00 |
| AVG BOOKED STAR RATING | 5.0 | 5.0 | 0.0 |

RESERVATION REQUESTS ACCEPTED YESTERDAY

| DAY OF WEEK | TOTAL ROOM NIGHTS | AVERAGE OVERALL LOS | TOTAL ARRIVAL ROOM NIGHTS | TOTAL ARRIVAL LOS | AVERAGE RATE | TOTAL REVENUE |
|---|---|---|---|---|---|---|
| MONDAY | 4 | 1.3 | 3 | 1 | $90 | $360 |
| TUESDAY | | | | | | |
| WEDNESDAY | | | | | | |
| THURSDAY | 1 | 3 | 1 | 3 | $119 | $119 |
| FRIDAY | 2 | 2.5 | 1 | 2 | $100 | $199 |
| SATURDAY | 2 | 2.5 | | | $100 | $199 |
| SUNDAY | 1 | 2 | 1 | 2 | $90 | $90 |
| TOTAL | 10 | 2.3 | 6 | 2 | $100 | $967 |

DETAILS

| LAST NAME | FIRST NAME | CHECK IN DOW | CHECK IN DATE | LOS | PRICELINE RATE |
|---|---|---|---|---|---|
| JOHNSON | EVE | SUNDAY | 10/03/99 | 2 | $90 |
| DUNLAP | DAN | MONDAY | 10/04/99 | 1 | $90 |
| FREDRICKS | JOHN | MONDAY | 10/04/99 | 1 | $90 |
| SMITH | MICHAEL | MONDAY | 10/04/99 | 1 | $90 |
| JONES | VICKI | FRIDAY | 11/05/99 | 2 | $80 |
| THOMAS | ROGER | THURSDAY | 11/11/99 | 3 | $119 |

RESERVATION REQUESTS DECLINED YESTERDAY

| DAY OF WEEK | TOTAL ROOM NIGHTS | AVERAGE OVERALL LOS | TOTAL ARRIVAL ROOM NIGHTS | TOTAL ARRIVAL LOS | AVERAGE RATE | TOTAL REVENUE |
|---|---|---|---|---|---|---|
| MONDAY | 8 | 5.6 | 1 | 2 | $87 | $695 |
| TUESDAY | 17 | 3.2 | 9 | 1.1 | $108 | $1,830 |
| WEDNESDAY | 39 | 3.2 | 32 | 2.5 | $132 | $5,155 |
| THURSDAY | 45 | 3.4 | 23 | 2.3 | $135 | $6,091 |
| FRIDAY | 86 | 2.7 | 48 | 1.9 | $118 | $10,171 |
| SATURDAY | 112 | 2.4 | 47 | 1.6 | $118 | $13,263 |
| SUNDAY | 26 | 4 | 10 | 2.2 | $89 | $2,307 |
| TOTAL | 333 | 3.5 | 170 | 1.9 | $112 | $39,512 |

DETAILS BY REQUESTED STAY DATE

| | 09/28/99 | 09/29/99 | 09/30/99 | 10/01/99 | 10/02/99 | 10/03/99 | 10/04/99 |
|---|---|---|---|---|---|---|---|
| | TUES. | WED. | THUR. | FRI. | SAT. | SUN. | MON. |
| TOTAL RN | - | 23 | 19 | 35 | 54 | 11 | 4 |
| AVERAGE LOS | - | 2.3 | 2.8 | 2.5 | 1.9 | 2.6 | 3.5 |
| AVERAGE RATE | - | $162 | $185 | $149 | $142 | $111 | $119 |

FIG. 34 (CONT.)

DAILY DEMAND REPORT

| DECLINED DUE TO | 09/28/99 | 09/29/99 | 09/30/99 | 10/01/99 | 10/02/99 | 10/03/99 | 10/04/99 |
|---|---|---|---|---|---|---|---|
| | TUES. | WED. | THUR. | FRI. | SAT. | SUN. | MON. |
| HIGH PRICELINE RATE | - | - | - | - | - | 6 | 4 |
| CLOSED GDS | - | 14 | 19 | 27 | 34 | 2 | - |
| NO PRICELINE RATE | - | 9 | - | 8 | 20 | 3 | - |

| | 10/05/99 | 10/06/99 | 10/07/99 | 10/08/99 | 10/09/99 | 10/10/99 | 10/11/99 |
|---|---|---|---|---|---|---|---|
| | TUES. | WED. | THUR. | FRI. | SAT. | SUN. | MON. |
| TOTAL RN | 10 | 5 | 3 | 21 | 27 | 8 | 1 |
| AVERAGE LOS | 2 | 3 | 4 | 2 | 1.9 | 2.1 | 4 |
| AVERAGE RATE | $124 | $103 | $107 | $97 | $104 | $91 | $75 |
| DECL. (HIGH PCLN RATE) | 6 | 4 | 1 | - | - | 4 | 1 |
| DECL. (CLOSED GDS) | - | 1 | 2 | 11 | 16 | 2 | - |
| DECL. (NO PCLN RATE) | - | - | - | 10 | 11 | 2 | - |

| | 10/12/99 | 10/13/99 | 10/14/99 | 10/15/99 | 10/16/99 | 10/17/99 | 10/18/99 |
|---|---|---|---|---|---|---|---|
| | TUES. | WED. | THUR. | FRI. | SAT. | SUN. | MON. |
| TOTAL RN | 4 | 3 | 6 | 10 | 13 | 1 | - |
| AVERAGE LOS | 2 | 3.7 | 3 | 2.6 | 2.1 | 5 | - |
| AVERAGE RATE | $111 | $90 | $106 | $99 | $89 | $70 | - |
| DECL. (HIGH PCLN RATE) | 2 | 2 | - | - | - | - | - |
| DECL. (CLOSED GDS) | - | - | 3 | 4 | 4 | - | - |
| DECL. (NO PCLN RATE) | - | 1 | 3 | 6 | 9 | 1 | - |

FIG. 35

|  | 10/19/99 | 10/20/99 | 10/21/99 | 10/22/99 | 10/23/99 | 10/24/99 | 10/25/99 |
|---|---|---|---|---|---|---|---|
|  | TUES. | WED. | THUR. | FRI. | SAT. | SUN. | MON. |
| TOTAL RN | - | 3 | 10 | 11 | 12 | 3 | 3 |
| AVERAGE LOS | - | 4 | 2.9 | 2.8 | 4.3 | 9 | 9 |
| AVERAGE RATE | - | $120 | $113 | $110 | $97 | $48 | $48 |
| DECL. (HIGH PCLN RATE) | - | 3 | 9 | 10 | 11 | 3 | 3 |
| DECL. (CLOSED GDS) | - | - | - | - | - | - | - |
| DECL. (NO PCLN RATE) | - | - | - | - | - | - | - |
|  | 10/26/99 | 10/27/99 | 10/28/99 | 10/29/99 | 10/30/99 | 10/31/99 | 11/01/99 |
|  | TUES. | WED. | THUR. | FRI. | SAT. | SUN. | MON. |
| TOTAL RN | 3 | 3 | 3 | 3 | 3 | 3 | - |
| AVERAGE LOS | 9 | 9 | 9 | 9 | 9 | 9 | - |
| AVERAGE RATE | $48 | $48 | $48 | $48 | $48 | $48 | - |
| DECL. (HIGH PCLN RATE) | 3 | 3 | 3 | 3 | 3 | 3 | - |
| DECL. (CLOSED GDS) | - | - | - | - | - | - | - |
| DECL. (NO PCLN RATE) | - | - | - | - | - | - | - |

FIG. 35 (CONT.)

DAILY DEMAND REPORT

| CHECK IN DATE | CHECK IN DOW | LOS | YOUR PL RATE | LOST REVENUE | OFFER PRICE | REASON | BOOKED BY OTHERS |
|---|---|---|---|---|---|---|---|
| 09/29/99 | WED. | 3 | - | $435 | $145 | NP | N |
| 09/29/99 | WED. | 1 | $315 | $125 | $125 | NP | N |
| 09/29/99 | WED. | 4 | - | $1,120 | $280 | NR | N |
| 09/29/99 | WED. | 4 | - | $1,120 | $280 | NR | N |
| 09/29/99 | WED. | 5 | - | $700 | $140 | NR | N |
| 09/29/99 | WED. | 4 | - | $1,120 | $280 | NR | N |
| 09/29/99 | WED. | 1 | $315 | $125 | $125 | NP | N |
| 09/29/99 | WED. | 1 | $315 | $135 | $135 | NP | N |
| 09/29/99 | WED. | 1 | $315 | $85 | $85 | NP | N |
| 09/29/99 | WED. | 1 | $315 | $195 | $195 | NP | N |
| 09/29/99 | WED. | 3 | - | $450 | $150 | NR | N |
| 09/29/99 | WED. | 1 | $315 | $135 | $135 | NP | N |
| 09/29/99 | WED. | 2 | - | $300 | $150 | NR | N |
| 09/29/99 | WED. | 1 | $315 | $130 | $130 | NP | N |
| 09/29/99 | WED. | 1 | - | $175 | $175 | NR | N |
| 09/29/99 | WED. | 4 | - | $1,020 | $255 | NR | N |
| 09/29/99 | WED. | 4 | - | $1,020 | $255 | NR | N |
| 09/29/99 | WED. | 4 | - | $1,020 | $255 | NR | N |
| 09/29/99 | WED. | 3 | - | $435 | $145 | NR | N |
| 09/29/99 | WED. | 1 | - | $60 | $60 | NR | N |
| 09/29/99 | WED. | 1 | $315 | $85 | $85 | NP | N |
| 09/29/99 | WED. | 1 | - | $70 | $70 | NR | N |
| 09/29/99 | WED. | 1 | $315 | $76 | $76 | NP | N |
| 09/30/99 | THURS. | 3 | - | $420 | $140 | NR | N |
| 09/30/99 | THURS. | 3 | - | $270 | $90 | NR | N |

FIG. 36

| CHECK IN DATE | CHECK IN DOW | LOS | YOUR PL RATE | LOST REVENUE | OFFER PRICE | REASON | BOOKED BY OTHERS |
|---|---|---|---|---|---|---|---|
| ○○○ | ○○○ | ○○○ | | ○○○ | ○○○ | | ○○○ |
| 09/30/99 | THURS. | 1 | - | $110 | $110 | NR | N |
| 09/30/99 | THURS. | 1 | - | $225 | $225 | NR | N |
| 09/30/99 | THURS. | 3 | - | $300 | $100 | NR | N |
| 09/30/99 | THURS. | 1 | - | $230 | $230 | NR | N |
| 09/30/99 | THURS. | 1 | - | $145 | $145 | NR | N |
| 09/30/99 | THURS. | 1 | - | $149 | $149 | NR | N |
| 10/01/99 | FRI. | 2 | - | $150 | $75 | NR | N |
| 10/01/99 | FRI. | 2 | - | $300 | $150 | NR | N |
| 10/01/99 | FRI. | 2 | - | $300 | $150 | NR | N |
| 10/01/99 | FRI. | 2 | $259 | $200 | $100 | NP | N |
| 10/01/99 | FRI. | 2 | - | $400 | $200 | NR | N |
| 10/01/99 | FRI. | 2 | - | $190 | $95 | NR | N |
| 10/01/99 | FRI. | 2 | - | $190 | $95 | NR | N |
| 10/01/99 | FRI. | 2 | - | $178 | $89 | NR | N |
| 10/01/99 | FRI. | 2 | $259 | $210 | $105 | NP | N |
| 10/01/99 | FRI. | 3 | $259 | $300 | $100 | NP | N |
| 10/01/99 | FRI. | 2 | - | $140 | $70 | NR | N |
| 10/01/99 | FRI. | 2 | - | $160 | $80 | NR | N |
| 10/01/99 | FRI. | 2 | $259 | $500 | $250 | NP | N |
| 10/01/99 | FRI. | 2 | $259 | $300 | $150 | NP | N |
| 10/01/99 | FRI. | 2 | - | $520 | $260 | NR | Y |
| 10/01/99 | FRI. | 1 | $259 | $120 | $120 | NP | N |
| 10/01/99 | FRI. | 2 | - | $200 | $100 | NR | Y |
| 10/01/99 | FRI. | 1 | - | $50 | $50 | NR | N |
| 10/01/99 | FRI. | 1 | - | $50 | $50 | NR | N |
| ○○○ | | | ○○○ | ○○○ | | ○○○ | ○○○ |

FIG. 36 (CONT.)

| CHECK IN DATE | CHECK IN DOW | LOS | YOUR PL RATE | LOST REVENUE | OFFER PRICE | REASON | BOOKED BY OTHERS |
|---|---|---|---|---|---|---|---|
| ○○○ | | ○○○ | | ○○○ | | ○○○ | ○○○ |
| 10/16/99 | SAT. | 1 | $315 | $40 | $40 | NP | N |
| 10/20/99 | WED. | 4 | $250 | $440 | $110 | HI | N |
| 10/20/99 | WED. | 4 | $250 | $580 | $145 | HI | N |
| 10/20/99 | WED. | 4 | $250 | $416 | $104 | HI | N |
| 10/21/99 | THURS. | 2 | $179 | $300 | $150 | HI | Y |
| 10/21/99 | THURS. | 2 | $179 | $200 | $100 | HI | N |
| 10/21/99 | THURS. | 3 | $179 | $375 | $125 | HI | N |
| 10/21/99 | THURS. | 2 | $179 | $160 | $80 | HI | N |
| 10/21/99 | THURS. | 3 | $179 | $345 | $115 | HI | N |
| 10/21/99 | THURS. | 3 | $179 | $375 | $125 | HI | N |
| 10/21/99 | THURS. | 2 | $179 | $150 | $75 | HI | N |
| 10/22/99 | FRI. | 2 | $179 | $160 | $80 | HI | N |
| 10/23/99 | SAT. | 1 | $179 | $160 | $160 | HI | N |
| 10/23/99 | SAT. | 9 | $250 | $450 | $50 | HI | N |
| 10/23/99 | SAT. | 1 | $179 | $60 | $60 | HI | N |
| 10/23/99 | SAT. | 9 | $250 | $360 | $40 | HI | N |
| 10/23/99 | SAT. | 9 | $250 | $495 | $55 | HI | N |
| 11/04/99 | THURS. | 3 | $80 | $150 | $50 | HI | N |
| 11/11/99 | THURS. | 3 | $119 | $450 | $150 | HI | N |
| 11/13/99 | SAT. | 1 | $119 | $100 | $100 | HI | N |
| 11/24/99 | WED. | 3 | $90 | $225 | $75 | HI | N |
| 11/24/99 | WED. | 3 | $90 | $180 | $60 | HI | N |
| 12/31/99 | FRI. | 1 | - | $100 | $100 | NR | N |
| 12/31/99 | FRI. | 1 | $338 | $140 | $140 | NP | N |

FIG. 37

WEEKLY DEMAND REPORT

| | 10/15/99 FRI. | 10/16/99 SAT. | 10/17/99 SUN. | 10/18/99 MON. | 10/19/99 TUES. | 10/20/99 WED | 10/21/99 THURS. |
|---|---|---|---|---|---|---|---|
| AVERAGE LOS | 2.7 | 2.2 | 3.7 | 4.6 | 3.6 | 4.7 | 3.4 |
| AVERAGE RATE | $116 | $113 | $105 | $75 | $88 | $114 | $107 |
| DECLINED DUE TO HIGH PL RATE | 1 | - | 3 | 4 | 3 | 1 | 4 |
| DECLINED DUE TO CLOSED GDS | 2 | 14 | - | - | - | - | 1 |
| DECLINED DUE TO NO PL RATE | 90 | 119 | 24 | 8 | 17 | 13 | 28 |
| YOUR PL RATE (R) | - | - | $80 | $175 | $175 | $175 | $175 |
| RN CAPTURED AT 90% OF R | 7 | 7 | 0 | 0 | 0 | 0 | 0 |
| RN CAPTURED AT 80% OF R | 7 | 7 | 0 | 0 | 0 | 0 | 0 |
| RN CAPTURED AT 70% OF R | 35 | 35 | 42 | 42 | 42 | 42 | 42 |
| RN CAPTURED AT 60% OF R | 56 | 56 | 119 | 119 | 119 | 119 | 119 |

1300

| | 10/22/99 FRI. | 10/23/99 SAT. | 10/24/99 SUN. | 10/25/99 MON. | 10/26/99 TUES. | 10/27/99 WED. | 10/28/99 THURS. |
|---|---|---|---|---|---|---|---|
| TOTAL RN DECLINED | 69 | 17 | 19 | 5 | 3 | 3 | 2 |
| ARRIVAL RN DECLINED | 41 | 22 | 1 | - | 2 | - | 1 |
| RN BOOKED BY OTHERS | 5 | 2 | - | - | - | - | - |
| AVERAGE LOS | 2.7 | 2.3 | 3.7 | 5 | 3.7 | 3.7 | 5 |
| AVERAGE RATE | $105 | $108 | $99 | $99 | $70 | $70 | $73 |
| DECLINED DUE TO HIGH PL RATE | 1 | 2 | 1 | 1 | 1 | 1 | 2 |
| DECLINED DUE TO CLOSED GDS | 1 | 23 | - | - | - | - | 1 |
| DECLINED DUE TO NO PL RATE | 98 | 47 | 18 | 4 | 2 | 2 | - |
| YOUR PL RATE (R) | - | - | $119 | $119 | $119 | $119 | $119 |
| RN CAPTURED AT 90% OF R | 0 | 0 | 0 | 0 | 0 | 0 | 0 |
| RN CAPTURED AT 80% OF R | 0 | 0 | 0 | 0 | 0 | 0 | 0 |
| RN CAPTURED AT 70% OF R | 42 | 42 | 28 | 28 | 28 | 28 | 28 |
| RN CAPTURED AT 60% OF R | 119 | 119 | 56 | 56 | 56 | 56 | 56 |

FIG. 38 (CONT.)

| | 10/29/99 | 10/30/99 | 10/31/99 | 11/01/99 | 11/02/99 | 11/03/99 | 11/04/99 |
|---|---|---|---|---|---|---|---|
| | FRI. | SAT. | SUN. | MON. | TUES. | WED | THURS. |
| TOTAL RN DECLINED | 4 | 6 | 2 | 2 | 5 | 5 | 3 |
| ARRIVAL RN DECLINED | 2 | 2 | - | 2 | 3 | - | - |
| RN BOOKED BY OTHERS | - | 1 | 1 | 2 | 3 | 3 | 1 |
| AVERAGE LOS | 3.5 | 3 | 2 | 3 | 3 | 3 | 3 |
| AVERAGE RATE | $70 | $73 | $78 | $85 | $95 | $95 | $102 |
| DECLINED DUE TO HIGH PL RATE | 3 | 3 | - | 2 | 5 | 5 | 3 |
| DECLINED DUE TO CLOSED GDS | - | - | - | - | - | - | 1 |
| DECLINED DUE TO NO PL RATE | 1 | 3 | 2 | - | - | - | - |
| YOUR PL RATE (R) | $119 | $119 | - | $175 | $175 | $175 | $175 |
| RN CAPTURED AT 90% OF R | 0 | 0 | 7 | 7 | 7 | 7 | 7 |
| RN CAPTURED AT 80% OF R | 0 | 0 | 14 | 14 | 14 | 14 | 14 |
| RN CAPTURED AT 70% OF R | 28 | 28 | 28 | 28 | 28 | 28 | 28 |
| RN CAPTURED AT 60% OF R | 56 | 56 | 49 | 49 | 49 | 49 | 49 |

FIG. 38 (CONT.)

WEEKLY BUSINESS TREND REPORT

| WEEK ENDING DATE | RN OFFERED | RN BOOKED | RN BOOKED BY OTHERS | SUCCESS RATE | AVERAGE OFFER PRICE | AVERAGE BOOKED PRICE | DUE TO HIGH PL RATE |
|---|---|---|---|---|---|---|---|
| 2/27/00 | 1082 | 424 | 290 | 31.19% | $69 | $88 | 653 |
| 3/05/00 | 890 | 294 | 289 | 33.03% | $72 | $90 | 434 |
| 3/12/00 | 1515 | 292 | 281 | 19.27% | $83 | $96 | 543 |
| 3/19/00 | 1418 | 289 | 477 | 20.38% | $73 | $92 | 664 |
| 3/26/00 | 1266 | 219 | 370 | 17.30% | $75 | $96 | 583 |
| 4/02/00 | 934 | 193 | 182 | 20.66% | $81 | $92 | 251 |
| 4/09/00 | 320 | 137 | 67 | 42.81% | $81 | $96 | 136 |
| 4/16/00 | 697 | 47 | 96 | 6.74% | $94 | $87 | 84 |

WEEKLY BUSINESS TREND REPORT (CONT.)

| DUE TO CLOSED GDS | DUE TO NO PL RATE | YOUR PL RATE (R) | RN AT 90% OF R | RN AT 80% OF R | RN AT 70% OF R | RN AT 60% OF R |
|---|---|---|---|---|---|---|
| 6 | 0 | $120 | 2 | 2 | 7 | 25 |
| 45 | 119 | $110 | 4 | 7 | 13 | 58 |
| 511 | 162 | $120 | 1 | 1 | 6 | 52 |
| 114 | 359 | $120 | 10 | 17 | 72 | 112 |
| 177 | 288 | $120 | 0 | 3 | 36 | 62 |
| 368 | 125 | $120 | 0 | 0 | 11 | 16 |
| 29 | 19 | $120 | 3 | 3 | 14 | 19 |
| 267 | 308 | $120 | 2 | 2 | 6 | 6 |

FIG. 40 (CONT.)

MONTHLY BUSINESS TREND REPORT BY REQUESTED STAY MONTH ← 1500

| MONTH | YEAR | RN OFFERED | RN BOOKED | RN BOOKED BY OTHERS | SUCCESS RATE | AVERAGE OFFER PRICE | AVERAGE BOOKED PRICE |
|---|---|---|---|---|---|---|---|
| FEB. | 1999 | 0 | 0 | 0 | 0.00% | $0 | $0 |
| MAR. | 1999 | 0 | 0 | 0 | 0.00% | $0 | $0 |
| APR. | 1999 | 0 | 0 | 0 | 0.00% | $0 | $0 |
| MAY | 1999 | 0 | 0 | 0 | 0.00% | $0 | $0 |
| JUN. | 1999 | 0 | 0 | 0 | 0.00% | $0 | $0 |
| JUL. | 1999 | 21 | 0 | 1 | 0.00% | $98 | 0 |
| AUG. | 1999 | 3246 | 21 | 914 | 0.65% | $78 | $136 |
| SEPT. | 1999 | 5683 | 151 | 942 | 2.66% | $96 | $98 |
| OCT. | 1999 | 8634 | 470 | 899 | 5.44% | $106 | $97 |
| NOV. | 1999 | 3716 | 755 | 632 | 20.32% | $88 | $83 |
| DEC. | 1999 | 2289 | 356 | 802 | 15.55% | $80 | $80 |
| JAN. | 2000 | 2115 | 452 | 568 | 25.63% | $66 | $79 |
| FEB. | 2000 | 3834 | 1402 | 990 | 36.57% | $70 | $87 |
| TYD | 2000 | 5949 | 1944 | 1558 | 31.10% | $68 | $83 |

FIG. 41

MONTHLY BUSINESS TREND REPORT BY REQUESTED STAY MONTH (CONT.)

| DUE TO HIGH PL RATE | DUE TO CLOSED GDS | DUE TO NO PL RATE | YOUR PL RATE (R) | RN AT 80% OF R | RN AT 60% OF R | RN AT 40% OF R | RN AT 20% OF R |
|---|---|---|---|---|---|---|---|
| 0 | 0 | 0 | - | 0 | 0 | 0 | 0 |
| 0 | 0 | 0 | - | 0 | 0 | 0 | 0 |
| 0 | 0 | 0 | - | 0 | 0 | 0 | 0 |
| 0 | 0 | 0 | - | 0 | 0 | 0 | 0 |
| 0 | 21 | 0 | - | 0 | 5 | 0 | 0 |
| 2064 | 1161 | 542 | $219 | 0 | 2 | 196 | 1653 |
| 1418 | 3566 | 4125 | $219 | 0 | 5 | 153 | 1078 |
| 972 | 2992 | 853 | $270 | 1 | 2 | 120 | 735 |
| 923 | 1187 | 736 | $270 | 0 | 2 | 47 | 439 |
| 932 | 274 | 171 | $219 | 0 | 2 | 49 | 600 |
| 1041 | 356 | 199 | $169 | 0 | 2 | 47 | 856 |
| 2136 | 136 | 370 | $120 | 8 | 164 | 947 | 2043 |
| 3177 | 492 | 370 | $145 | 8 | 166 | 994 | 2899 |

FIG. 41 (CONT.)

PAST MONTH BUSINESS PERFORMANCE REVIEW

| SUMMARY | YOU ACCEPTED | YOU DECLINED | YOU DECLINED, OTHER ACCEPTED |
|---|---|---|---|
| TOTAL ROOM NIGHTS | 356 | 1399 | 802 |
| PERCENTAGE | 15.55% | 84.45% | 35.04% |
| AVERAGE LOS | 2.3 | 3.2 | 2.5 |
| AVERAGE RATE | $80 | $80 | $82 |
| TOTAL REVENUE | $28,567 | $155,102 | $65,373 |

| REASONS | ROOM NIGHTS | AVERAGE RATE | REVENUE |
|---|---|---|---|
| HIGH PL RATE | 932 | $61 | $56,395 |
| CLOSED GDS | 274 | $105 | $28,839 |
| NO PL RATE | 736 | $96 | $70,802 |

FIG. 42

| REQUESTED STAY DAY OF WEEK PATTERN | MONDAY | | TUESDAY | | WEDNESDAY | |
|---|---|---|---|---|---|---|
| | ACCEPT | DECLINE | ACCEPT | DECLINE | ACCEPT | DECLINE |
| TOTAL ROOM NIGHTS | 21 | 147 | 18 | 136 | 22 | 189 |
| ARRIVAL ROOM NIGHTS | 18 | 68 | 6 | 71 | 8 | 95 |
| AVERAGE LOS | 2.3 | 4.2 | 2.9 | 4.7 | 3.6 | 4.3 |
| AVERAGE RATE | $81 | $62 | $84 | $66 | $91 | $68 |
| TOTAL REVENUE | $1,698 | $9,107 | $1,507 | $8,913 | $1,995 | $12,938 |

| | THURSDAY | | FRIDAY | | SATURDAY | |
|---|---|---|---|---|---|---|
| | ACCEPT | DECLINE | ACCEPT | DECLINE | ACCEPT | DECLINE |
| TOTAL ROOM NIGHTS | 63 | 273 | 88 | 748 | 115 | 294 |
| ARRIVAL ROOM NIGHTS | 46 | 177 | 57 | 567 | 57 | 159 |
| AVERAGE LOS | 2.4 | 3.6 | 2.3 | 2.2 | 1.9 | 2.9 |
| AVERAGE RATE | $82 | $74 | $79 | $102 | $77 | $65 |
| TOTAL REVENUE | $5,170 | $20,316 | $6,913 | $76,120 | $8,892 | $19,023 |

| | SUNDAY | |
|---|---|---|
| | ACCEPT | DECLINE |
| TOTAL ROOM NIGHTS | 29 | 146 |
| ARRIVAL ROOM NIGHTS | 9 | 64 |
| AVERAGE LOS | 2.4 | 3.6 |
| AVERAGE RATE | $82 | $74 |
| TOTAL REVENUE | $5,170 | $20,316 |

FIG. 42 (CONT.)

COMING MONTH BUSINESS PERFORMANCE PREVIEW

1700

| SUMMARY | YOU ACCEPTED | YOU DECLINED | YOU DECLINED, OTHER ACCEPTED |
|---|---|---|---|
| TOTAL ROOM NIGHTS | 542 | 1573 | 568 |
| PERCENTAGE | 25.63% | 74.37% | 26.86% |
| AVERAGE LOS | 3.4 | 3.6 | 2.1 |
| AVERAGE RATE | $79 | $62 | $66 |
| TOTAL REVENUE | $42,785 | $97,132 | $37,706 |

| REASONS | ROOM NIGHTS | AVERAGE RATE | REVENUE |
|---|---|---|---|
| HIGH PL RATE | 1,041 | $54 | $56,068 |
| CLOSED GDS | 356 | $74 | $26,446 |
| NO PL RATE | 171 | $81 | $13,783 |

FIG. 43

ON THE DAYS THAT YOUR PRICELINE RATE WAS OPEN, IF YOUR PRICELINE RATE WERE SET AT THE FOLLOWING LEVEL, YOU WOULD HAVE CAPTURED CORRESPONDING INCREMENTAL ROOM NIGHTS AND REVENUE FOR THE MONTH OF JANUARY SO FAR

| RATE GUIDE | PL RATE | ROOM NIGHTS | REVENUE |
|---|---|---|---|
| COMPETITIVE | $60 | 136 | $8,160 |
|  | $50 | 394 | $19,700 |
| AGGRESSIVE | $45 | 462 | $20,790 |

ON THE DAYS THAT YOUR HOTEL WAS NOT SOLD OUT BUT YOUR PRICELINE RATES WERE CLOSED, IF YOUR PRICELINE RATE WERE SET AT THE FOLLOWING LEVEL, YOU WOULD HAVE CAPTURED CORRESPONDING INCREMENTAL ROOM NIGHTS AND REVENUE FOR THE MONTH OF JANUARY SO FAR

| RATE GUIDE | PL RATE | ROOM NIGHTS | REVENUE |
|---|---|---|---|
| COMPETITIVE | $60 | 510 | $28,050 |
|  | $50 | 942 | $47,100 |
| AGGRESSIVE | $44 | 1,252 | $55,088 |

MONTHLY DETAILED BOOKING REVIEW

| DATE | TOTAL RN OFFERD | ARRIVAL RN OFFERED | TOTAL RN BOOKED | ARRIVAL RN BOOKED | RN BOOKED BY OTHERS |
|---|---|---|---|---|---|
| 2/1/00 | 36 | 14 | 14 | 7 | 11 |
| 2/2/00 | 51 | 32 | 18 | 8 | 14 |
| 2/3/00 | 59 | 31 | 24 | 14 | 17 |
| 2/4/00 | 104 | 76 | 47 | 35 | 39 |
| 2/5/00 | 163 | 96 | 80 | 48 | 49 |
| 2/6/00 | 57 | 25 | 28 | 13 | 14 |
| 2/7/00 | 58 | 26 | 24 | 13 | 13 |
| 2/8/00 | 97 | 57 | 30 | 17 | 22 |
| 2/9/00 | 118 | 59 | 35 | 14 | 20 |
| 2/10/00 | 144 | 75 | 57 | 32 | 21 |
| 2/11/00 | 187 | 133 | 74 | 62 | 37 |
| 2/12/00 | 332 | 201 | 124 | 81 | 63 |
| 2/13/00 | 93 | 38 | 32 | 18 | 24 |
| 2/14/00 | 95 | 53 | 33 | 24 | 28 |
| 2/15/00 | 62 | 22 | 25 | 10 | 10 |
| 2/16/00 | 66 | 26 | 24 | 5 | 13 |
| 2/17/00 | 85 | 43 | 29 | 16 | 16 |
| 2/18/00 | 254 | 219 | 70 | 61 | 67 |
| 2/19/00 | 444 | 267 | 132 | 87 | 132 |
| 2/20/00 | 229 | 71 | 76 | 32 | 70 |
| 2/21/00 | 93 | 51 | 33 | 20 | 22 |
| 2/22/00 | 83 | 46 | 31 | 21 | 25 |
| 2/23/00 | 93 | 47 | 41 | 19 | 26 |
| 2/24/00 | 129 | 81 | 55 | 39 | 34 |
| 2/25/00 | 199 | 136 | 80 | 54 | 47 |
| 2/26/00 | 256 | 115 | 108 | 51 | 66 |
| 2/27/00 | 88 | 29 | 28 | 12 | 32 |
| 2/28/00 | 81 | 35 | 27 | 10 | 28 |
| 2/29/00 | 78 | 35 | 23 | 8 | 30 |
| TOTAL | 3,834 | 2,139 | 1,402 | 831 | 990 |

MONTHLY DETAILED BOOKING REVIEW (CONT.)

| SUCCESS RATE | AVERAGE LOS | AVERAGE OFFER PRICE | AVERAGE BOOKED PRICE | DUE TO HI PL RATE | DUE TO CLOSED GDS |
|---|---|---|---|---|---|
| 38.89% | 5.4 | $63 | $81 | 21 | 0 |
| 35.29% | 4 | $59 | $77 | 33 | 0 |
| 40.68% | 4.1 | $63 | $84 | 35 | 2 |
| 45.19% | 3.1 | $67 | $85 | 57 | 2 |
| 49.08% | 2.5 | $67 | $82 | 82 | 2 |
| 49.12% | 4.6 | $73 | $88 | 22 | 4 |
| 41.38% | 4.9 | $73 | $86 | 19 | 5 |
| 30.93% | 3.8 | $83 | $83 | 16 | 22 |
| 29.66% | 3.5 | $81 | $80 | 21 | 45 |
| 39.58% | 3.2 | $76 | $87 | 55 | 21 |
| 39.57% | 2.7 | $68 | $87 | 101 | 6 |
| 37.35% | 2 | $69 | $86 | 167 | 7 |
| 34.41% | 3.6 | $66 | $84 | 55 | 2 |
| 34.74% | 3.5 | $70 | $93 | 60 | 0 |
| 40.32% | 4.5 | $70 | $93 | 36 | 0 |
| 36.36% | 4.2 | $71 | $96 | 41 | 0 |
| 34.12% | 3.7 | $71 | $94 | 55 | 1 |
| 27.56% | 2.4 | $70 | $87 | 183 | 6 |
| 29.73% | 2.1 | $73 | $90 | 310 | 5 |
| 33.19% | 2.6 | $70 | $87 | 152 | 3 |
| 35.48% | 3.3 | $66 | $86 | 60 | 0 |
| 37.35% | 3.7 | $69 | $87 | 51 | 0 |
| 44.09% | 3.4 | $71 | $89 | 51 | 0 |
| 42.64% | 3.2 | $70 | $90 | 73 | 1 |
| 40.20% | 2.9 | $68 | $87 | 118 | 1 |
| 42.19% | 2.5 | $70 | $88 | 148 | 1 |
| 31.82% | 4.1 | $65 | $87 | 55 | 0 |
| 33.33% | 4.4 | $72 | $89 | 39 | 0 |
| 29.49% | 4.4 | $76 | $86 | 20 | 0 |
| 37.37% | 3.5 | $70 | $87 | 2,136 | 136 |

MONTHLY DETAILED BOOKING REVIEW (CONT.)

| DUE TO NO PL RATE | YOUR PRICELINE RATE (R) | RN AT 90% OF R | RN AT 80% OF R | RN AT 70% OF R | RN AT 60% OF R |
|---|---|---|---|---|---|
| 1 | $70 | 0 | 1 | 9 | 16 |
| 0 | $70 | 5 | 11 | 13 | 21 |
| 0 | $75 | 0 | 11 | 12 | 16 |
| 0 | $75 | 2 | 10 | 28 | 62 |
| 1 | $75 | 0 | 5 | 6 | 39 |
| 5 | $70 | 0 | 4 | 4 | 12 |
| 12 | $70 | 0 | 0 | 0 | 9 |
| 29 | $70 | 0 | 0 | 0 | 6 |
| 18 | $70 | 1 | 5 | 5 | 7 |
| 14 | $80 | 1 | 8 | 11 | 16 |
| 12 | $80 | 3 | 11 | 26 | 47 |
| 41 | $80 | 2 | 8 | 27 | 36 |
| 6 | $95 | 5 | 10 | 27 | 31 |
| 2 | $95 | 0 | 1 | 8 | 32 |
| 1 | $95 | 0 | 0 | 5 | 11 |
| 1 | $95 | 0 | 5 | 9 | 15 |
| 1 | $95 | 1 | 5 | 25 | 29 |
| 0 | $95 | 33 | 57 | 109 | 158 |
| 0 | $120 | 1 | 2 | 27 | 47 |
| 0 | $80 | 0 | 7 | 39 | 40 |
| 0 | $120 | 0 | 0 | 0 | 0 |
| 0 | $80 | 3 | 11 | 18 | 22 |
| 0 | $80 | 3 | 6 | 33 | 37 |
| 0 | $80 | 4 | 5 | 14 | 17 |
| 0 | $80 | 12 | 24 | 54 | 65 |
| 0 | $80 | 3 | 13 | 32 | 46 |
| 5 | $80 | 1 | 1 | 2 | 5 |
| 15 | $80 | 1 | 2 | 36 | 36 |
| 35 | $80 | 0 | 0 | 1 | 4 |
| 199 | $83 | 81 | 223 | 580 | 882 |

FIG. 44 (CONT.)

MONTHLY DETAILED BOOKING PREVIEW

| DATE | TOTAL RN OFFERD | ARRIVAL RN OFFERED | TOTAL RN BOOKED | ARRIVAL RN BOOKED | RN BOOKED BY OTHERS |
|---|---|---|---|---|---|
| 3/1/00 | 70 | 34 | 18 | 5 | 26 |
| 3/2/00 | 88 | 42 | 20 | 8 | 32 |
| 3/3/00 | 201 | 151 | 75 | 64 | 57 |
| 3/4/00 | 284 | 147 | 103 | 49 | 84 |
| 3/5/00 | 113 | 36 | 21 | 9 | 30 |
| 3/6/00 | 152 | 73 | 17 | 7 | 23 |
| 3/7/00 | 206 | 104 | 16 | 6 | 22 |
| 3/8/00 | 223 | 124 | 18 | 11 | 19 |
| 3/9/00 | 190 | 80 | 31 | 22 | 24 |
| 3/10/00 | 259 | 161 | 72 | 62 | 66 |
| 3/11/00 | 372 | 186 | 117 | 64 | 97 |
| 3/12/00 | 137 | 41 | 39 | 17 | 30 |
| 3/13/00 | 132 | 72 | 26 | 12 | 32 |
| 3/14/00 | 129 | 59 | 22 | 9 | 38 |
| 3/15/00 | 122 | 55 | 23 | 11 | 36 |
| 3/16/00 | 188 | 112 | 37 | 26 | 70 |
| 3/17/00 | 337 | 227 | 87 | 63 | 115 |
| 3/18/00 | 373 | 175 | 55 | 18 | 156 |
| 3/19/00 | 124 | 51 | 22 | 13 | 47 |
| 3/20/00 | 131 | 65 | 19 | 9 | 46 |
| 3/21/00 | 140 | 57 | 12 | 5 | 48 |
| 3/22/00 | 154 | 67 | 11 | 9 | 49 |
| 3/23/00 | 146 | 75 | 19 | 14 | 42 |
| 3/24/00 | 233 | 161 | 65 | 51 | 54 |
| 3/25/00 | 338 | 157 | 71 | 25 | 84 |
| 3/26/00 | 131 | 40 | 27 | 17 | 21 |
| 3/27/00 | 132 | 58 | 11 | 7 | 18 |
| 3/28/00 | 124 | 50 | 8 | 2 | 19 |
| 3/29/00 | 114 | 40 | 10 | 5 | 26 |
| 3/30/00 | 102 | 35 | 15 | 9 | 24 |
| 3/31/00 | 159 | 80 | 53 | 42 | 36 |
| TOTAL | 5,604 | 2,815 | 1,140 | 671 | 1471 |

FIG. 45

MONTHLY DETAILED BOOKING PREVIEW (CONT.)

| SUCCESS RATE | AVERAGE LOS | AVERAGE OFFER PRICE | AVERAGE BOOKED PRICE | DUE TO HI PL RATE | DUE TO CLOSED GDS |
|---|---|---|---|---|---|
| 25.71% | 5 | $78 | $84 | 17 | 11 |
| 22.73% | 4.7 | $67 | $85 | 46 | 0 |
| 37.31% | 3.1 | $70 | $90 | 112 | 8 |
| 36.27% | 3.4 | $73 | $92 | 145 | 26 |
| 18.58% | 6.3 | $78 | $102 | 39 | 36 |
| 11.18% | 5.3 | $90 | $108 | 28 | 80 |
| 7.77% | 4.2 | $99 | $95 | 20 | 148 |
| 8.07% | 4 | $96 | $102 | 17 | 151 |
| 16.32% | 4.6 | $84 | $97 | 70 | 55 |
| 27.80% | 3.8 | $72 | $93 | 146 | 23 |
| 31.45% | 3 | $72 | $94 | 223 | 18 |
| 28.47% | 5 | $65 | $86 | 75 | 8 |
| 19.70% | 5 | $75 | $95 | 46 | 37 |
| 17.05% | 5.3 | $75 | $93 | 39 | 22 |
| 18.85% | 5.5 | $75 | $93 | 44 | 9 |
| 19.68% | 4.5 | $74 | $92 | 77 | 10 |
| 25.82% | 3.1 | $71 | $92 | 199 | 13 |
| 14.75% | 2.9 | $74 | $93 | 184 | 15 |
| 17.74% | 5 | $70 | $98 | 80 | 10 |
| 14.50% | 5.1 | $76 | $106 | 74 | 11 |
| 8.57% | 4.9 | $72 | $112 | 63 | 13 |
| 7.14% | 4.5 | $73 | $90 | 32 | 35 |
| 13.01% | 4.9 | $74 | $90 | 49 | 22 |
| 27.90% | 3.8 | $75 | $94 | 120 | 21 |
| 21.01% | 3.1 | $79 | $95 | 165 | 65 |
| 20.61% | 5.3 | $84 | $98 | 40 | 40 |
| 8.33% | 5.1 | $93 | $99 | 16 | 82 |
| 6.45% | 5.7 | $83 | $87 | 18 | 90 |
| 8.77% | 5.6 | $79 | $92 | 18 | 77 |
| 14.71% | 6 | $77 | $92 | 28 | 43 |
| 33.33% | 4.1 | $76 | $92 | 65 | 25 |
| 19.20% | 4.6 | $77 | $95 | 2,295 | 1,204 |

FIG. 45 (CONT.)

MONTHLY DETAILED BOOKING PREVIEW (CONT.)

| DUE TO NO.PL RATE | YOUR PRICELINE RATE (R) | RN AT 90% OF R | RN AT 80% OF R | RN AT 70% OF R | RN AT 60% OF R |
|---|---|---|---|---|---|
| 24 | $110 | 0 | 0 | 0 | 0 |
| 22 | $110 | 0 | 0 | 0 | 4 |
| 7 | $80 | 9 | 18 | 56 | 63 |
| 11 | $80 | 13 | 37 | 62 | 64 |
| 16 | $120 | 0 | 0 | 0 | 4 |
| 25 | $120 | 1 | 1 | 1 | 7 |
| 19 | $110 | 0 | 0 | 0 | 3 |
| 37 | $110 | 0 | 0 | 0 | 0 |
| 34 | $110 | 0 | 0 | 7 | 33 |
| 17 | $110 | 0 | 0 | 0 | 32 |
| 14 | $110 | 0 | 5 | 10 | 27 |
| 15 | $110 | 2 | 2 | 2 | 9 |
| 23 | $120 | 0 | 0 | 4 | 8 |
| 47 | $120 | 0 | 0 | 5 | 11 |
| 46 | $120 | 0 | 0 | 8 | 12 |
| 64 | $120 | 3 | 3 | 11 | 21 |
| 41 | $110 | 7 | 17 | 36 | 89 |
| 123 | $120 | 0 | 7 | 14 | 19 |
| 13 | $120 | 3 | 3 | 5 | 11 |
| 27 | $120 | 0 | 0 | 10 | 12 |
| 52 | $120 | 0 | 0 | 2 | 2 |
| 76 | $120 | 0 | 0 | 0 | 1 |
| 56 | $120 | 0 | 0 | 7 | 18 |
| 27 | $120 | 0 | 2 | 14 | 18 |
| 37 | $120 | 0 | 1 | 3 | 11 |
| 25 | $120 | 0 | 0 | 0 | 0 |
| 25 | $80 | 0 | 1 | 7 | 9 |
| 8 | $80 | 0 | 0 | 10 | 14 |
| 9 | $80 | 0 | 0 | 2 | 2 |
| 16 | $120 | 0 | 0 | 6 | 9 |
| 16 | $120 | 0 | 0 | 5 | 7 |
| 972 | $3,430 | 38 | 97 | 287 | 520 |

FIG. 45 (CONT.)

WEEKLY LOOKS AND BOOKS REPORT

1900 →

| STATE | HOTEL NAME | WEEK ENDING DATE | RN OFFERED | RN BOOKED | RN BOOKED BY OTHERS | SUCCESS RATE | AVERAGE OFFER PRICE | AVERAGE BOOKED PRICE |
|---|---|---|---|---|---|---|---|---|
| MA | BOSTON INN | 3/5/00 | 890 | 294 | 289 | 33.03% | $72 | $90 |
| MA | BOSTON INN | 3/12/00 | 1515 | 292 | 281 | 19.27% | $83 | $96 |
| MA | BOSTON INN | 3/19/00 | 1518 | 289 | 477 | 20.38% | $73 | $92 |

| DUE TO HI PL RATE | DUE TO CLOSED GDS | DUE TO NO PL RATE | YOUR PRICELINE RATE (R) | RN AT 90% OF R | RN AT 80% OF R | RN AT 70% OF R | RN AT 60% OF R |
|---|---|---|---|---|---|---|---|
| 434 | 45 | 119 | $110 | 4 | 7 | 13 | 58 |
| 543 | 511 | 162 | $120 | 1 | 1 | 6 | 52 |
| 664 | 114 | 359 | $120 | 10 | 17 | 72 | 112 |

FIG. 46

MONTHLY LOOKS AND BOOKS REPORT

| STATE | HOTEL NAME | MONTH | YEAR | RN OFFERED | RN BOOKED | RN BOOKED BY OTHERS | SUCCESS RATE | AVERAGE OFFER PRICE |
|---|---|---|---|---|---|---|---|---|
| MA | BOSTON INN | DECEMBER | 1999 | 2289 | 356 | 802 | 15.55% | $80 |
| MA | BOSTON INN | JANUARY | 2000 | 2115 | 542 | 568 | 25.63% | $66 |
| MA | BOSTON INN | FEBRUARY | 2000 | 3834 | 1402 | 990 | 36.57% | $70 |

| AVERAGE BOOKED PRICE | DUE TO HI PL RATE | DUE TO CLOSED GDS | DUE TO NO PL RATE | YOUR PRICELINE RATE (R) | RN AT 80% OF R | RN AT 60% OF R | RN AT 40% OF R | RN AT 20% OF R |
|---|---|---|---|---|---|---|---|---|
| $80 | 932 | 274 | 736 | $219 | 0 | 2 | 49 | 600 |
| $79 | 1041 | 356 | 171 | $169 | 0 | 2 | 47 | 856 |
| $87 | 2136 | 136 | 199 | $120 | 8 | 164 | 947 | 2043 |

FIG. 47

SYSTEM AND METHOD FOR OPTIMIZING REVENUE AND/OR BOOKINGS FROM COLLECTED DEMAND DATA IN A BUYER DRIVEN COMMERCE SYSTEM

CROSS-REFERENCE TO RELATED APPLICATIONS

This application claims priority under 35 U.S.C. §119 to U.S. Provisional Patent Application Ser. No. 60/231,145 entitled "SYSTEM AND METHOD FOR OPTIMIZING REVENUE AND/OR BOOKINGS FROM COLLECTED DEMAND DATA IN A BUYER-DRIVEN COMMERCE SYSTEM" filed in the name of Sunmee Choi on Sep. 8, 2000, herein incorporated by reference.

This application is further related to U.S. Provisional Patent Application Ser. No. 60/231,456 entitled "SYSTEM AND METHOD FOR MAXIMIZING ACCEPTANCE PARAMETERS FROM COLLECTED DEMAND DATA IN A BUYER-DRIVEN COMMERCE SYSTEM" filed in the name of Michael Majeed and Sunmee Choi on Sep. 8, 2000, and U.S. patent application Ser. No. 09/943,651 entitled "SYSTEM AND METHOD FOR MAXIMIZING ACCEPTANCE PARAMETERS FROM COLLECTED DEMAND DATA IN A BUYER-DRIVEN COMMERCE SYSTEM" filed in the name of Michael Majeed and Sunmee Choi on Aug. 31, 2001, the entirety of each being incorporated herein by reference.

FIELD

The present invention is directed generally to data processing for cost/price determination, and more particularly to market analysis and demand forecasting or surveying.

BACKGROUND

Most systems for processing the sale of products are seller-driven, whereby the seller prices, packages, configures and offers the product for sale, and the buyer decides whether or not to accept the seller's offer. In a buyer-driven commerce system, on the other hand, the buyer dictates the terms of the offer and one or more sellers decide whether or not to accept. A "help wanted" advertisement, for example, is a buyer-driven inquiry since an employer is looking to locate and buy the services of a qualified employee. The inquiry is advertised to a large number of potential employees, who may respond by submitting their resumes to the prospective employer.

U.S. Pat. No. 5,794,207 entitled "Method And Apparatus For A Cryptographically Assisted Commercial Network System Designed To Facilitate Buyer-Driven Conditional Purchase Offers" which is assigned to the assignee of the present invention and incorporated herein by reference, discloses a buyer-driven Conditional Purchase Offer (CPO) Management System that processes binding purchase offers received from individual consumers. The purchase offers contain one or more buyer-defined conditions for the purchase of goods or services, at a buyer-defined price. The purchase offers are typically guaranteed by a general-purpose financial account, such as a debit or credit account, and thereby provide sellers with a mechanism for enforcing any agreement that may be reached with the consumer. The purchase offers are provided by the CPO Management System to sellers, for individual sellers to either accept or reject. If a seller accepts a purchase offer, the CPO Management System binds the buyer on behalf of the accepting seller, typically by charging the general-purpose financial account designated by the buyer or providing the account information to the accepting seller for processing, to form a legally binding contract. Thus, the CPO Management System empowers individual consumers to obtain goods and services, such as travel or insurance services, at prices which are set by the consumers. The CPO Management System provides numerous commercial advantages to sellers as well For example, the CPO Management System permits individual sellers to effectively sell excess capacity when actual demand fails to meet forecasted demand. In particular, the CPO Management System provides an effective mechanism for sellers to be confident that if they accept a consumer's offer, the consumer will purchase the requested goods or services at the agreed-upon price. Yet, the consumer remains unable to use the information to ascertain the seller's underlying level of price flexibility, which, if known to a seller's competitors or customers, could dramatically impact the seller's overall revenue structure.

U.S. Pat. No. 6,085,169 entitled "Conditional Purchase Offer Management System," which issued to the assignee of the present application and is incorporated by reference in its entirety herein, discloses a conditional purchase offer (CPO) management system that permits sellers to provide proprietary rules for the acceptance of CPOs. Each of these rules establishes one or more restrictions which the seller is willing to accept for a predefined minimum price. The rules are utilized by the CPO management system to determine whether to accept, reject or counter a CPO on behalf of a particular seller. In this manner, the CPO Management System can respond to submitted CPOs in real-time on behalf of sellers, with a minimal amount of expensive, time consuming and error-prone human intervention.

For many transactions, the embodiments of the CPO Management Systems discussed above, will effectively complete transactions between buyers and sellers, with minimal intervention by the parties once the CPO has been submitted. The performance of the CPO Management System depends, at least in part, upon its utilization by a large number of both buyers and sellers. Specifically, buyers are more likely to submit purchase offers if they know the purchase offers will be reviewed by a sufficiently large number of sellers. Likewise, sellers are more likely to review offers if a sufficiently large number of offers are submitted. In addition to being a lost business opportunity, purchase offers which are not accepted represent a waste of time and effort by both buyers and sellers. Thus, buyers and sellers alike will be frustrated and discouraged from utilizing the CPO Management System if the acceptance rate for submitted purchase offers does not meet acceptable levels.

Invariably, some buyers will submit purchase offers that are not initially accepted by any seller, typically because the price offered by the buyer is too low In addition, some sellers may set their acceptance parameters too high to attract sufficient demand to fulfill all available bookings. Also, a system operator of the CPO management system may set operating parameters, such as a minimum required margin on a sale, which are incompatible with adjustments in purchaser demand. These factors, alone or in combination, may then result in an inordinate amount of purchase offers being rejected as originally posted. Thus, buyers, sellers and system operators of a buyer-driven commerce system, alike, would benefit if a system for analyzing demand data is provided to determine optimum parameters to increase acceptance of purchase offers. Such a system, in turn, would provide the means to increase revenue for the system operator and for sellers who participate in the buyer-driven commerce system.

Accordingly, there is a need for a system and method for optimizing revenue and/or bookings from collected demand data in a buyer-driven commerce system which addresses certain shortcomings of existing technologies.

SUMMARY

The present application is directed to particular features of a system and method for optimizing revenue and/or bookings from collected demand data in a buyer-driven commerce system. In particular, one embodiment includes a system and method for optimizing revenue from a buyer-driven commerce system for hotel reservations, although other applications may be available. The system receives a plurality of purchase offers for a booking from a plurality of potential purchasers and compares them to at least one acceptance parameter for the booking which may be provided by a seller. Each purchase offer preferably includes demand data, such as a customer identifier, a payment identifier, a rating for a hotel, a location for a hotel, a number of room nights, an occupancy of the room, a room type and a price. The demand data is then stored by the system. The system then receives an input of a simulated change to the acceptance parameter and calculates a simulated acceptance rate for the plurality of purchase offers based on the simulated change and the stored demand data. This information may then be provided to the seller in order to determine an optimum value for the acceptance parameter.

According to a second embodiment, a system and method for determining an optimized acceptance rate for purchase offers submitted to a buyer-driven commerce system includes receiving a plurality of available bookings from a seller Each available booking includes information such as an acceptance parameter, a date of availability, a room type, and a geographic location A plurality of purchase offers are then submitted for the plurality of bookings, of which certain of the purchase offers may be rejected. These unaccepted purchase offers are then stored. The system then determines a number of the unaccepted purchase offers which would be accepted based on a change of the acceptance parameter.

According to a third embodiment, a system and method for determining an optimized acceptance rate for purchase offers submitted to a buyer-driven commerce system includes a seller providing a plurality of available bookings to the system Each of the bookings preferably includes at least one of an acceptance parameter, a date of availability, a room type, and a geographic location. The system then provides to the seller an indication of a plurality of unacceptable purchase offers submitted for at least one of the available bookings. The system further provides an indication of a number of the unacceptable purchase offers which would be accepted based on a change of the acceptance parameter.

According to a fourth embodiment of the present invention, a system and method for optimizing performance of a buyer-driven commerce system includes receiving a number of available bookings from a seller. Each of the bookings preferably has an acceptance parameter such as a minimum price. Users may then submit a plurality of purchase offers for the available bookings. After certain of the purchase offers are rejected, the demand data associated with the rejected purchase offers is stored. Either the system operator or the seller may then input a simulated change of the acceptance parameter and a simulated acceptance rate or the like is determined based on the stored demand data and the simulated change.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 3 is a tabular representation of a demand database in accordance with an embodiment of the present invention;

FIG. 4 is a tabular representation of a booking database in accordance with an embodiment of the present invention;

FIGS. 16-22 are exemplary screen displays for receiving simulation outputs according to an embodiment of the preset invention;

FIGS. 34-47 are depictions of exemplary demand reports generated from the process of FIGS. 28-36

DETAILED DESCRIPTION

The systems and methods disclosed herein may be used in conjunction with the features of co-pending U.S. patent application Ser. No 09/943,651 entitled "System and Method for Maximizing acceptance Parameters From Collected Demand Data in a Buyer-Driven Commerce System" filed concurrently herewith in the name of Choi et al. and assigned to the assignee of the present application, the entirety of which is herein incorporated by reference.

According to various embodiments of the present invention, a buyer-driven commerce system may collect data relating to unfulfilled purchase offers provided by one or more potential buyers. The collected data may then be used to simulate how changes in various acceptance parameters, such as the system operator's minimum margin amount or minimum cost, will affect revenue generated for the system operator or a seller participating in the buyer-driven commerce system. The simulated results may be presented in one or more periodic reports to the seller, who may then decide to optimize one or more acceptance parameters in order to optimize revenues received from the buyer-driven commerce system.

Referring now to FIGS. 1-47, wherein similar components are referenced in like manner, preferred embodiments of a method and system for optimizing revenue and bookings from collected demand data in a buyer-driven commerce system are disclosed.

Figure 1:
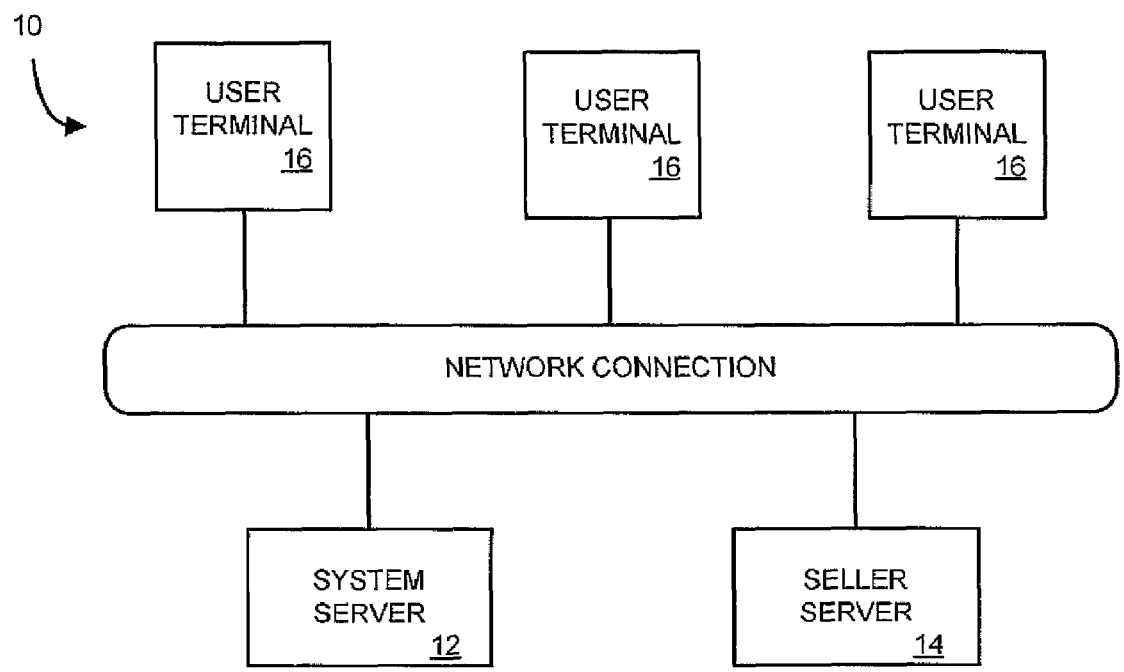
FIG. 1 is a block diagram of a network in accordance with an embodiment of the present invention.

Turning now to FIG. 1, there is depicted an exemplary computer network 10 through which a plurality of users operating user terminals 16 may communicate with one or more buyer-driven commerce system servers 12 over network connection 18 to submit purchase offers for bookings offered by a seller through one or more seller servers 14

Although computer network 10 is preferably an Internet-based network such as the World Wide Web, it may be any one or more of a local area network (LAN), a wide-area network (WAN), an intranet environment, an extranet environment, a wireless network or any other type of computer network, such as those enabled over public switched telephone networks.

User terminals 16 may each be any type of computing device, such as a personal computer, a workstation, a network terminal, a hand-held remote access device, a personal digital assistant (PDA) or any other device that can accomplish two-way electronic communication over the network connection 18. Specific functions and operations of user terminals 16, system server 12, and seller servers 14 are discussed further below.

Figure 2:
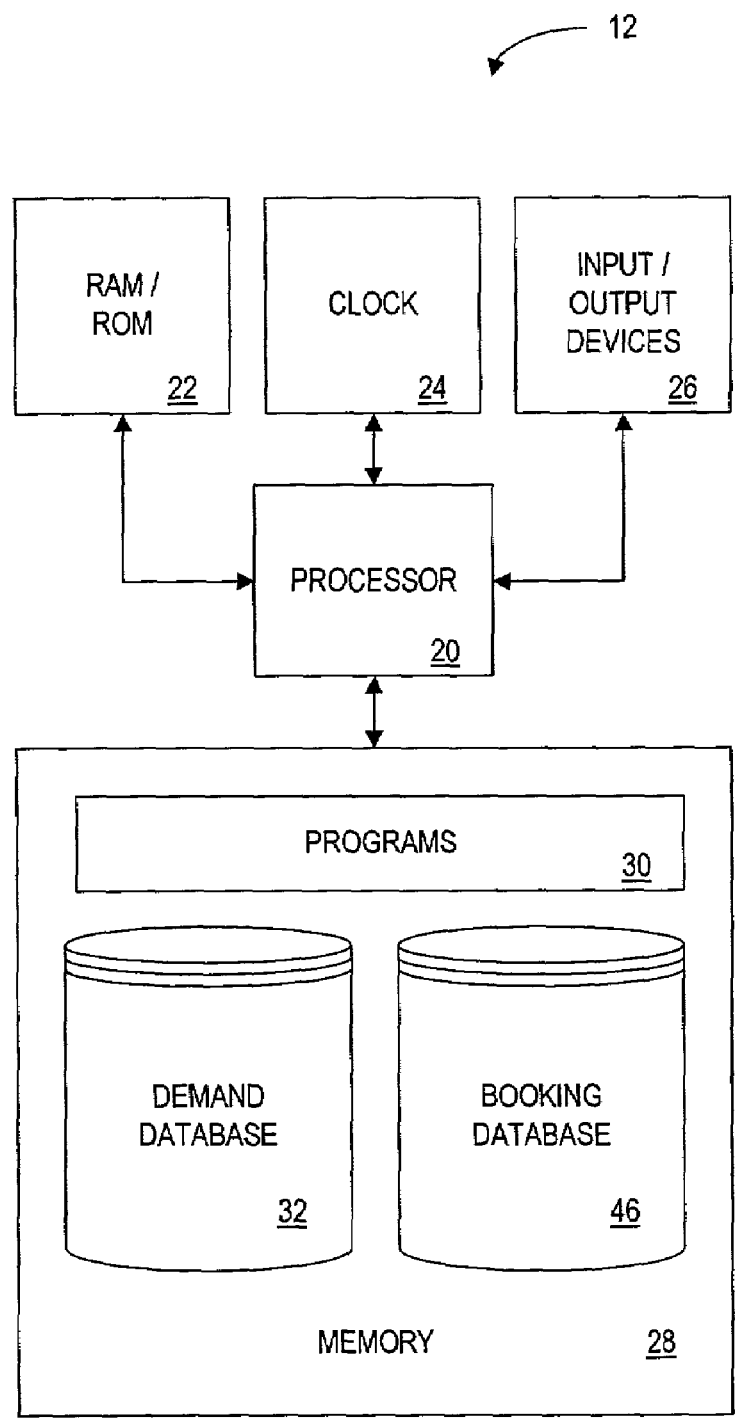
FIG. 2 is a schematic block diagram of a system server in accordance with an embodiment of the present invention.

Turning now to FIG. 2, displayed therein are exemplary components of a computing device, such as system server 12. It should be understood that any of user terminals 16, and seller server 14 may share similar configurations. However, for sake of brevity, the discussion immediately below will refer to the system server 12 only.

The primary component of the system server 12 is a processor 20, which may be any commonly available microprocessor, such as the PENTIUM III manufactured by INTEL CORP. The processor 20 may be operatively connected to further exemplary components, such as RAM/ROM 22, a clock 24, input/output devices 26, and a memory 28 which, in turn, stores one or more computer programs 30, a demand database 32, and a booking database 46.

The processor 20 operates in conjunction with random access memory and read-only memory in a manner well known in the art The random-access memory (RAM) portion of RAM/ROM 22 may be a suitable number of Single In-line Memory Module (SIMM) chips having a storage capacity (typically measured in kilobytes or megabytes) sufficient to store and transfer, inter alia, processing instructions utilized by the processor 20 which may be received from the application programs 30. The read-only memory (ROM) portion of RAM/ROM 22 may be any permanent, non-rewritable memory medium capable of storing and transferring, inter alia, processing instructions performed by the processor 20 during a start-up routine of the system server 12.

The clock 24 may be an on-board component of the processor 20 which dictates a clock speed (typically measured in MHz) at which the processor 20 performs and synchronizes, inter alia, communication between the internal components of the system server 12.

The input/output device(s) 26 may be one or more commonly known devices used for receiving system operator inputs, network data, and the like and transmitting outputs resulting therefrom. Accordingly, exemplary input devices may include a keyboard, a mouse, a voice recognition unit and the like for receiving system operator inputs. Output devices may include any commonly known devices used to present data to a system operator of the system server 12 or to transmit data over the computer network 10 to remote users 16 and seller server 14. Accordingly, suitable output devices may include a display, a printer and a voice synthesizer connected to a speaker Other input/output devices 26 may include a telephonic or network connection device, such as a telephone modem, a cable modem, a T-1 connection, a digital subscriber line or a network card, for communicating data to and from other computer devices over the computer network 10. In an embodiment involving a network server, it is preferred that the communications devices used as input/output devices 26 have capacity to handle high bandwidth traffic in order to accommodate communications with a large number of user terminal 16 and seller server 14.

The memory 28 may be an internal or external large capacity device for storing computer processing instructions, computer-readable data, and the like. The storage capacity of the memory 28 is typically measured in megabytes or gigabytes. Accordingly, the memory 28 may be one or more of the following a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 28 will be apparent.

The memory 28 preferably stores, inter alia, a plurality of programs 30 which may be any one or more of an operating system such as WINDOWS 2000 by MICROSOFT CORP, and one or more application programs, such as a web hosting program and a database management program of the type manufactured by ORACLE, each of which may be necessary to implement the embodiments of the present invention The programs 30 preferably include processing instructions for accomplishing communication of buyer-driven commerce data between user terminals 16, system server 12 and seller server 14, as described herein. Accordingly, the programs 30 may include a web hosting application and the like for allowing users to submit information, such as purchase offers, to the system server 12, to receive information regarding bookings that are available through the system server 12, and the like. The web hosting software may include functionality sufficient to read JAVASCRIPT, HTML, XML and other similar programming languages typically used in conjunction with Internet applications. The programs 30 preferably also include a database management program, of the type commonly manufactured by ORACLE CORP. to save, retrieve and analyze demand data received through system server 12. The programs 30 also preferably include other applications, such as VISUAL BASIC, to allow a system operator to program specific functions to be performed by the system server 12 as described herein. The programs 30 operate to form a buyer-driven commerce system which operates in the manner described hereinbelow.

The memory 28 preferably also stores a plurality of relational databases, such as a demand database 32 and a booking database 46, examples of which are depicted in FIGS. 3 and 4. In referring to the databases depicted therein, it is important to note that the first row of the databases includes a field header for each field of the database and the remaining rows each correspond to one record of the database Fields of data, are represented by each column. Further or fewer fields and records of data may be used. The databases presented herein may be configured into any number of relational databases. In addition, configurations other than database formats may be used to store the data maintained in exemplary databases 32 and 46.

Referring now to FIG. 3, an exemplary demand database 32 is provided to store purchase offer information and customer data which are submitted to the system server 12 by the plurality of users through user terminals 16. In a particular embodiment, the demand database 32 stores only the demand data for purchase offers which were submitted to the system 12 and which were rejected by the sellers participating in the buyer-driven commerce system. In such an embodiment, the exemplary demand database 32 preferably has a customer identification field 34, a requested dates field 36, an offer price field 38, a requested minimum star rating field 40, a participation in promotion field 42 and a resubmitted offer field 44.

The customer identification field 34 preferably contains a unique identifier pertaining to a particular user or potential purchaser who accesses the system 12 to place a purchase offer for a booking, such as a hotel reservation. The unique identifier may be any alphabetic, numeric or alpha-numeric code which is assigned to the user. The code may be generated by the system 12 or selected by the user upon accessing the system 12. Additional customer identification data, such as a customer name, a customer address, a customer telephone number, and a financial account identifier corresponding to a financial account owned by the user may likewise be used. Alternatively, such data may be stored in a separate customer database (not shown) and cross-referenced to the information stored in demand database 32 in any known manner.

Requested dates field 36 preferably stores the dates which a customer has requested for a booking. The dates may correspond to a requested check in date and a requested check out date.

Offer price field 38 preferably stores the price at which the user has offered to purchase a booking. In a preferred embodiment, the price corresponds to a per-day rate for the booking. The offer price may also correspond to the initial offer price without a subsidy, promotion offer, or bump amount as described further herein.

The requested hotel star rating field 40 preferably stores a ranking of the hotel as requested by the user. It is contemplated that in an embodiment where the user submits a purchase offer for a hotel reservation, the user must submit a rating for the desired hotel. Such ratings may be based on a number of stars assigned to the hotel. The star ratings are typically assigned on a scale from one to five stars, with one star corresponding to the lowest possible rating and five stars corresponding to the highest possible rating. The star ratings may be determined by the system operator of the buyer-driven commerce system, provided by the seller, or determined from a third party ranking of hotel properties.

The participated in promotion field 42 preferably stores an indication of whether the user subscribed to one or more promotions offered through the system 12. In a particular embodiment, it is contemplated that a number of third parties may offer to add a predetermined amount of money to a user's purchase offer in exchange for user information or the user's agreement to participate in a program offered by the third party. As one example, a credit card provider may offer to add $50.00 to the user's submitted purchase price in exchange for the user open a credit account with the credit card provider. Accordingly, the participated in promotion field 42 may contain an indication of the promotion in which the user participated, the bump amount provided by the party, or other information corresponding to the promotion.

Resubmitted offer field 44 preferably contains an indication of whether the stored demand data is for a resubmitted purchase offer. In one embodiment of the buyer-driven commerce system, it is contemplated that a user may resubmit a purchase offer if an initial purchase offer is rejected, for example, based on the submitted offer price. However, in one embodiment of the present invention, it is contemplated that particular resubmitted purchase offers, such as offers rejected because of system error, may not be included in the demand data used for determining an optimum acceptance parameter. This is so that simulated acceptance rates as determined below may more accurately reflect actual demand. Accordingly, the resubmitted offer field 44 may be used by the system 12 to exclude the demand data for such undesirable resubmitted offers.

Referring now to FIG. 4, a booking database 46 is provided to store and manage seller bookings which are available for the submission of purchase offers by the plurality of users 16 of the system 12. In a preferred embodiment, the bookings correspond to hotel reservations which are provided by hotel proprietors However, it is contemplated that the bookings may correspond to other products or services which are preferably suitable for a buyer-driven commerce system, such as airline ticket reservations, car rental purchases, automobile purchases, mortgages groceries, etc In such embodiments, the fields of booking database 46, as described below, may be altered to accommodate suitable data for such products and services. In the preferred embodiment, the booking database 46 includes a seller identification field 48, a star rating field 50, a geographic location field 52, a room type field, a minimum acceptable price field 54, a date available field, a margin required field 56 and a subsidy available field 58.

Seller identification field 48 preferably stores unique identifiers for each of a plurality of sellers participating in the buyer-driven commerce system. The unique identifiers may be any alphabetic, numeric or alphanumeric code which may be assigned to each seller by the system 12 or selected by the sellers. In addition, the seller identifier may contain identification information corresponding to the seller, such as a seller name, a seller address, a seller telephone number, a seller contact name, and the like. Alternatively, the seller identifier may be cross-referenced to a seller database (not shown) which contains such identification information for each seller.

Star rating field 50 preferably stores a rating for the property corresponding to the booking, as described above with respect to the required hotel star rating field 40 of FIG. 3.

Geographic location field 52 preferably stores an indication of the location in which the booking is available. Accordingly, geographic location field 52 may include a city, state and postal code corresponding to the booking. In addition, the geographic location field 52 may contain an identifier by which the system 12 may determine the location of the available booking.

Room type field preferably stores an indication of a room type available for the booking, e.g. single occupancy, double occupancy, smoking, non-smoking, etc. In alternate embodiments, the room type field may be substituted with a field appropriate to the booking being offered. For example, in a buyer-driven commerce system offering airline tickets, the room type field may be substituted with a seat class field or the like.

The following fields relate to an acceptance parameter set by the seller. Minimum acceptable price field 54 preferably stores a minimum price at which the seller is willing to sell the booking. Date available field preferably stores an indication of the dates for which the booking is available.

The remaining fields of booking database 46 correspond to acceptance parameters which are preferably determined by the system operator of the buyer-driven commerce system. Margin required field 56 preferably stores a margin amount required for the system operator to accommodate a submitted purchase offer. The margin may be expressed in a currency amount, but is preferably expressed as a percentage of a sale of the booking to the user. Subsidy available field 58 preferably stores a subsidy amount, expressed as a currency value, which is available for the booking. Both the margin amount and the available subsidy may be predetermined by the system operator of the buyer-driven commerce system, and an optimum value for these parameters may be determined according to the processes described below.

Figure 5:
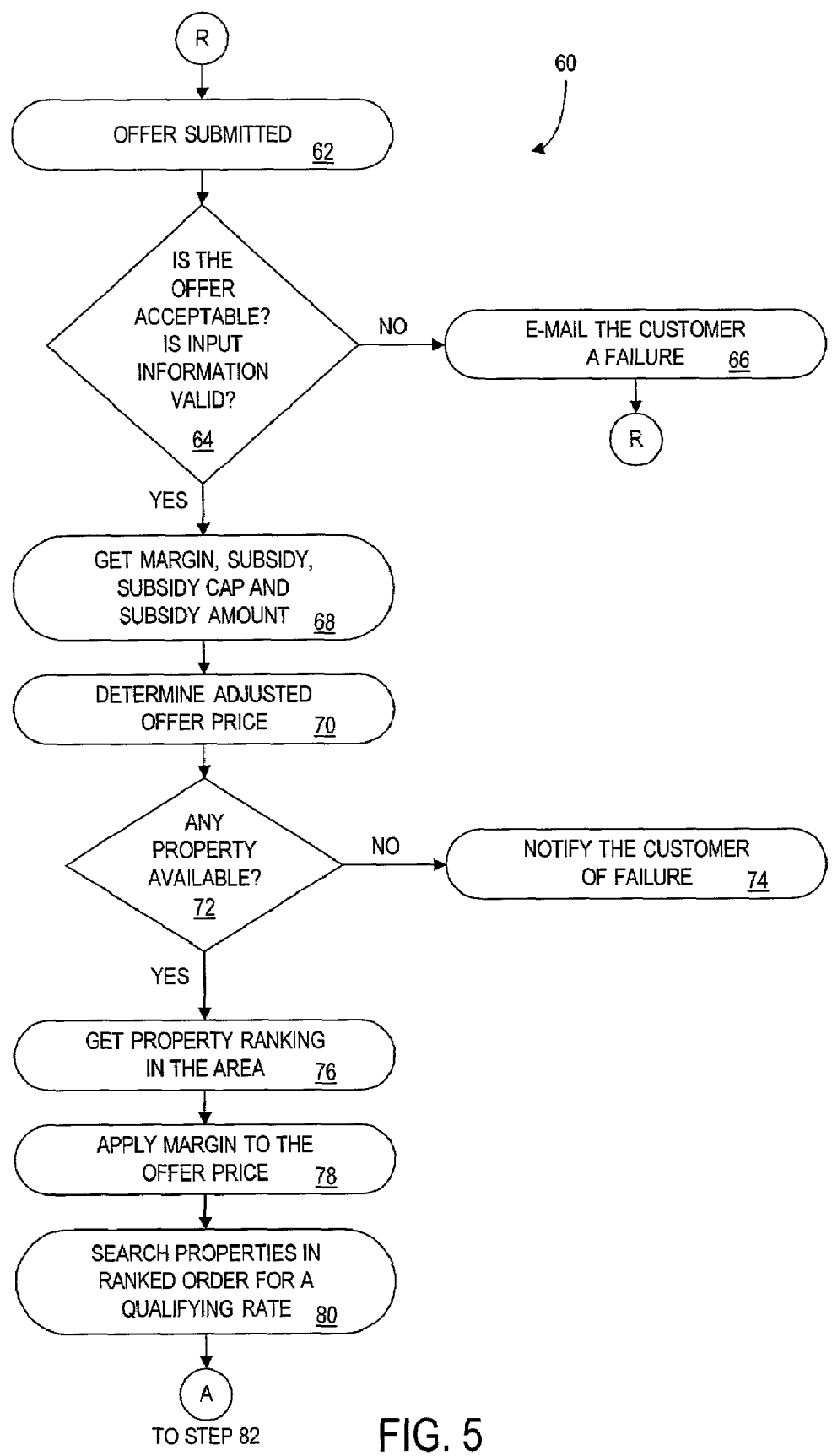
FIG. 5 is a flow chart depicting an exemplary booking process according to an embodiment of the present invention.
Figure 5:
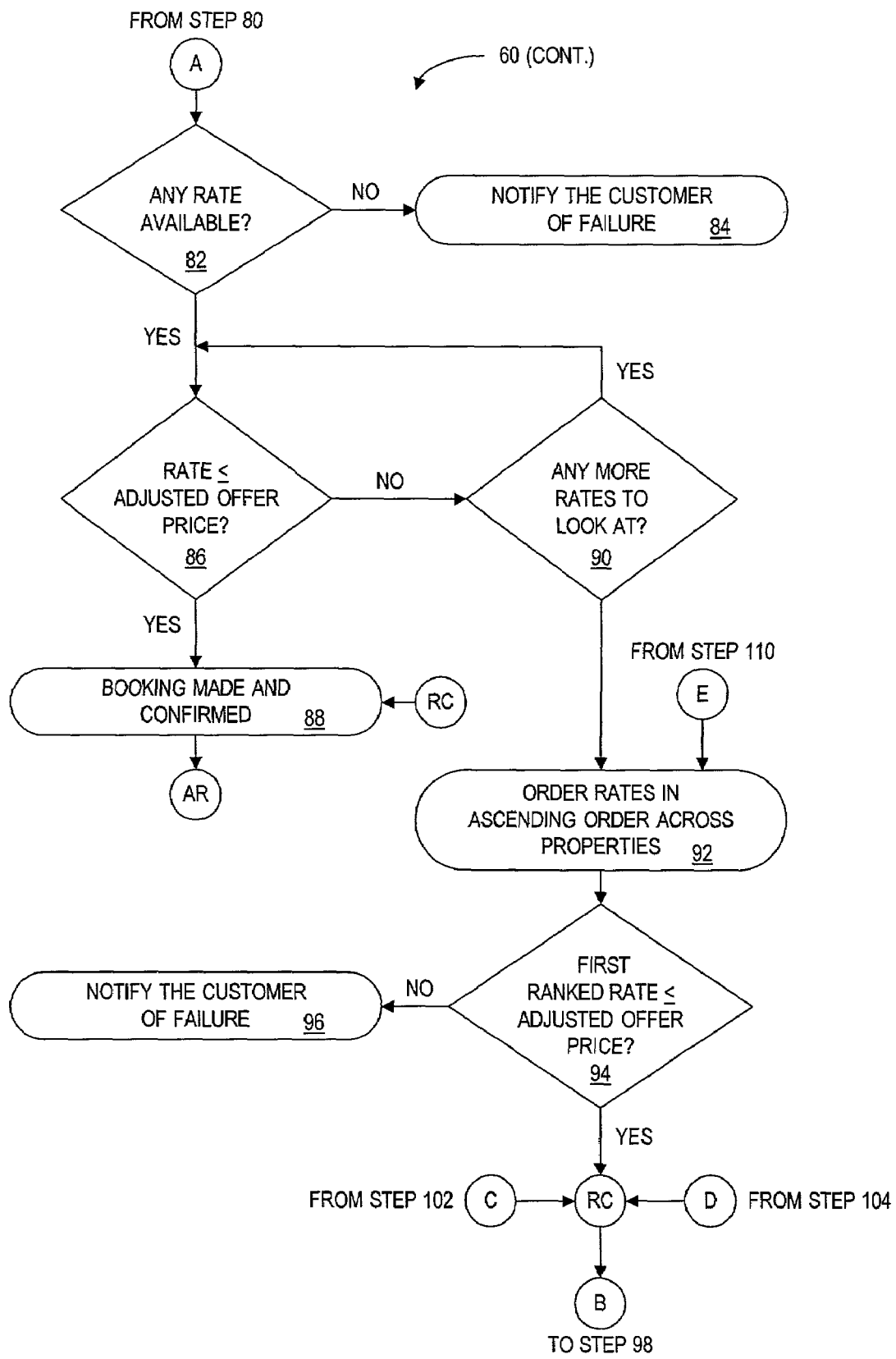
Figure 5:
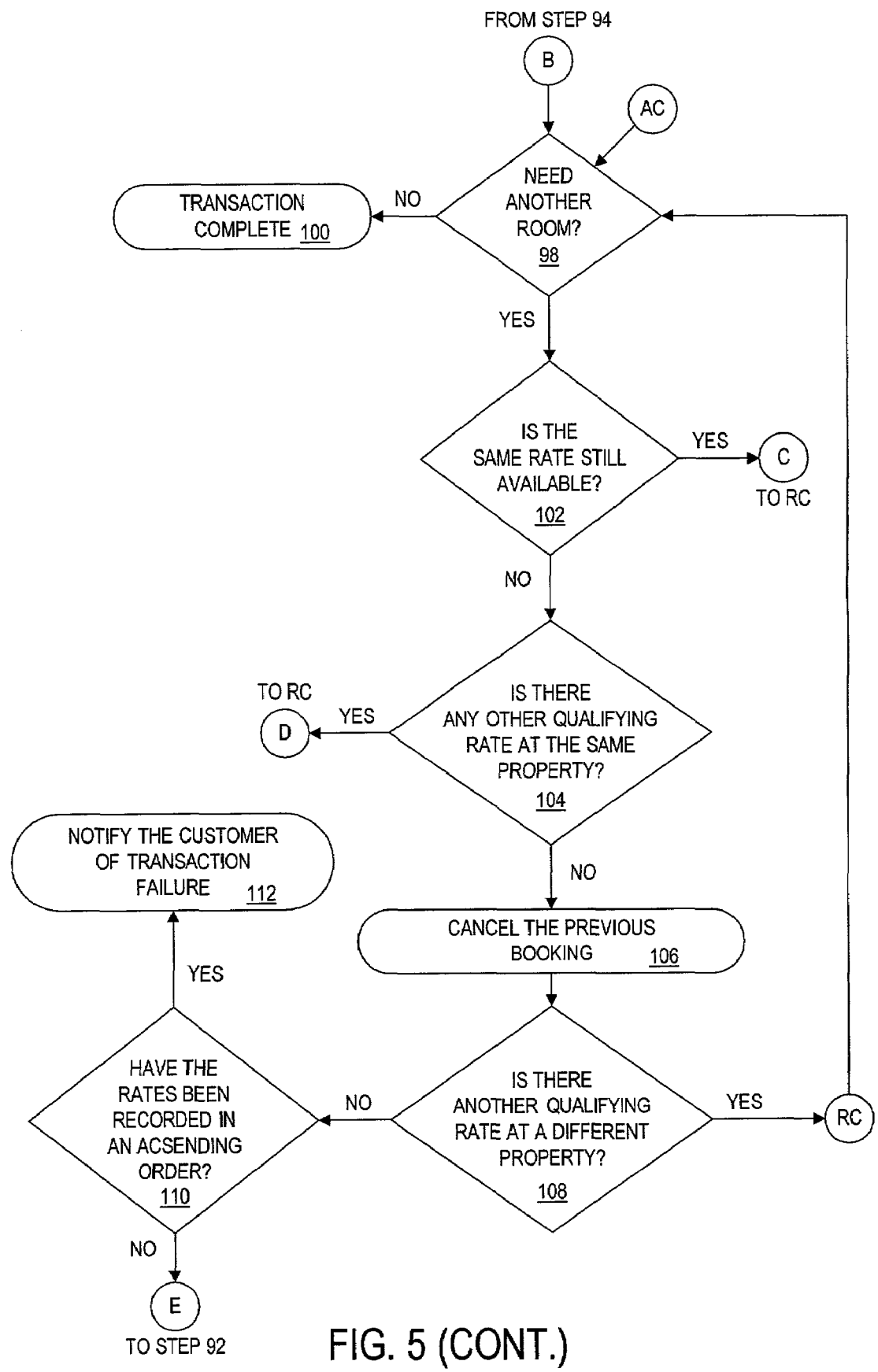

Turning to FIG. 5, there is depicted an exemplary booking process 60 by which the system server 12 receives a purchase offer from a user and notifies the user whether a seller has accepted the offer. Booking process 60 begins at step 62 where a user submits a purchase offer by entering data in user terminal 16 and transmitting the same to system server 12 over network connection 18. The system server 12 is programmed to first determine whether the offer meets initial acceptability criteria, such as a requirement that valid data be entered, that the submitted offer price is not obviously low, that check-in and check-out dates have been specified, that the submitted offer is not a duplicate offer, etc. If the initial acceptability criteria have been satisfied, the process 60 continues to step 68 below. Otherwise the process 60 continues to step 66 where the user is notified that the initial acceptability criteria have not been met and the system 12 requests the resubmission of valid data.

Next, the system server 12 may retrieve margin, subsidy, subsidy cap and bump data that may be applied to the purchase offer (step 68) In a particular embodiment, it is contemplated that a purchase offer may be subsidized by the system operator of the system server 12 so that a higher purchase offer acceptance rate is achieved, thereby increasing consumer confidence in the buyer-driven commerce system. The system operator may then predetermine a subsidy amount which may be applied to each submitted purchase offer. According to a preferred embodiment of the present invention, an optimal subsidy amount may be determined based on collected demand data and a subsidy budget maintained by the system operator, as described further below. The system 12 may further determine whether the subsidy budget has been depleted through application to previously submitted purchase offers, and if so, may not apply a subsidy amount to the newly submitted purchase offer. The system 12 may further determine whether the user has enrolled in a cross-subsidy promotion such that a bump amount will be applied to the purchase offer.

Using this information, the system server 12 next determines an adjusted offer price which includes a subsidy amount or a bump amount to be applied (step 70). Using the adjusted offer price, the system server 12 then compares the submitted purchase offer, including the adjusted price, requested star rating, requested geographic location and the like to the plurality of bookings available in the booking database 46. If one or more matching bookings are found, the process 60 continues to step 76 below. Otherwise, the process 60 proceeds to step 74 where the user is informed that the submitted purchase offer is not accepted. The notification may be provided to the user via a message on the web site. Alternatively, or in addition, the notification may be accomplished via e-mail, telephone, instant messenger service, pager service, or through any other similar method of communication. After such notification has been provided, the process 60 may end.

At step 76, the system server 12 next ranks the matching properties, preferably by comparing the star ratings of the booking, the minimum acceptable price, and the like. The system server 12 applies any available margin to the submitted purchase offer price (step 78) and searches the ranked bookings (step 80) to determine any bookings which match the data submitted with the purchase offer (step 82). If no bookings are matched to the purchase offer, the system server 12 notifies the user (step 84) Otherwise, the process 60 continues to step 86 where the system server 12 determines whether the minimum acceptable price for the booking is less than the adjusted offer price (e.g., the offer price less the margin amount). If so, the booking is completed and confirmed (step 88) after which the process 60 continues to step 98 below. Otherwise, the process 60 continues to step 90 where the system server 12 determines whether there are any other available bookings with an acceptable minimum price. If so, the process returns to step 86 above. Otherwise the process 60 continues as follows.

Next, at step 92, the system server 12 preferably orders all matching rates in ascending order for all matching bookings. The system server 12 then determines if the first ranked rate is less than or equal to the adjusted offer price (step 94). If not, the process 60 continues to step 96 where the system server 12 notifies the user that no bookings are available. If, however, the first ranked rate matches the adjusted offer price, the process returns to step 88 above.

After a booking has been confirmed, the process 60 continues to step 98 where the system server determines if the purchase offer included a request for more than one room. If no further rooms were requested, the process 60 ends at step 100. Otherwise, the process 60 continues to step 102 where the system server 12 determines whether there are additional rooms available at the same location for the same rate. If so, the process 60 returns to step 88 above. Otherwise the process 60 continues to step 104 where the system server 12 determines whether there are any other qualifying rates available at the same location. If another qualifying rate is found, the process 60 returns to step 88 above. Otherwise, the process 60 continues to step 106 where the previous booking is cancelled since the number of rooms requested by the customer can not be satisfied by the seller at that location.

The system server 12 then determines whether there is another available booking with a qualifying rate (step 108). If so, the process 60 returns to step 88 above where the booking is made and confirmed Otherwise, the process 60 continues to step 110 where the system server 12 determines whether the available bookings remain in ascending order. If they are not in ascending order, the process 60 returns to step 92 above However, if the rates are still in ascending order, the system server determines that there are no available bookings and notifies the user at step 112, after which process 60 ends.

System Revenue Optimization

Continuing to FIGS. 6-14, a first simulation program from the plurality of programs 30 is provided for determining optimum acceptance values for a system operator of a buyer driven commerce system. The second program from the plurality of programs 30 is used to determine optimum margin and subsidy amounts to be applied to purchase offers by the system operator.

Figure 6:
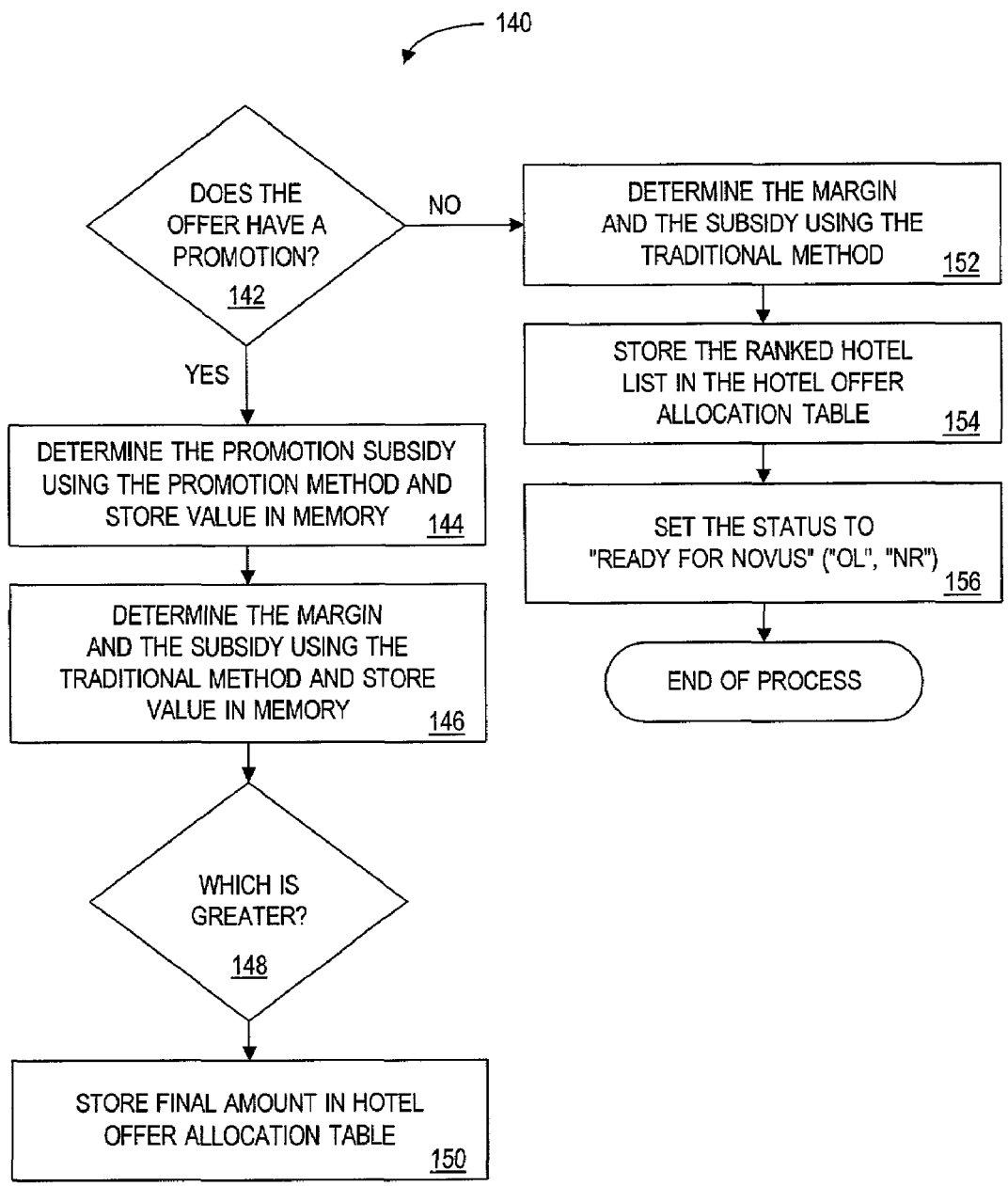
FIG. 6 is a flow chart depicting an exemplary process for determining promotional subsidy amounts according to an embodiment of the present invention.

Referring first to FIG. 6, there is depicted an exemplary process 140 for determining promotional bump amounts that may be applied to a purchase offer. The process 140 begins at step 142 where the system determines whether a promotion applies to a particular offer. The determination may be based upon whether the user submitting the offer has participated in a cross subsidy program or the like. The promotion may include an offer of a currency value to be provided to a participant of the promotional offer. If such a promotional bump amount is available, the process 140 continues to step 144 as follows. Otherwise the process continues to step 152 below.

At step 144, the system server 12 may determine the bump amount to be applied and stores the value in demand database 32. The system server 12 then determines the margin and the subsidy to be applied to the purchase offer price without the bump amount and stores this values as well (step 146). Next, the system server determines which is greater, the purchase offer price plus the bump amount, or the purchase offer price with the subsidy (step 148). The greater of the two values is then stored as the final purchase offer price for the submitted purchase offer (step 150), after which the process 140 ends.

At step 152, the system server 12 determines the final purchase price including a margin and a subsidy to be applied to the purchase offer price. The final purchase offer price is then stored (step 154) and preferably marked as ready for comparison to the plurality of bookings (step 156), after which, process 140 ends.

Figure 7:
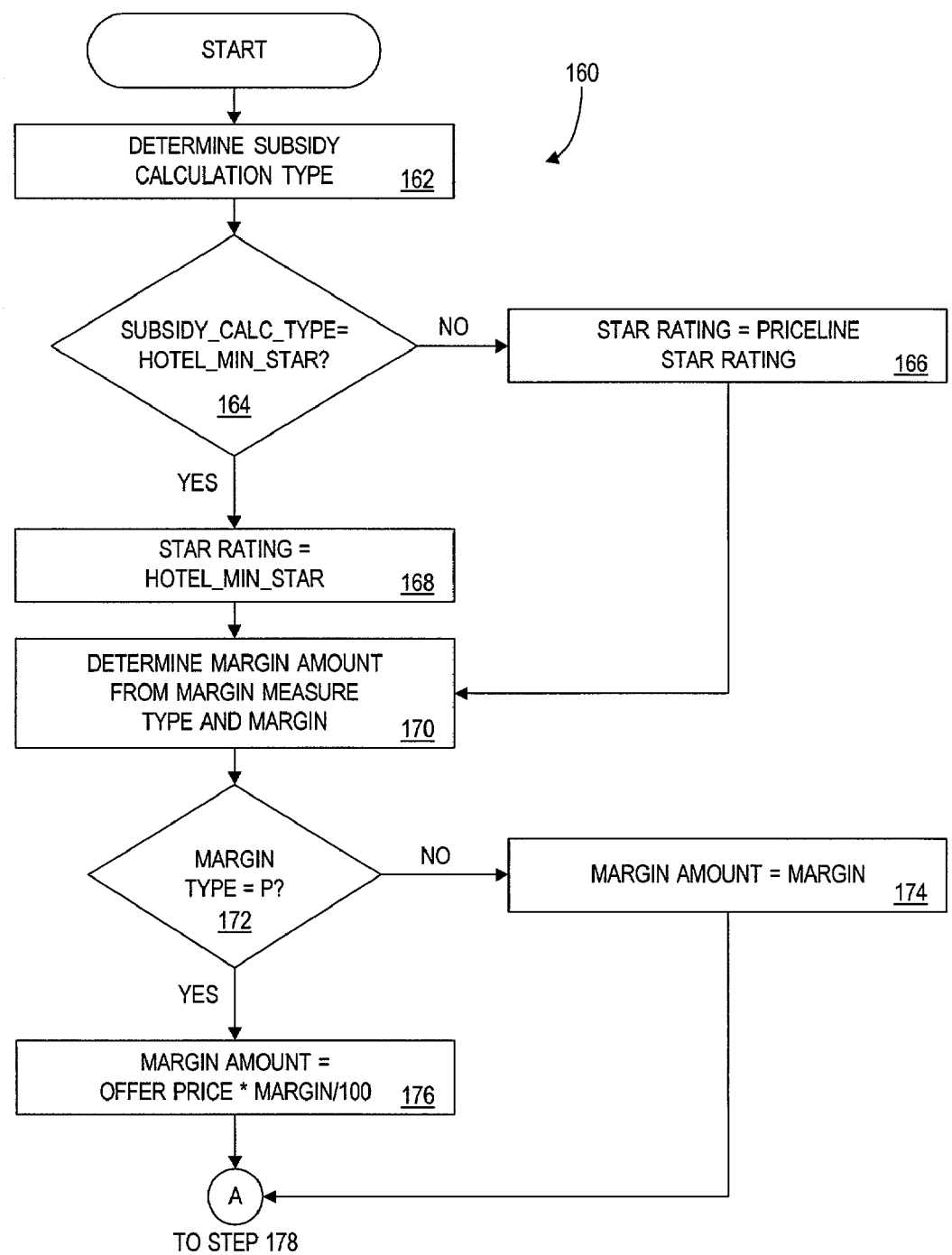
FIGS. 7-8 are a flow chart depicting an exemplary process for calculating margin and subsidy amounts according to an embodiment of the present invention.
Figure 7:
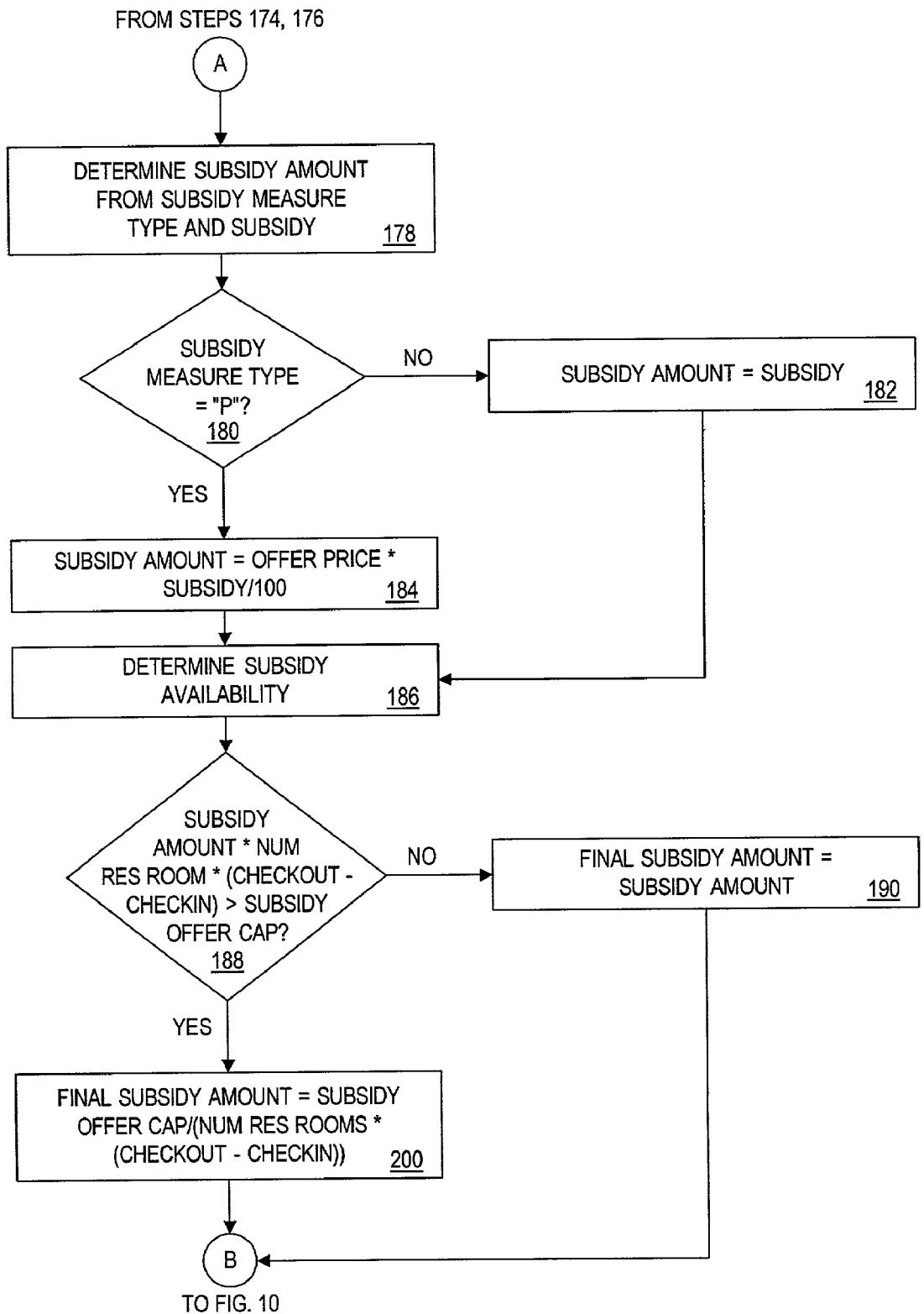
Figure 8:
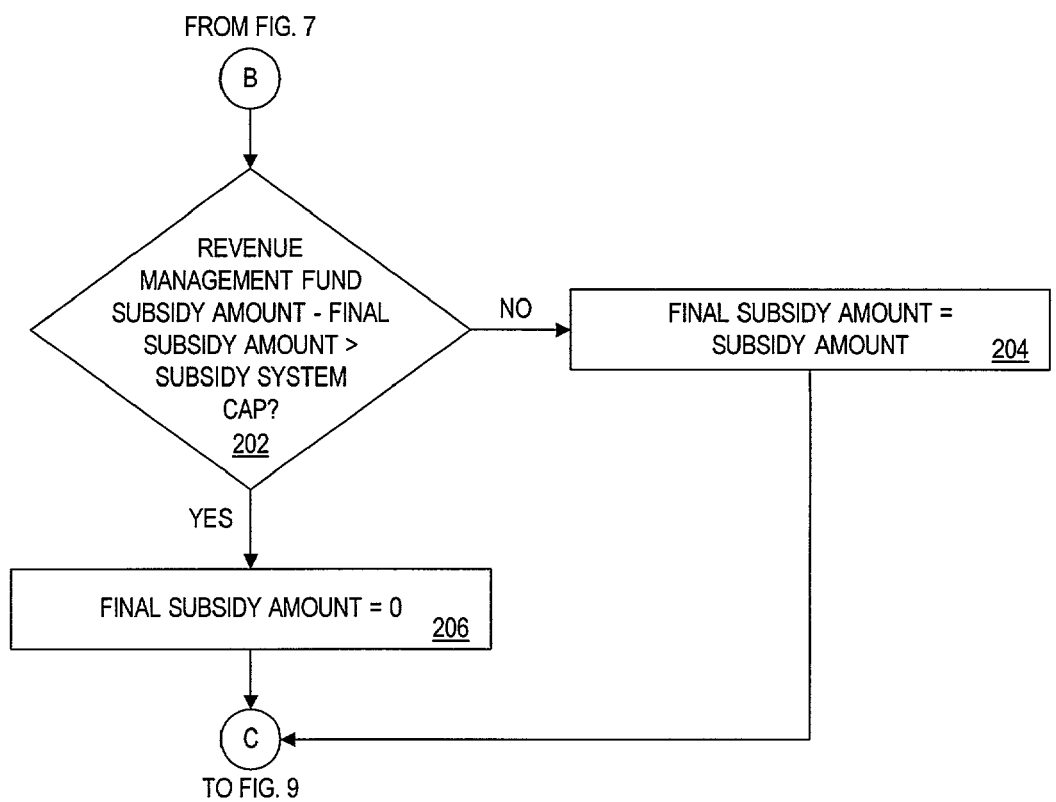
Figure 9:
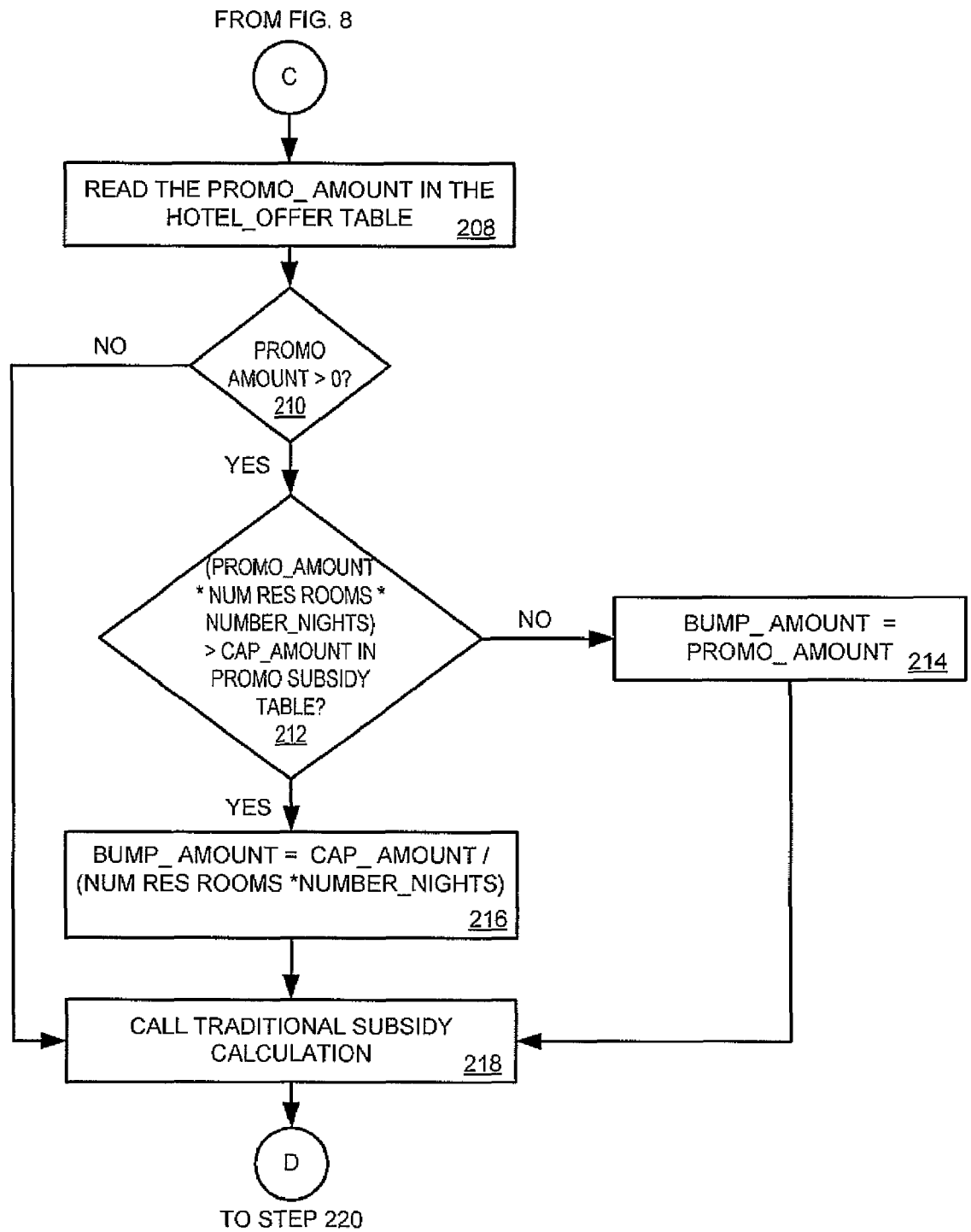
FIG. 9 is a flow chart depicting an exemplary process for determining a subsidy amount and a bump amount according to an embodiment of the present invention.

Turning now to FIGS. 7-9, therein is depicted an exemplary process 160 for calculating margin and subsidy amounts for purchase offers submitted within a predetermined period of time according to an embodiment of the present invention. The process 160 begins at step 162 wherein a subsidy calculation type is selected by the system server 12. If the subsidy type corresponds to the hotel minimum star rating, the process 160 continues to step 168 below. Otherwise, the process 160 continues to step 166 where the star rating is assigned by the system operator of the buyer-driven commerce system. From step 166, the process continues to step 170 below.

At step 168, the star rating to be used is set to the star rating assigned to a booking. The process then continues to step 170 wherein a margin amount for the selected star rating is determined. Continuing to step 172, the system server determines whether the margin type is for a currency amount or a percentage value If a percentage is required, the process 160 continues to step 174 wherein the determined margin amount is calculated as percentage required for the submitted purchase offer, after which the process continues to step 178 below. If, however, a currency amount is desired, the process continues to step 176 wherein the margin amount is determined according to the formula margin amount=offer price*(margin/100).

Continuing to step 178, a subsidy amount is determined in the same manner. At step 180, the system server 12 determines whether the subsidy type is to be expressed as a currency amount or a percentage value. If a percentage is required, the process 160 continues to step 182 wherein the determined subsidy is calculated as percentage required for the submitted purchase offer, after which the process continues to step 186 below. If, however, a currency amount is desired, the process continues to step 184 wherein the subsidy amount is determined according to the formula: subsidy amount=offer price*(subsidy/100).

Next, at step 186, the system server 12 determines a subsidy availability for each of the purchase offers. The system server 12 then determines whether the subsidy cap will be exceeded by calculating the subsidy amount times the number of bookings made within the predetermined time (step 188). If the subsidy cap would be exceeded, the process continues to step 200 where the subsidy amount to be applied is determined as the subsidy cap divided by the number of room nights booked for the predetermined time. Otherwise, the final subsidy amount to be applied is set to the selected subsidy amount (step 190).

From either step 190 or step 200, the process 160 continues to step 202 where the system server 12 determines whether a subsidy is available for a particular purchase offer by comparing the subsidy amount to an amount of revenue set aside for the subsidy program by the system operator of the buyer-driven commerce system. If a currency value is available, the process 160 continues to step 204 where the subsidy amount available is set to the determined subsidy value. If no currency value is available, the subsidy amount for a particular purchase offer is set to zero (step 206), after which the process 160 continues to step 208.

At step 208, a promotional bump amount is retrieved for a particular purchase offer. At step 210, the system server 12 determines whether the bump amount is greater than zero. If so, the process 160 continues to step 212. Otherwise, the process 160 continues to step 218 below.

At step 212, the system server 12 determines whether the bump amount times the number of rooms requested in the purchase offer times the number of room nights is greater than a promotional cap amount. If not, the bump amount applied is equal to the initial bump amount (step 214). Otherwise, the bump amount is calculated as the cap amount over the number of rooms reserved times the number of room nights requested (step 216).

From either step 214 or 216, the process 160 continues to step 218 wherein the previous subsidy and margin calculation is retrieved. At step 220, the system server 12 determines whether the subsidy amount less the margin amount is greater than the bump amount. If so, the bump amount is set to zero at step 224. If not, the subsidy amount is set to zero at step 222.

From either step 222 or step 224, the subsidy amount and bump amount for the purchase offer is stored in command database 32 (step 226).

Figure 10:
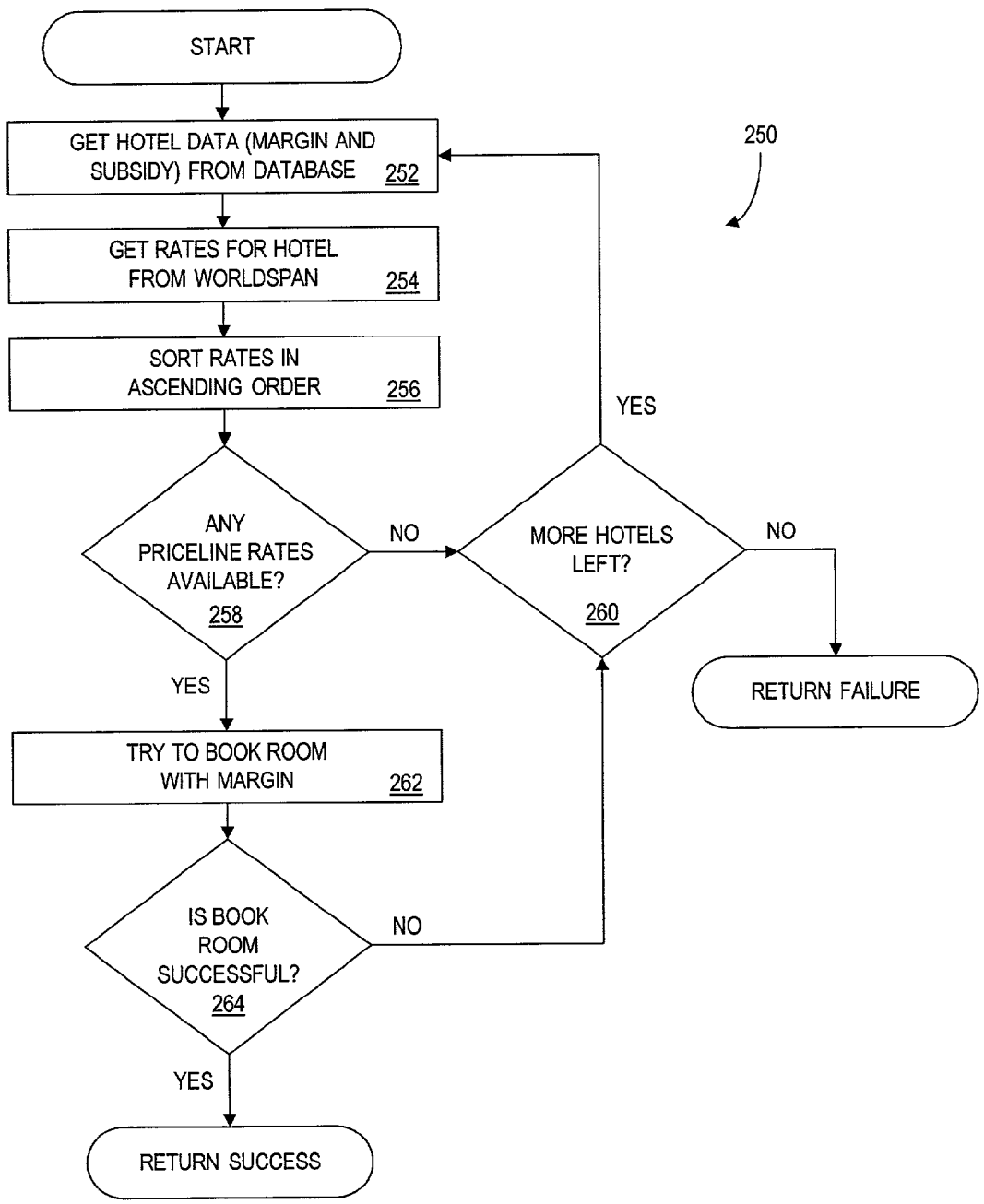
FIGS. 10-11 are a flow chart depicting an exemplary process for determining an acceptance or failure of a booking according to an embodiment of the present invention.

Referring now to FIG. 10, there is depicted a process 250 for fulfilling a purchase offer based on margin. The process 250 begins at step 252 wherein booking data is retrieved from booking database 46. At step 254, the minimum acceptable rate for each booking is retrieved. The rates are then sorted in ascending order (step 256). At step 258, the system server 12 confirms that booking is available for the buyer driven commerce system. If not, the process 250 continues to step 260 where the next property location matching a purchase offer is selected. If other properties are available, the process 250 returns to step 252 above. Otherwise, the process 250 ends.

If, however, the booking is available, the process 250 continues to step 262 wherein the system server 12 determines whether the submitted offer price satisfies the system operator's minimum required margin. A process for accomplishing this step is presented below with respect to FIG. 11. At step 264, if the purchase offer can be fulfilled as submitted, the system server notifies the user of a successful booking for the submitted purchase offer, after which process 250 ends. Otherwise, the process 250 returns to step 260 above.

Figure 11:
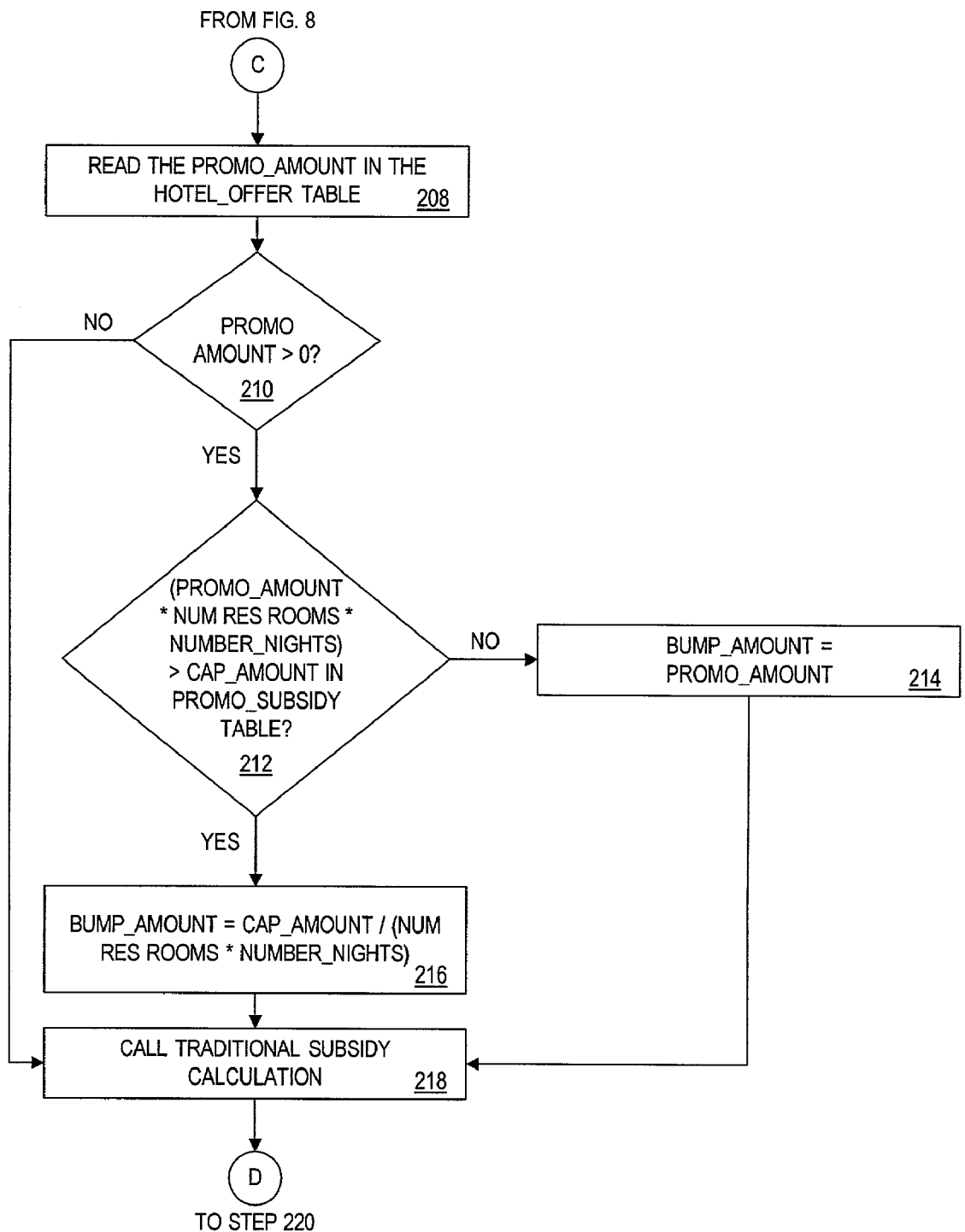
Figure 11:
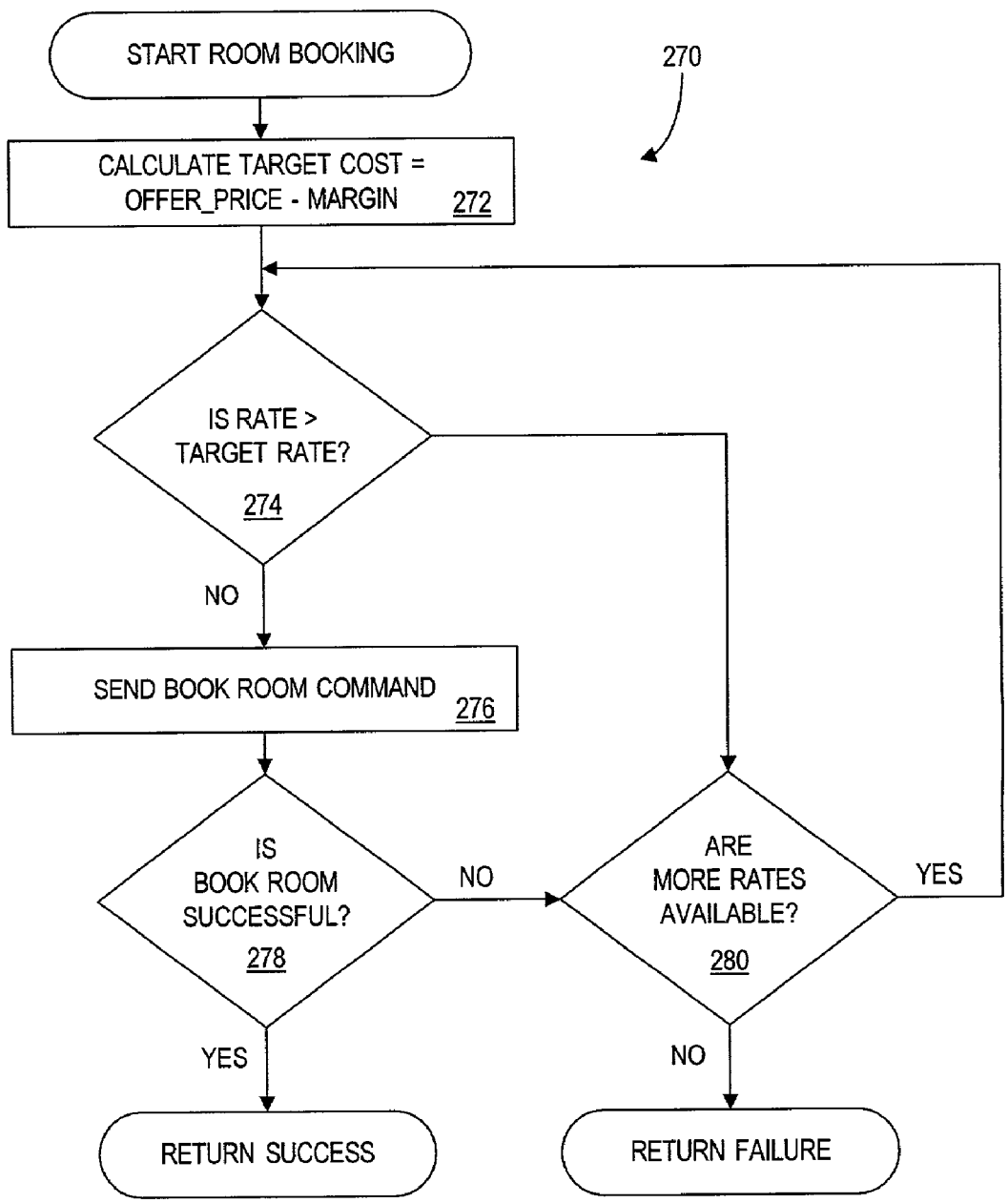

Turning now to FIG. 11, a process 270 for determining an acceptance of a booking based on margin is presented. The process 270 commences at step 272 wherein the submitted offer price is compared to the cost of the room for the system operator. At step 274, the system server 12 determines whether the margin derived from the booking meets a minimum margin amount by comparing the available rate to a target rate. If the minimum margin amount is not satisfied, the process 270 continues to step 280, where it is determined whether other room rates are available for the submitted purchase offer. If so, the process 270 then returns to step 274 above. Otherwise, the process 270 ends.

If the margin amount is satisfied, the process 270 continues to step 276 wherein a request to book the reservation for the user is submitted. At step 278, the system server 12 determines whether the booking is confirmed. If, so, the customer is notified and process 270 ends. Otherwise, the process 270 returns to step 280 above.

Figure 12:
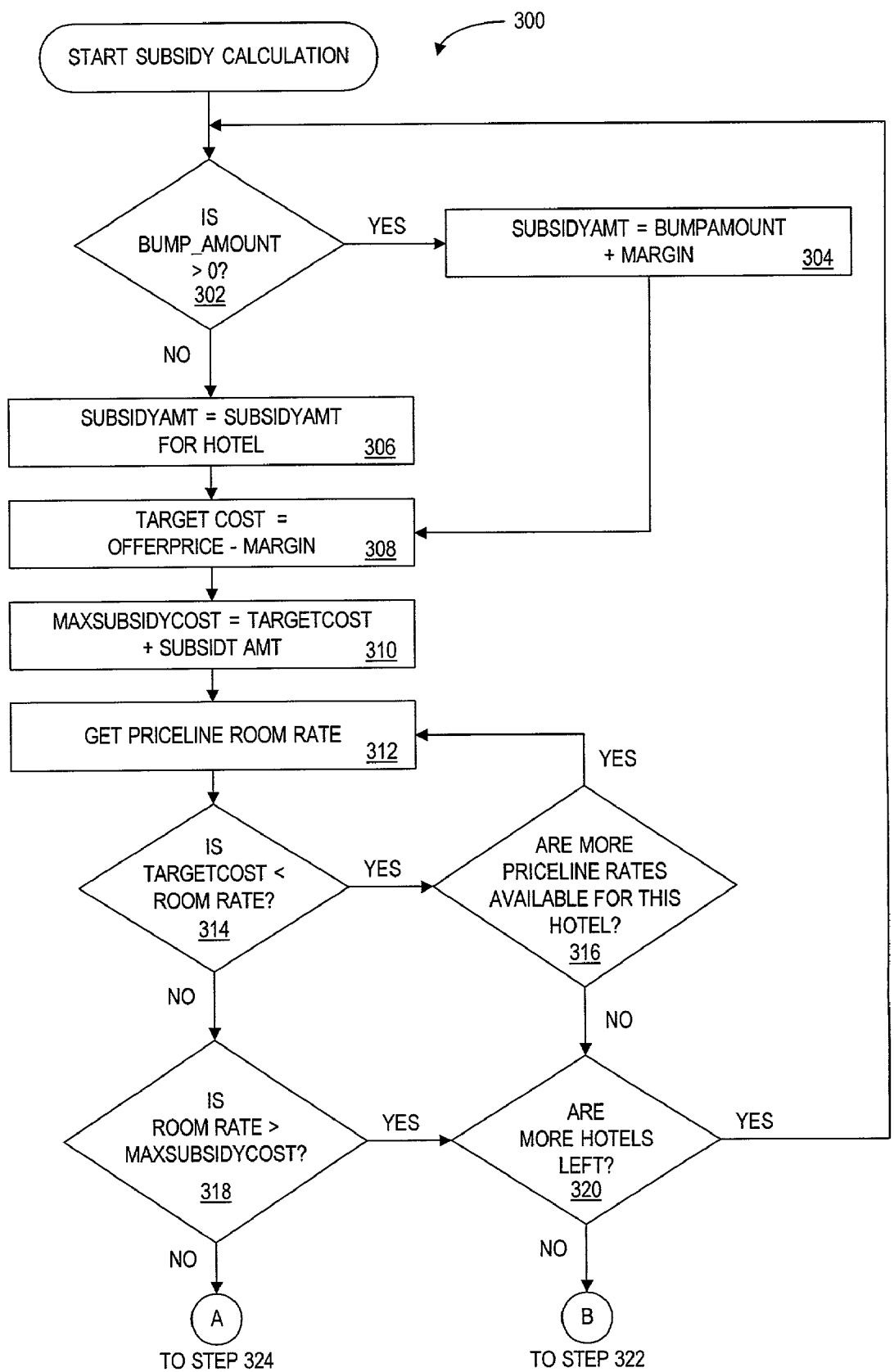
FIG. 12 is a flow chart depicting an exemplary process for calculating a subsidy according to an embodiment of the present invention.
Figure 12:
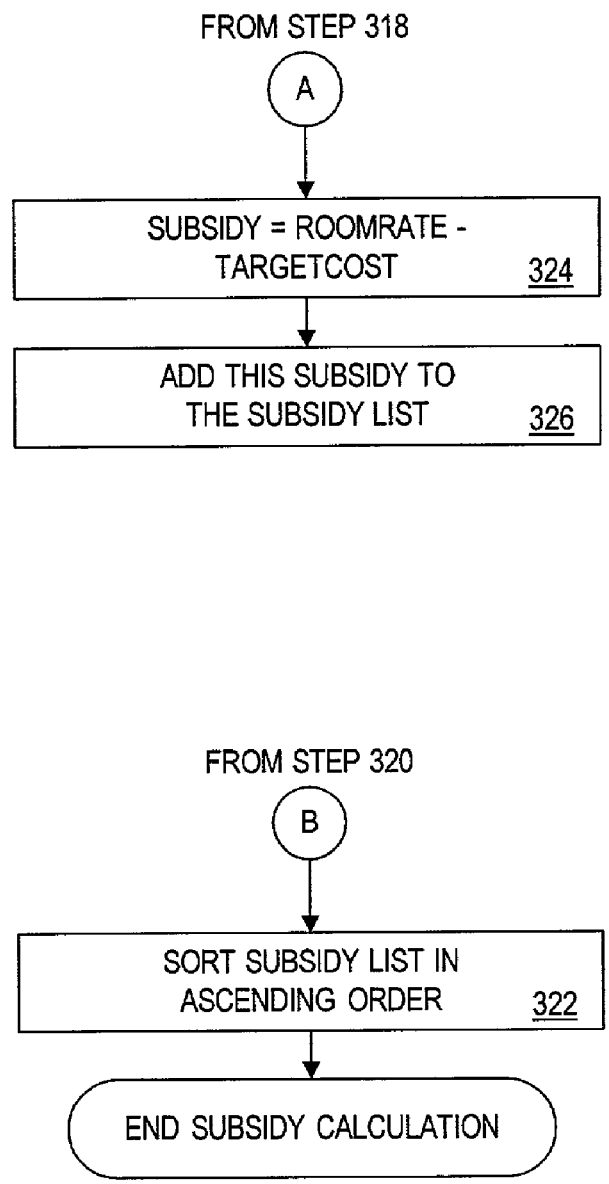

A process 300 for determining a subsidy amount to be applied to a purchase offer is depicted in FIG. 12 Process 300 begins at step 302 where it is determined whether a bump amount is available for the purchase offer. If so, a subsidy amount for the offer is determined as the bump amount plus the required margin amount (step 304). Otherwise, the subsidy amount is set as the subsidy amount available for the requested star booking (step 306).

Next, at step 308, a target cost for fulfilling the purchase offer is determined as the offer price minus the margin required. Then a maximum subsidy cost is calculated as the target cost plus the subsidy amount (step 310).

Then, at step 312, the cost of the booking to the system operator of the buyer driven commerce system is retrieved. At step 314, the system server 12 determines whether the target cost calculated in step 308 is less than the room cost from step 312. If so, the process 300 continues to step 316. Otherwise, the process 300 continues to step 318 below.

At step 316, the system server 12 determines whether there are other available room rates for the selected hotel. If so, the process 300 returns to step 312 above. Otherwise, the system server 12 determines whether there are other suitable hotels available for the purchase offer (step 320). If other hotels are available, the process returns to step 302 above. Otherwise, the process 300 continues to step 322 where a subsidy list for all previous bookings is resorted in ascending order, after which process 300 ends.

Continuing from step 318, the system server 12 determines whether the room cost is greater than the maximum available subsidy cost. If so, the process returns to step 320 above. Otherwise the process 300 continues to step 324 where the subsidy to be applied is set to the room cost less the target room cost. The process 300 then continues to step 326 where the subsidy is added to the list of purchase offers for which a subsidy was applied, after which process 300 ends.

Figure 13:
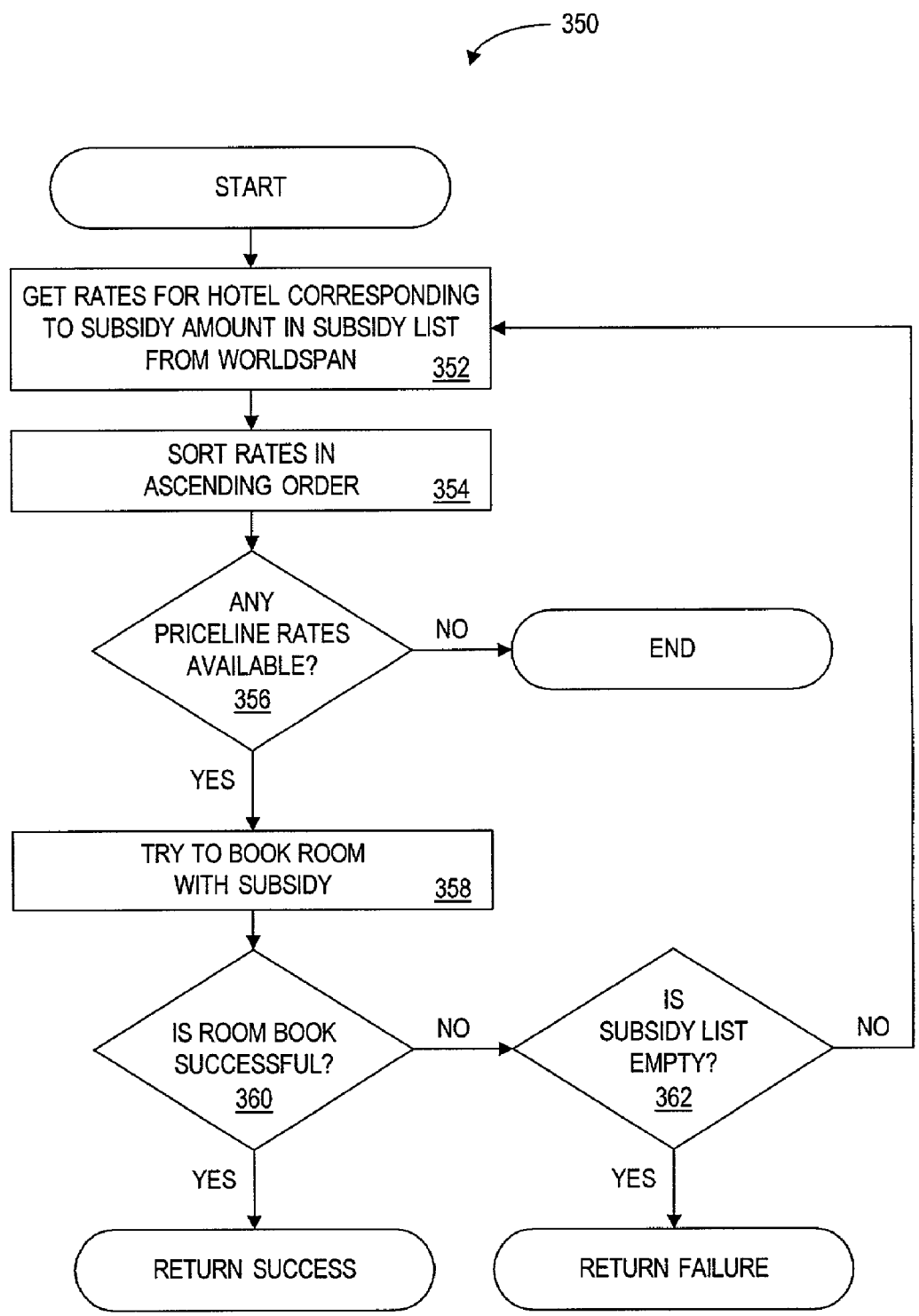
FIGS. 13-14 are flow charts depicting an exemplary process for determining a booking with a subsidy amount in accordance with an embodiment of the present invention.

Turning now to FIG. 13, there is depicted an exemplary process 350 for determining a booking with a subsidy according to an embodiment of the present invention. The process 350 begins at step 352 where room rates for a hotel assigned a particular subsidy is retrieved. The rates are sorted in ascending order (step 354) At step 356, the system server 12 determines whether any of the rates are available to the buyer-driven commerce system. If so, the process continues to step 358. Otherwise the process 350 ends.

At step 358, a request to fulfill a purchase offer including the subsidy amount is transmitted by the system server 12 to the seller corresponding to the booking. Then, at step 360, the system server 12 determines whether the request was fulfilled. If so, the user is notified of the fulfillment of the purchase offer and process 350 ends. If the booking is not successful, the process 350 continues to step 362 wherein the system server 12 determines whether there are additional subsidies available. If so, the process 350 returns to step 352 above for the new subsidy. Otherwise, the user is notified that a booking was not successful.

Figure 14:
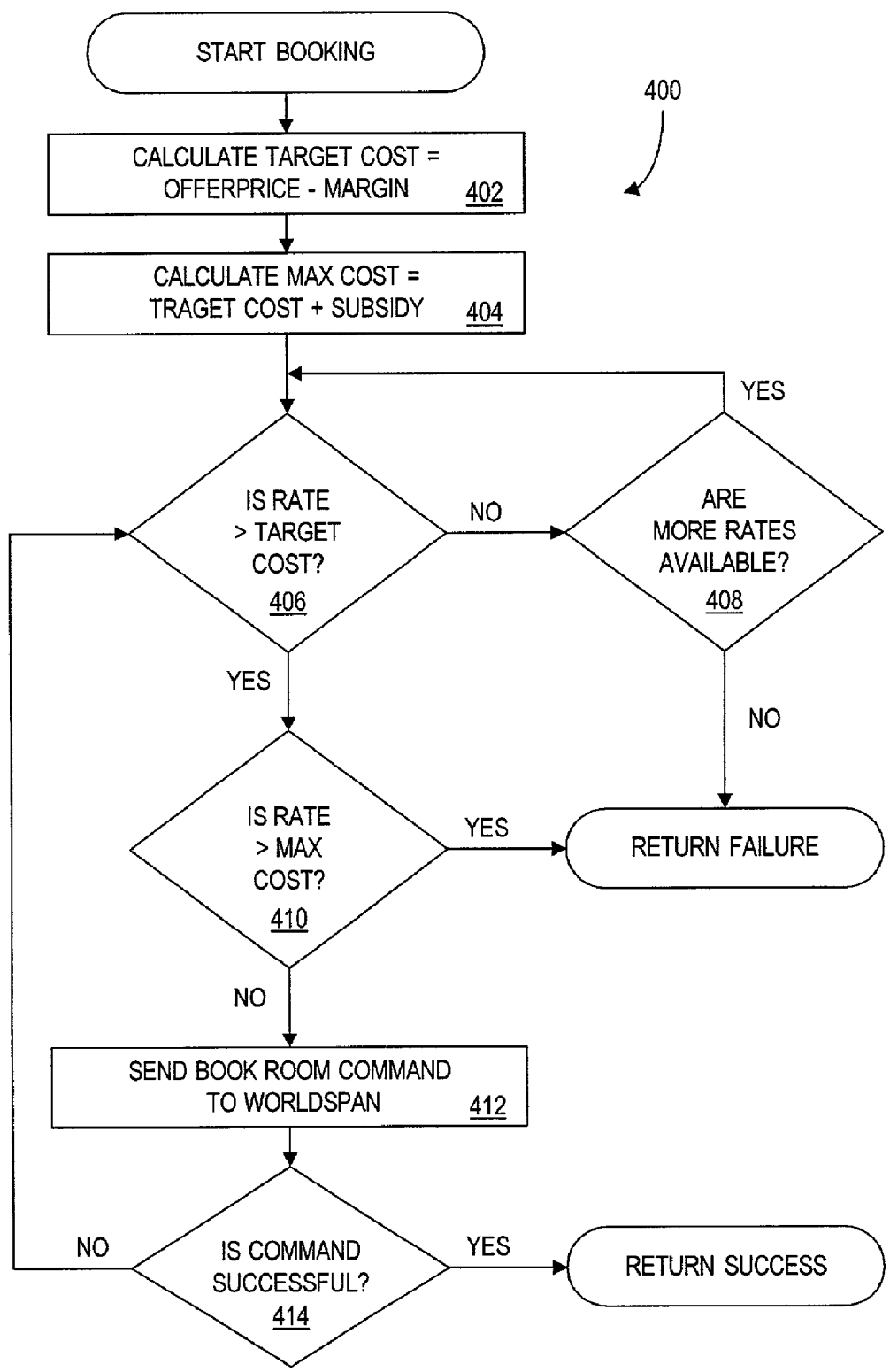

A second process 400 for determining a booking with a subsidy is presented in FIG. 14. The process 400 begins at step 402 wherein a target cost is calculated for a purchase offer. The target cost is preferably calculated as the submitted offer price less the required margin amount. At step 404, the system server 12 then calculates the maximum cost for the booking as the target cost plus an available subsidy.

Next, at step 406, the system server 12 determines whether the room cost is greater than the target cost. If so, the process 400 continues to step 410 below. Otherwise the process 400 continues to step 408 wherein the system server 12 determines whether additional room rates for the hotel are available. If so, the process returns to step 406 above for the new room cost. Otherwise the process 400 ends.

At step 410, the system server 12 determines whether the room cost is greater than the maximum cost calculated in step 404. If so, the process 400 ends. Otherwise, the process 400 continues to step 412, where the system server 12 requests that the booking be processed by the seller. If the booking is successful at step 414, the user is notified that the purchase offer has been fulfilled. Otherwise, the process 400 returns to step 408 above.

Figure 15:
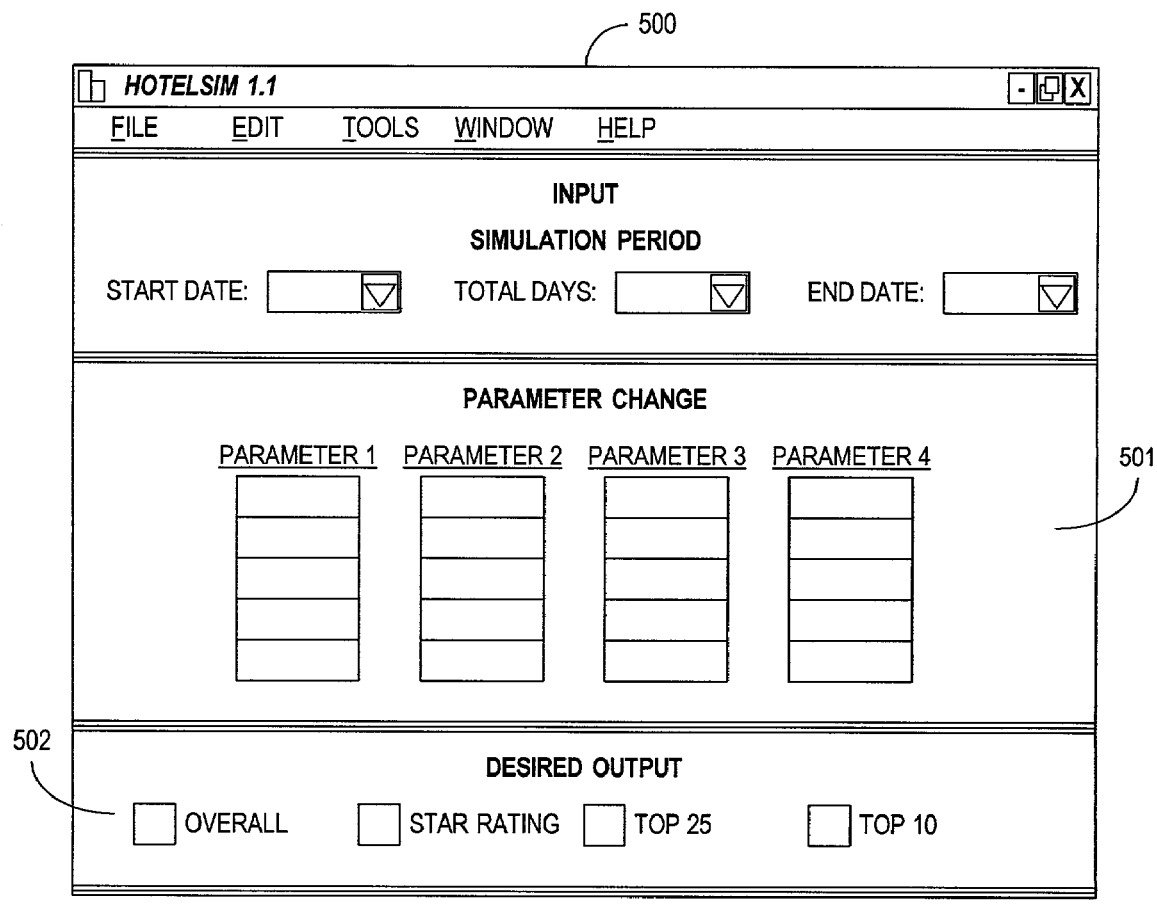
FIG. 15 is an exemplary screen display for entering margin and subsidy amounts in accordance with an embodiment of the present invention.

Referring now to FIGS. 15-22, exemplary screen displays corresponding to the second program from the plurality of programs 30 are depicted. In FIG. 15, an exemplary initial screen 500 includes a number of fields 501 for entering a predetermined time period to simulate acceptance rate based on simulated acceptance parameters. Location 502 allows a system operator to enter parameter changes for the margin amounts, margin percentage, subsidy amounts, subsidy percentage and a subsidy cap amount available. The location 502 further allows a system operator to select a desired simulation output, such as the overall results of the change, the results by star rating, the change in the top 25 market performers and the top 10 hotels that with the biggest change in revenue or acceptances.

Figure 17:
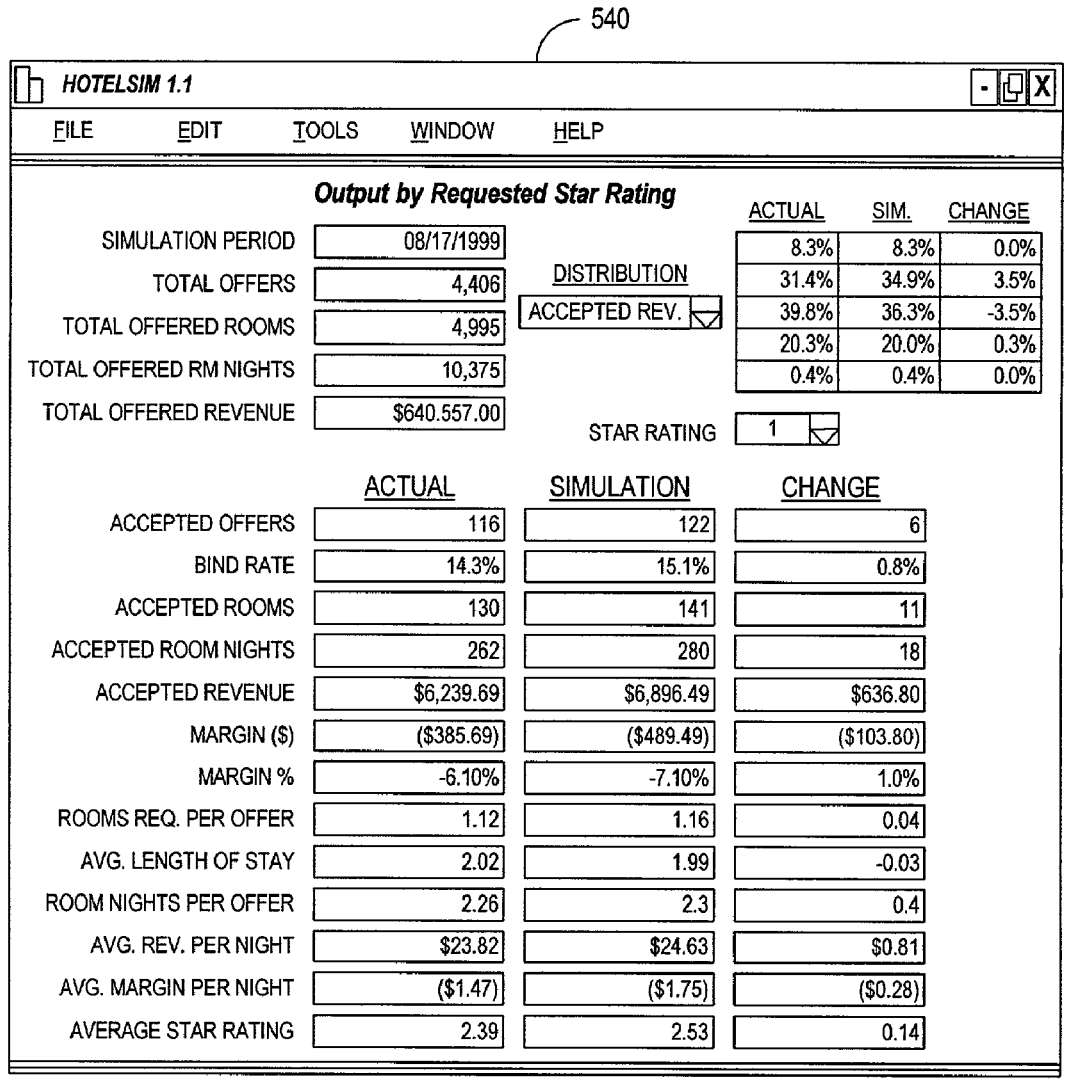

FIG. 16 depicts an exemplary output menu 510 by which a system operator may select the category of simulation outputs to view. If the system operator requests an overall output, an overall output screen 520 may be provided in order to present the overall acceptance statistics to the system operator. FIG. 17 depicts an overall output screen 530 with the resulting statistics from a simulation. FIG. 17 further includes a output by requested star rating screen 540 which is presented when the system operator requests simulation results presented by star rating.

Figure 18:
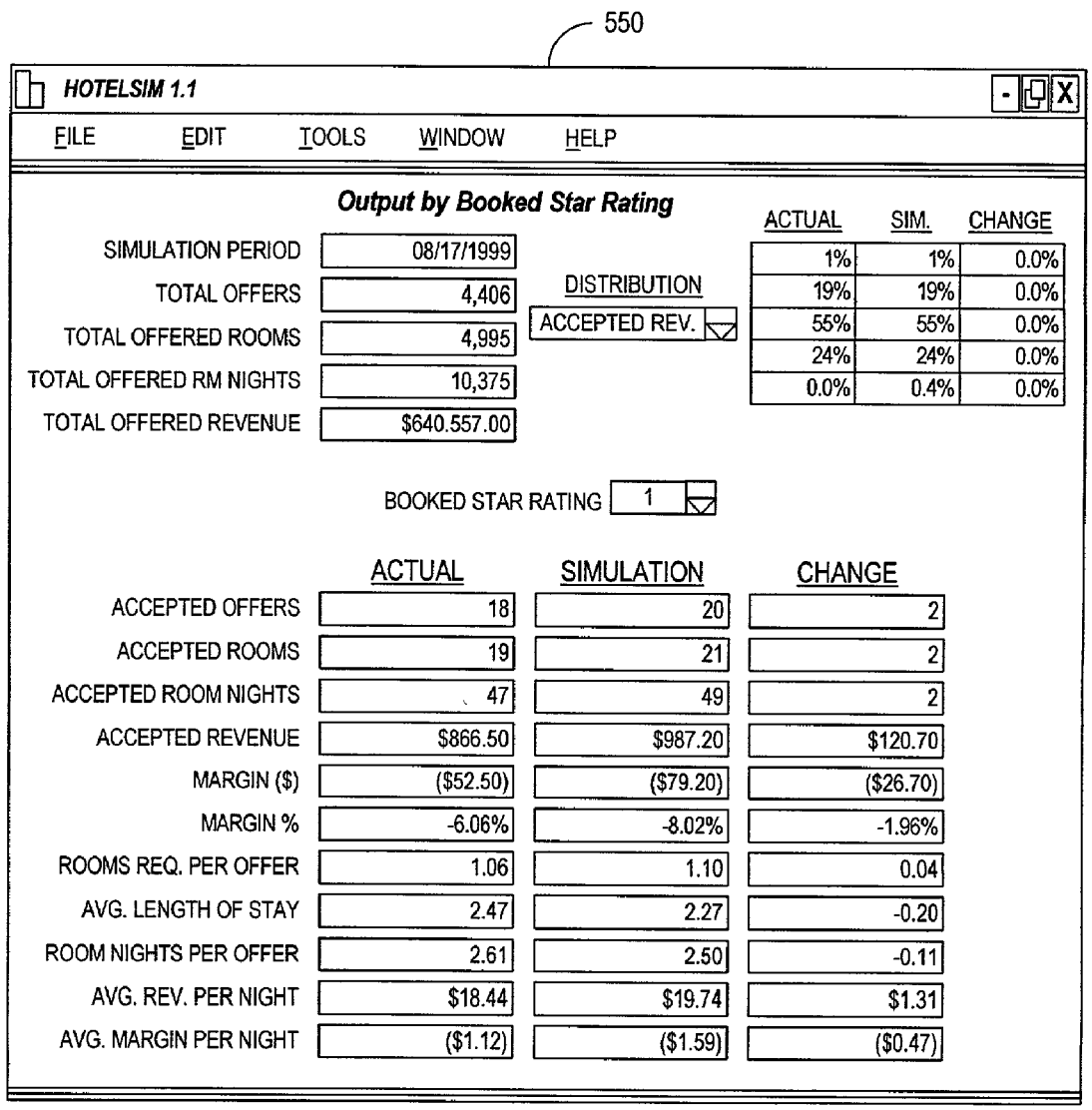
Figure 19:
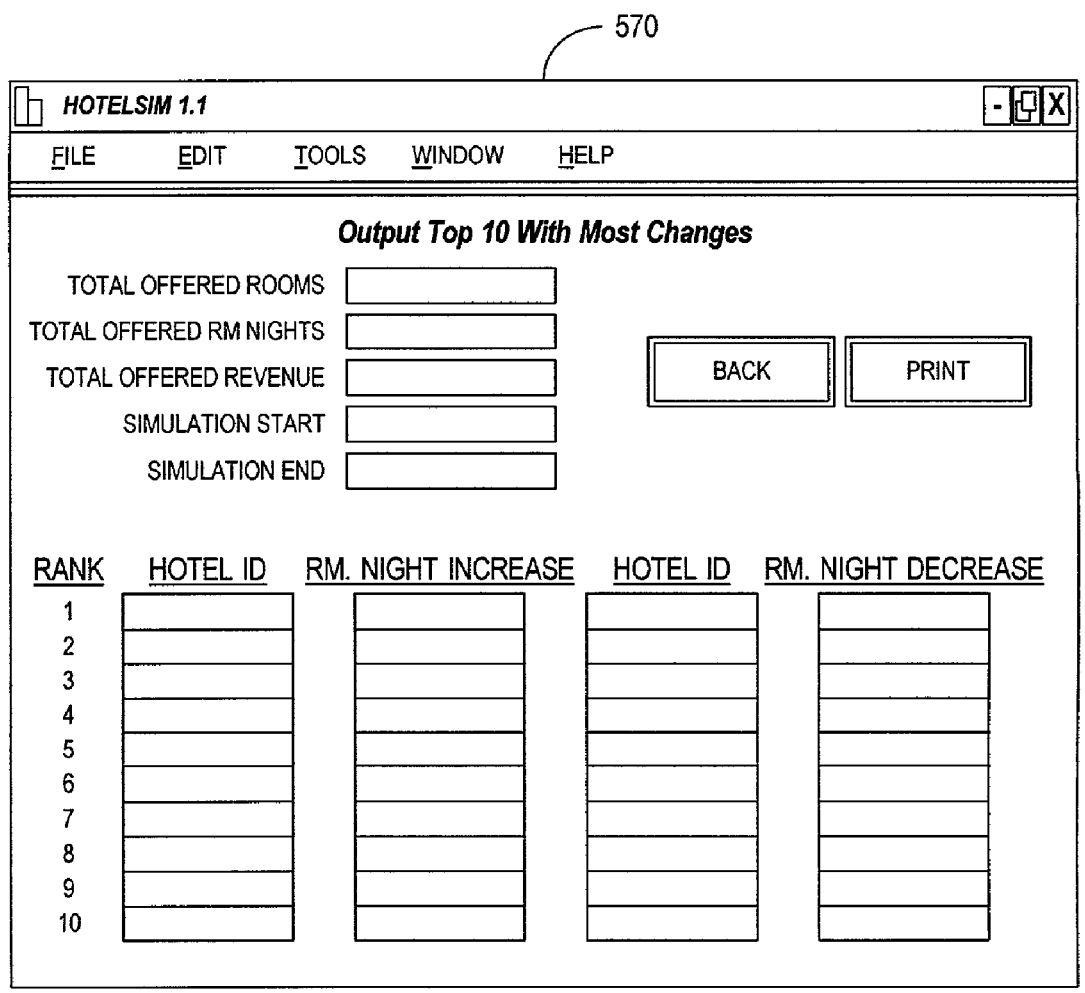

If the system operator requests a simulation by booked star rating, the system server may present an output screen 550 as presented in FIG. 18. If the system operator requests to see the simulation results by the top 25 market performers, the display screen 560 of FIG. 18 may be presented. If the system operator requests a report of the top ten hotels with the most business increase or decrease based on the simulation, the display screen 570 of FIG. 19 may be presented.

A further exemplary screen display 580 is presented in FIG. 20, by which a system operator may input actual and simulation parameter values at location 590 and be presented with the simulation results at location 600. FIGS. 21 and 22 further present exemplary output screens 610 and 620 corresponding to output by booked star rating and output by requested star rating, respectively.

Seller Revenue Optimization

Figure 23:
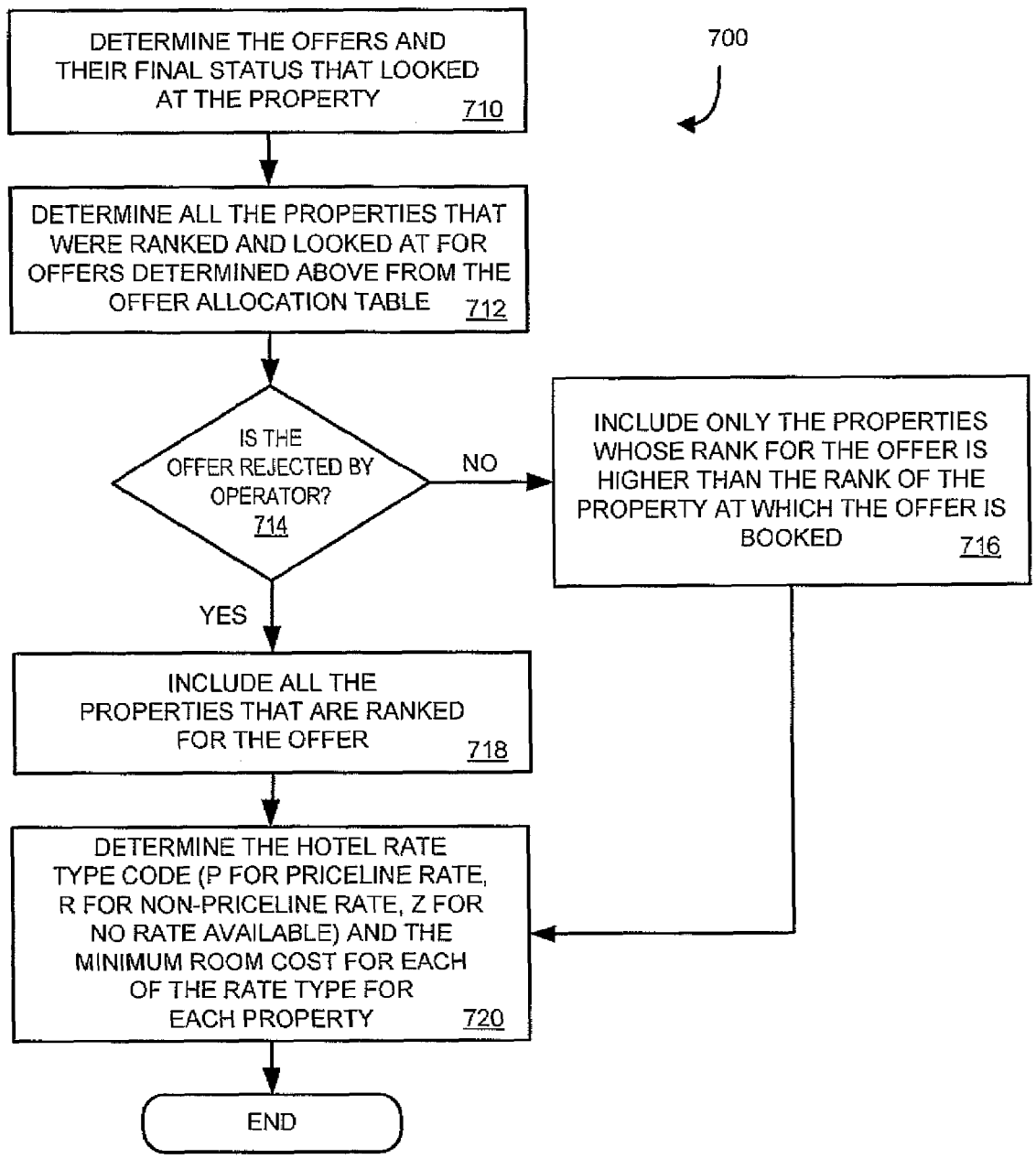
FIG. 23 is an exemplary process for determining the number of offers received for a particular seller.

A second simulation program from the plurality of programs 30 may be used according to the present invention, and in conjunction with the system optimization program described above, to determine a maximum revenue that can be generated per available room in the buyer-driven commerce system. The third program preferably includes a process 700 for determining the number of offers received for a particular seller as depicted in FIG. 23. The process 700 begins at step 710 where the system server 12 retrieves a plurality of stored purchase offers and the final status of the purchase offer (e.g. accepted or rejected) for a particular hotel property. At step 712, the system server 12 determines all the properties which were considered for the retrieved purchase offers. Next, at step 714, the system server 12 determines whether each of the offers were rejected. If a purchase offer was rejected, the process continues to step 718 below. Otherwise the process 700 continues to step 716 wherein the server selects properties whose rating is higher than the property at which the offer was booked. The process then continues to step 720 below.

At step 718, the server selects all the properties that were ranked for the submitted purchase offer From either step 716 or 720, the process 700 continues to step 720 wherein the system server 12 determines the hotel rate type and the minimum room cost for each selected property, after which process 700 ends.

Figure 24:
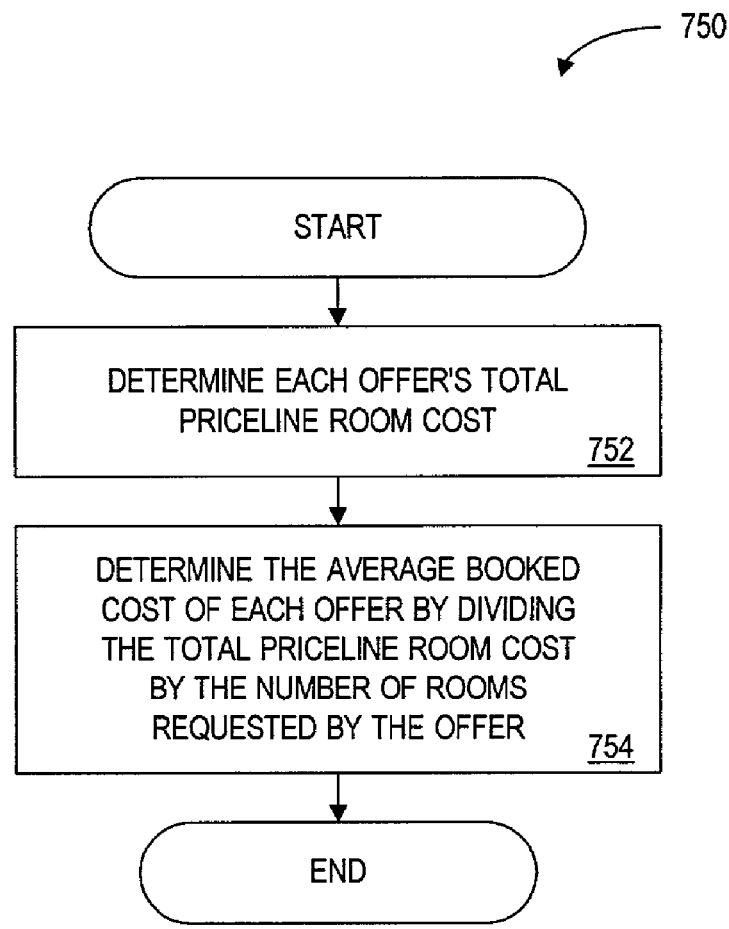
FIG. 24 is a flow chart depicting an exemplary process for determining an average booked cost for fulfilled purchase offers according to one embodiment of the present invention.

A second process 750 is provided in FIG. 24 to determine an average booked cost for the plurality of submitted purchase offers. The process 750 begins at step 752 where a total room cost is determined for each offer. The average booked cost is then determined at step 754 by dividing the total room cost by the number of rooms requested by each purchase offer. This value is then stored and process 750 ends.

Figure 25:
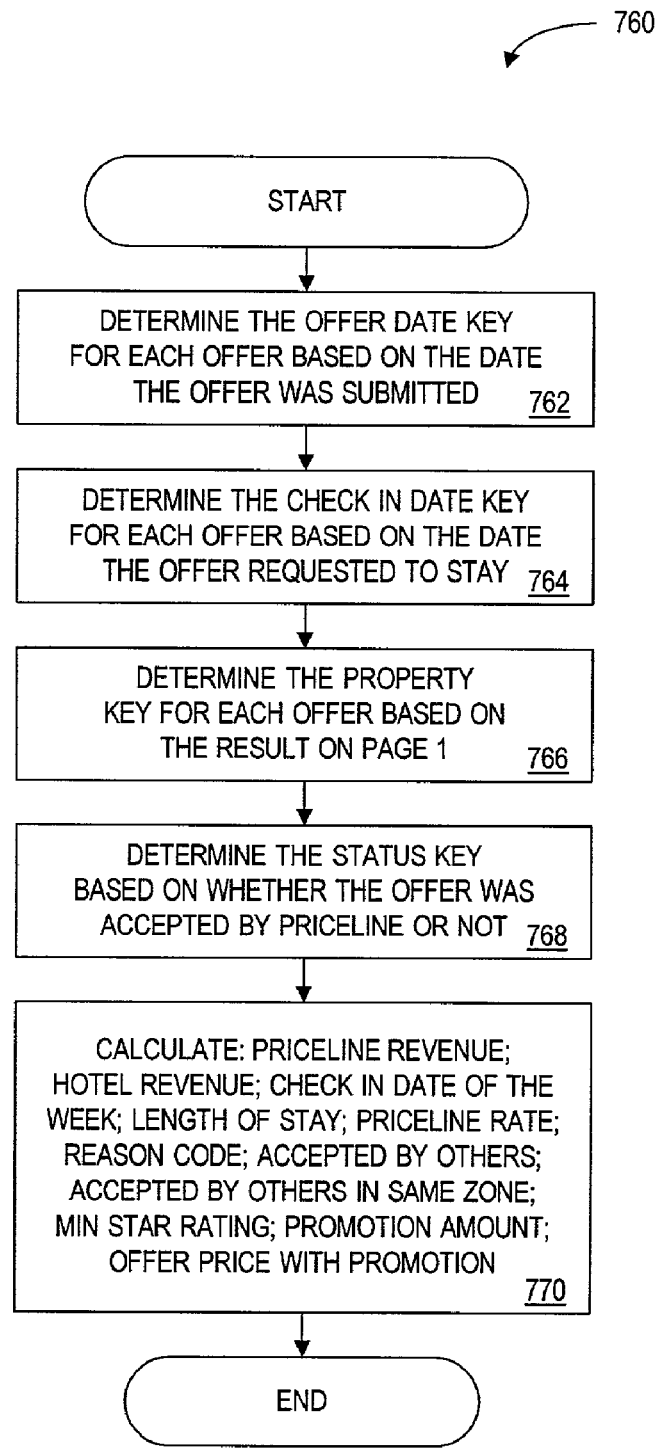
FIG. 25 is a flow chart depicting an exemplary process for determining aggregate purchase offer data from a plurality of submitted purchase offers according to an embodiment of the present invention.

FIG. 25 presents an exemplary process 760 for determining hotel statistical data from a plurality of submitted purchase offers is presented. The process 760 begins at step 762 where the offer date for each submitted purchase offer are collected. The requested check-in dates are then determined for each submitted purchase offer (step 764). The property type corresponding to each purchase offer is then determined (step 766). The status of each purchase offer is then determined (step 768).

From this data, the system server 12 then calculates and stores the following information for each property considered for each purchase offer: (1) revenue generated for the system operator from the plurality of purchase offers, (2) revenue generated for each seller, (3) check in date requested, (4) number of room nights requested, (5) rejection code (if any), (6) offer accepted by another seller, (7) offer accepted by another seller in same geographic location, (8) minimum star rating requested, (9) bump amount applied, and (10) final offer price including bump amount (step 770). After this data is determined, the process 760 ends.

Figure 26:
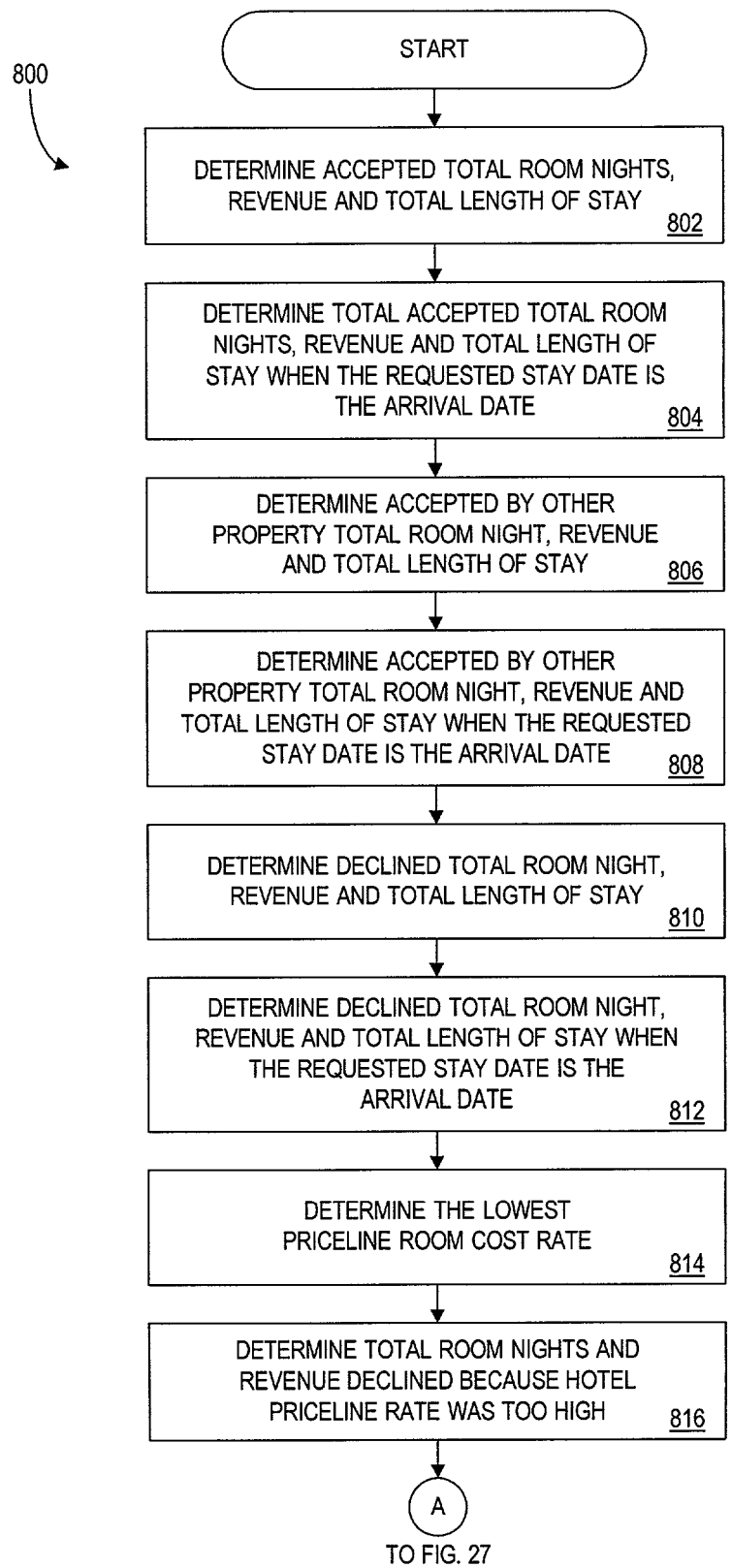
FIGS. 26-33 are flow charts depicting exemplary processes for generating demand reports in accordance with an embodiment of the present invention.
Figure 27:
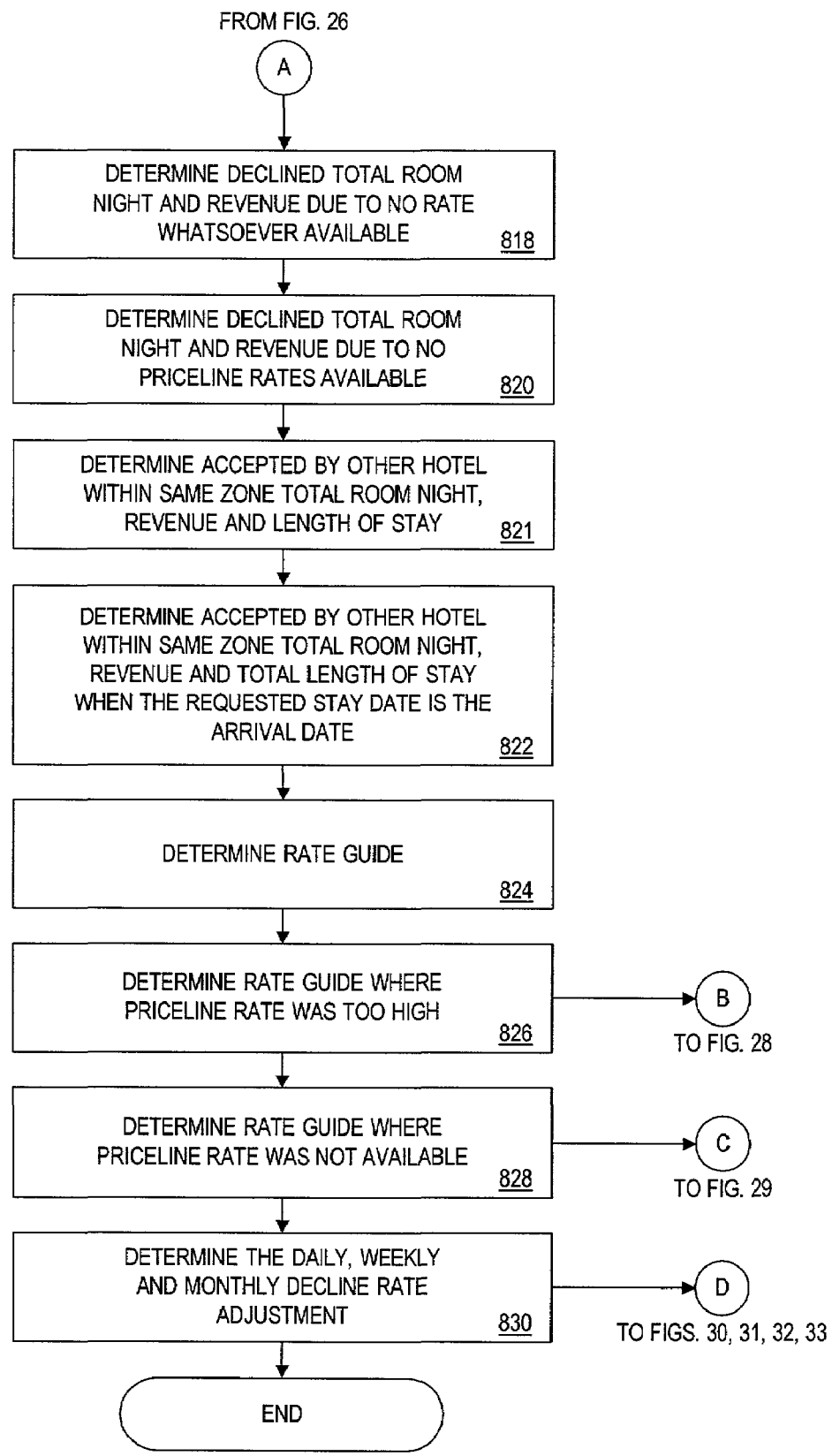

Turning now to FIGS. 26-27, the second simulation program from the plurality of programs 30 includes a process 800 for determining aggregate purchase offer data from a plurality of submitted purchase offers. The process 800 begins at step 802 wherein the total room nights, revenue generated and total length of stay is calculated for each accepted purchase offer. The system server 12 then determines the total room nights, revenue and length of stay when the requested stay date is the arrival date (step 804). The system server 12 then determines the total room nights, revenue and length of stay when the purchase offer is accepted by another seller (step 806). The system server 12 next calculates a total number of room nights, revenue and length of stay when the requested stay date is the arrival date (step 808).

The system server 12 next calculates the declined total room nights, revenue and length of stay for each property (step 810). The system server 12 then calculates the declined total room nights, revenue and length of stay for each property when the stay date is the requested arrival date (step 812).

The system server 12 then determines the lowest room cost rate for each purchase offer (step 814). The system then determines the number of room nights and revenue lost due to the room cost being too high (step 816)

Referring now to FIG. 27, the process 800 continues at step 818 where the system server 12 determines the declined total room nights and revenue due to there being no bookings available for the predetermined time period (e.g. the hotel was full during the time period). The system server 12 then determines the declined total number of room nights and lost revenue due to bookings not being available for the system operator of the buyer-driven commerce system (step 820).

The system server 12 then determines the total room nights, revenue and length of stay lost to other properties within the same geographic location (step 821). The system server 12 then determines the total number of room nights, revenue and length of stay lost to other properties within the same geographic location when the requested stay date is the arrival date (step 822).

At step 824, the system server determines an appropriate rate guide, or values for acceptance parameters, that a seller should consider adopting based on the stored demand data. The process for determining the rate guide is discussed further below with respect to FIG. 30.

At step 826, the system server 12 determines an appropriate rate guide where the price to the system operator is too high. The process for determining this rate guide is discussed further below with respect to FIG. 28.

At step 828, the system server 12 determines an appropriate rate guide where a booking was not available for the buyer-driven commerce system The process for determining this rate guide is discussed further below with respect to FIG. 29.

Finally, at step 830, the system server 12 determines a daily, weekly, and monthly rate decline adjustment. The process for determining these adjustments are discussed further below with respect to FIGS. 30-33.

Figure 28:
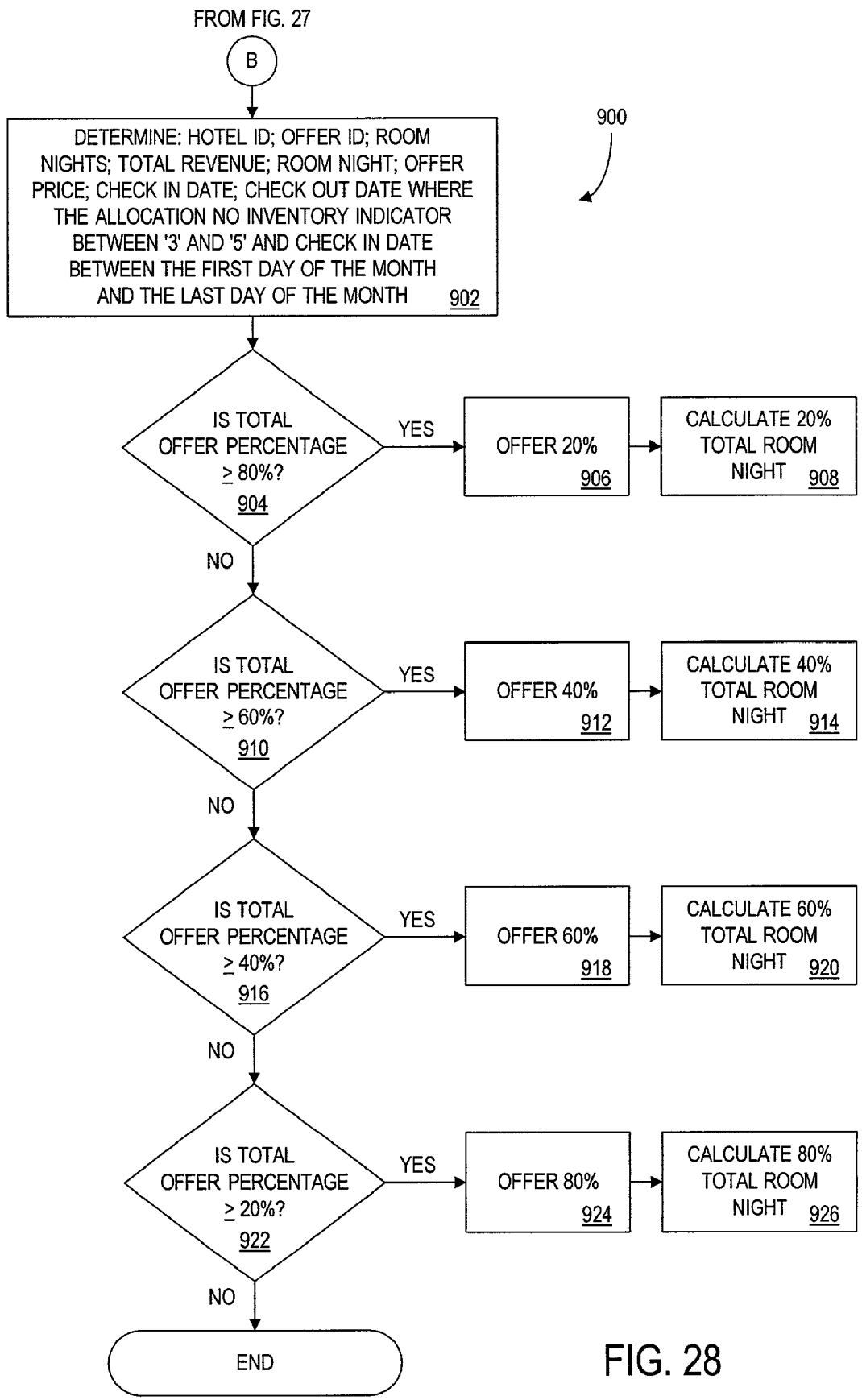

Referring now to FIG. 28, a process 900 is presented for determining a preview rate guide where the room cost to the system operator is too high. The process 900 begins at step 902 where an offer identifier, a total number of room nights, a total revenue, an offer price and check-in/check-out dates are retrieved from the demand database 32. For each offer, and for each hotel property, the following steps are iteratively repeated. At step 904, the system server 12 determines if the percentage of declined offers corresponding to the hotel property is greater than or equal to 80% of the total offers which match the property (referred to hereinafter as "total offer percentage"). If not, the process continues to step 910 below. Otherwise, the process continues to step 906 where the offer price is reduced 20%. Then the total number of room nights at the reduced offer is calculated (step 908) and provided in a report to the seller, such as that provided in FIGS. 41 and 43 discussed below.

At step 910, the system server 12 determines if the total offer percentage is at least 60%. If not, the process continues to step 916 below. Otherwise, the process continues to step 912 where the offer price is reduced 40%. Then the total number of room nights at the reduced offer is calculated (step 914) and provided in a report to the seller, such as the report provided in FIGS. 41 and 43.

At step 916, the system server 12 determines if the total offer percentage is at least 40%. If not, the process continues to step 922 below. Otherwise, the process continues to step 918 where the offer price is reduced 60%. Then the total number of room nights at the reduced offer is calculated (step 920) and provided in a report to the seller, such as that provided in FIGS. 41 and 43.

At step 922, the system server 12 determines if the total offer percentage is at least 20%. If not, the process continues to the next hotel property. Otherwise, the process continues to step 924 where the offer price is reduced 80% Then the total number of room nights at the reduced offer is calculated (step 926) and provided in a report to the seller. After each offer and each hotel have been analyzed, the process 900 ends.

Figure 29:
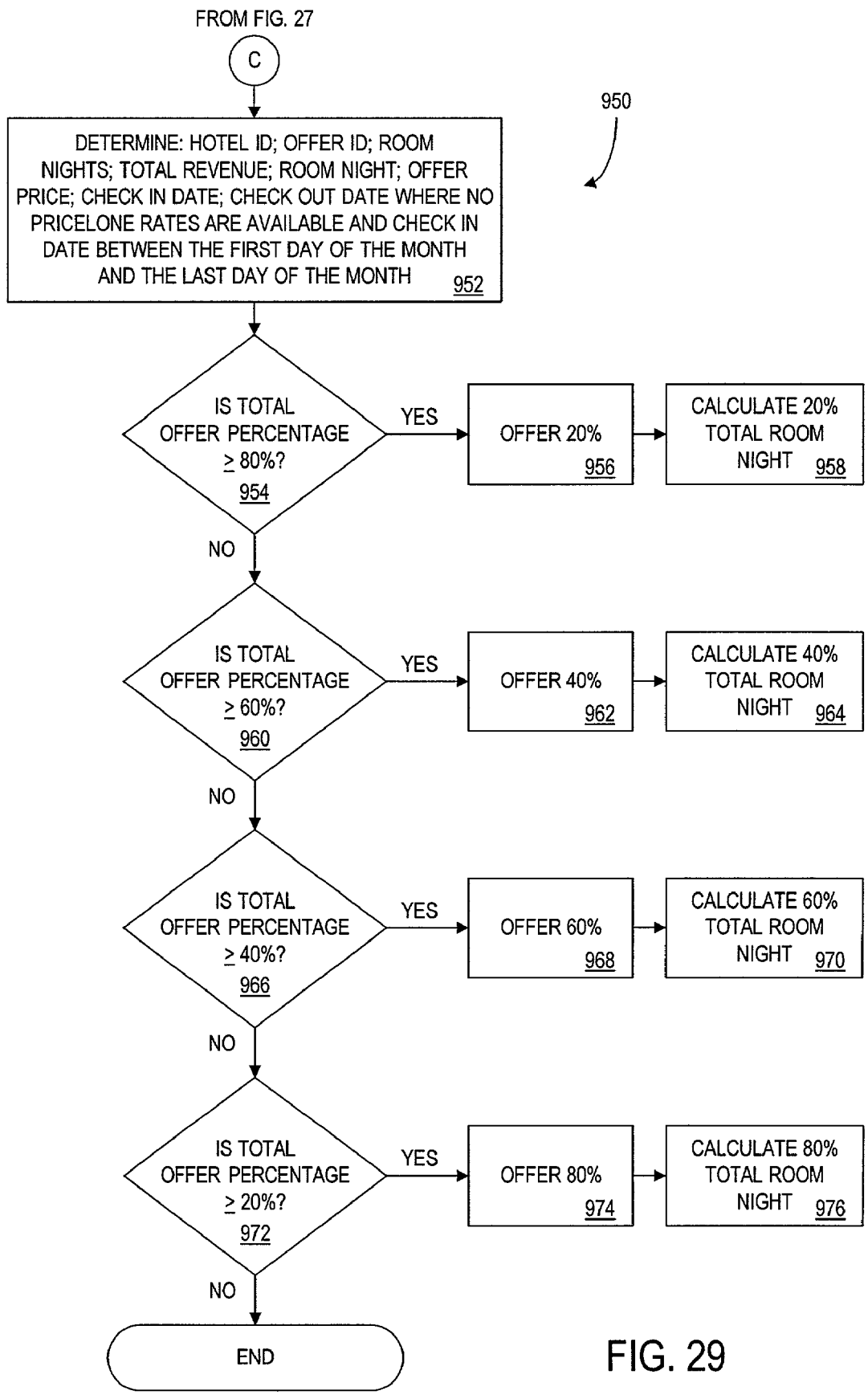

Referring now to FIG. 29, a process 950 is presented for determining a review rate guide where no booking is available. Steps 952 to 976 of process 950 correspond directly to steps 902-926 of process 900 described above with respect to FIG. 28. A report corresponding to that presented in FIGS. 42 and 43 may then be generated from this process 950

Figure 30:
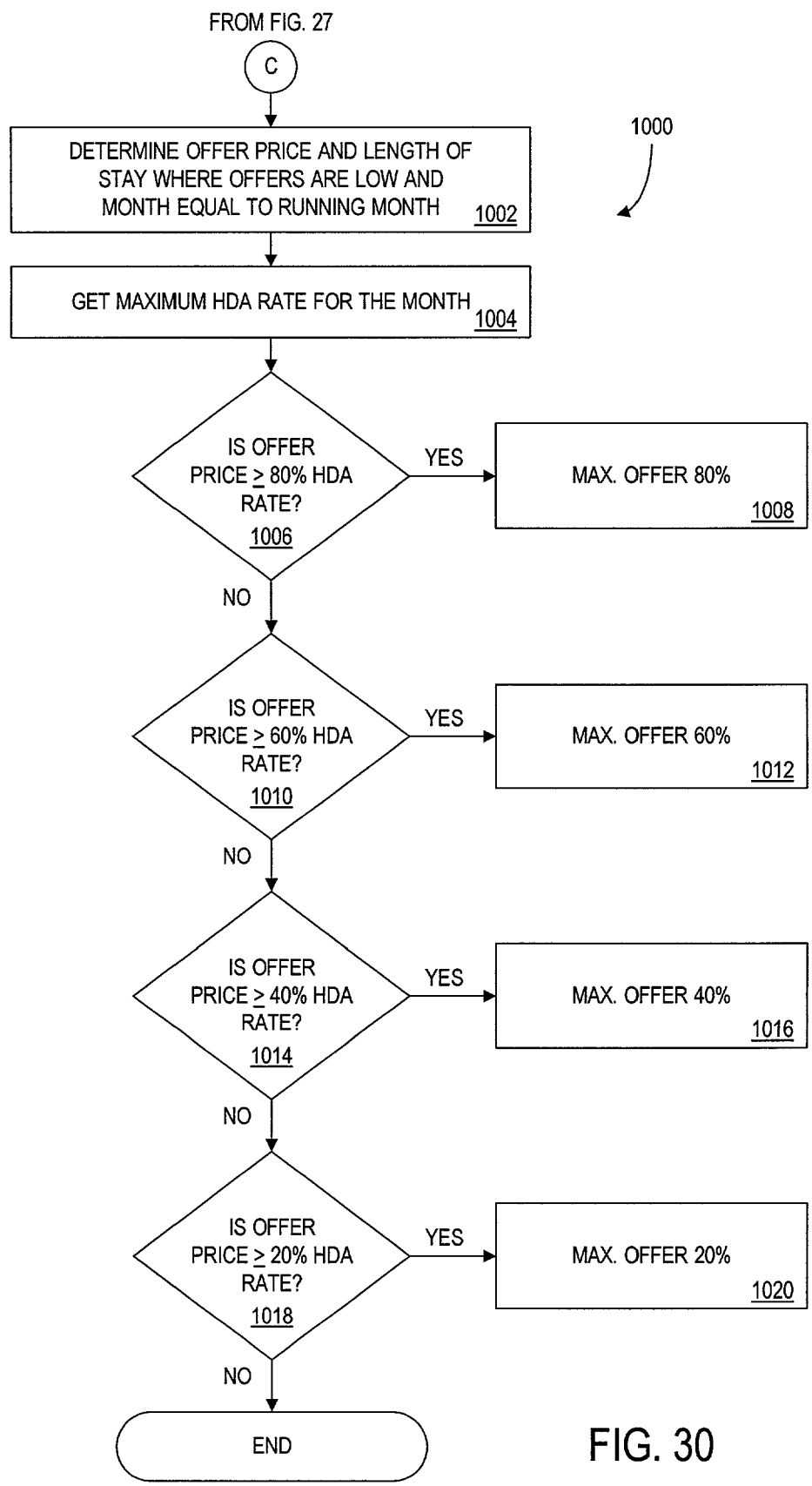

Referring now to FIG. 30, an exemplary process 1000 is presented for determining a monthly rate adjust based on stored demand data. The process 100 begins at step 1002, where the system server 12 determines an offer price and a length of stay requested where the purchase offers are rejected as being too low in offered price. The system server then retrieves the maximum highest declined available (HDA) rate for the month which corresponds to the maximum room rate charged by the hotel owner to the system operator (step 1004). The following steps are then performed iteratively for each property and each month at the maximum HDA rate:

At step 1006, for a particular offer, the system server 12 determines whether the offer price is at least 80% of the HDA. If so, the process continues to step 1008 where the number of room nights that would be booked at 80% of the HDA rate is determined for presentation in a report such as that displayed in FIG. 47. Otherwise, the process continues to step 1010.

At step 1010, the system server determines whether the offer price is at least 60% of the HDA. If so, the process continues to step 1012 where the number of room nights that would be booked at 60% of HDA is determined. This number may be used to generate a report to the hotel operator, such as that presented in FIG. 47 Otherwise, the process continues to step 1014.

At step 1014, the system server determines whether the offer price is at least 40% of the HDA. If so, the process continues to step 1008 where the number of room nights that would be booked at 40% of the HDA rate is determined for presentation in a report such as that displayed in FIG. 47. Otherwise, the process continues to step 1018.

At step 1018, the system server determines whether the offer price is at least 20% of the HDA. If so, the process continues to step 1008 where the number of room nights that would be booked at 20% of the HDA rate is determined for presentation in a report such as that displayed in FIG. 47 and the process 1000 iteratively repeats as described above.

Figure 31:
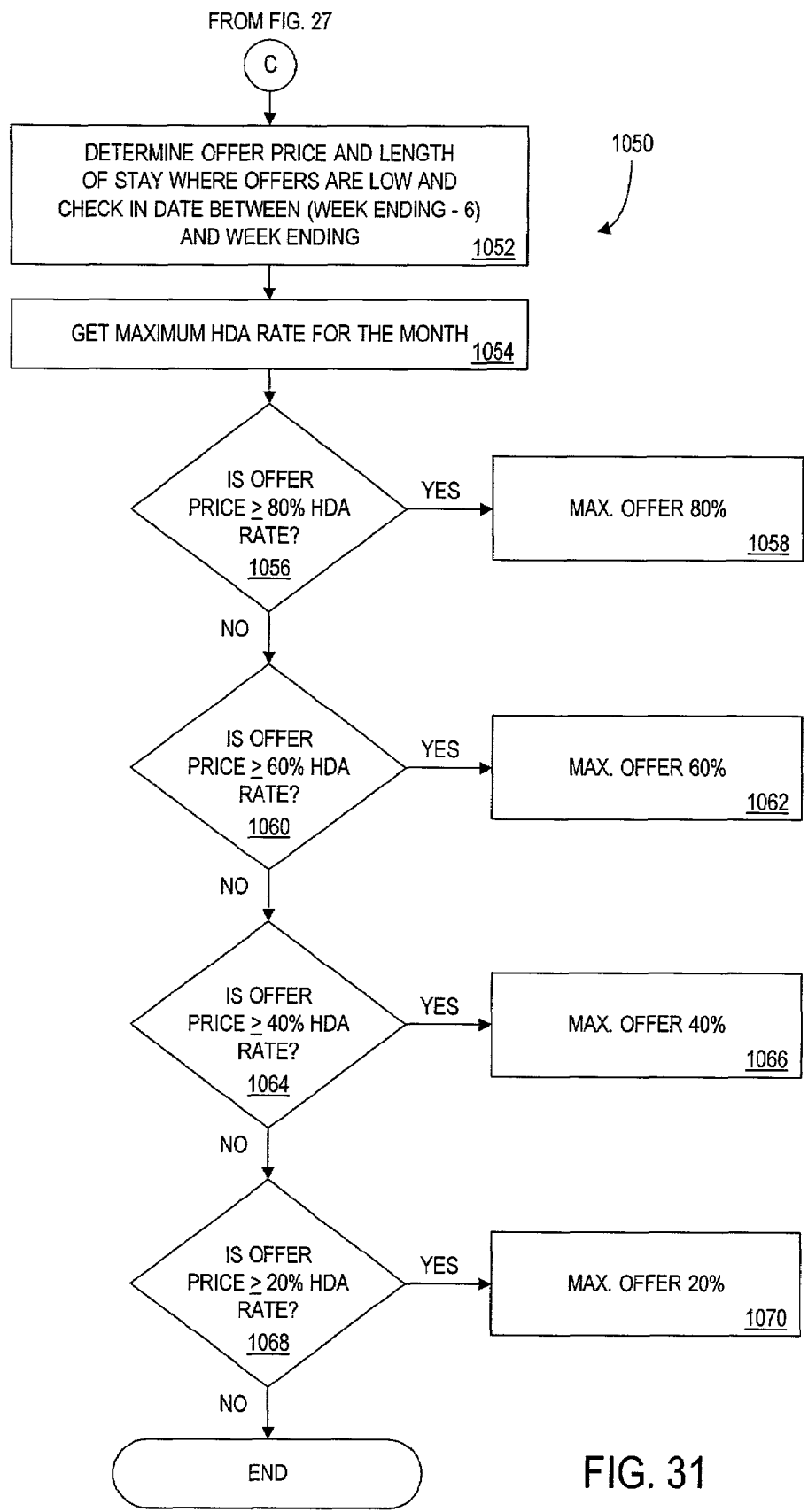

Turning now to FIG. 31, therein is depicted an exemplary process 1050 for determining a weekly rate adjustment based on stored demand data. Steps 1052 through 1070 correspond directly to steps 1002 through 1020 of FIG. 30 except that the purchase offer data is for a predetermined week in which demand data was collected. The report generated from process 1050 may correspond to the report shown in FIG. 46.

Figure 32:
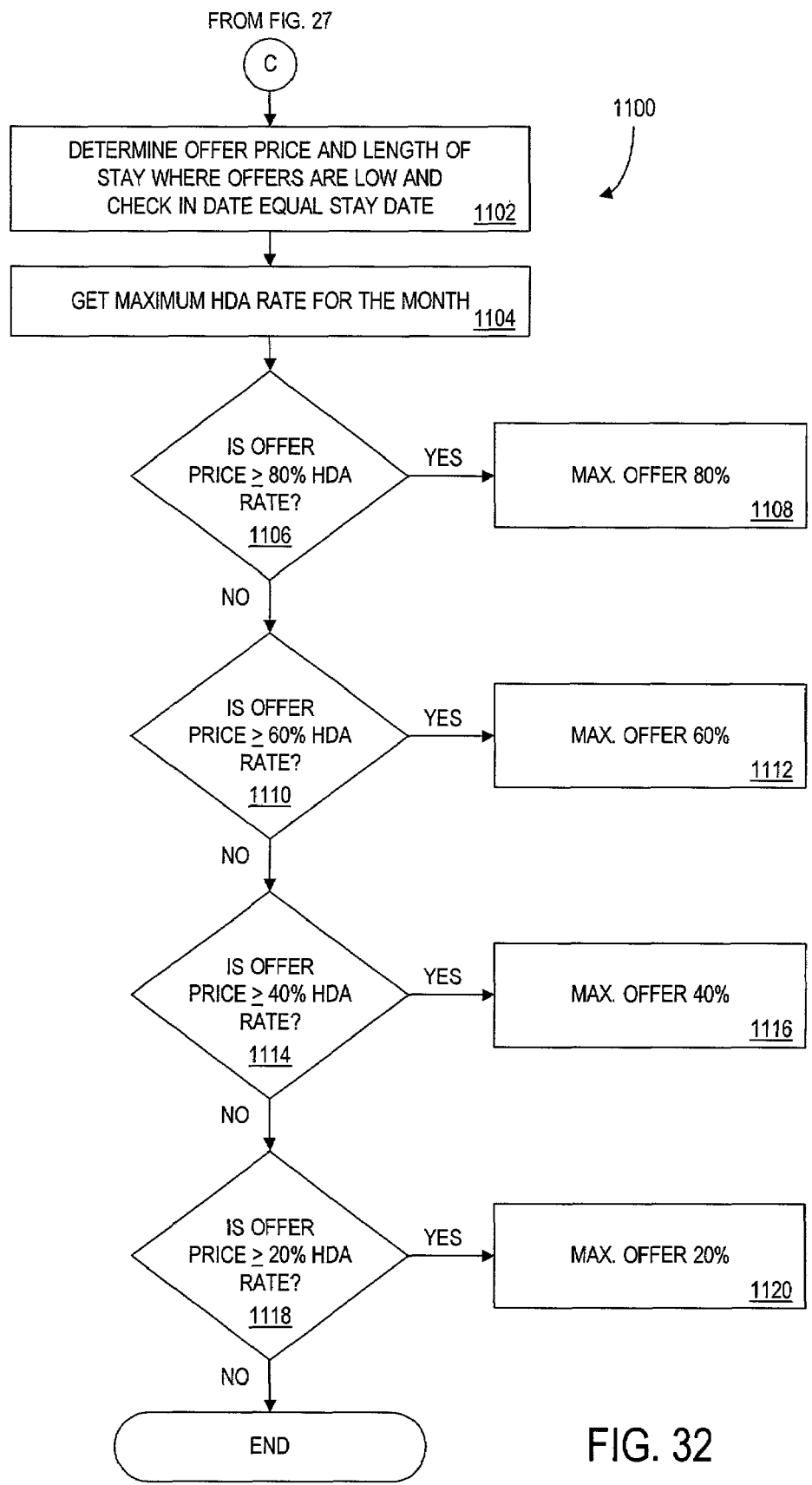
Figure 33:
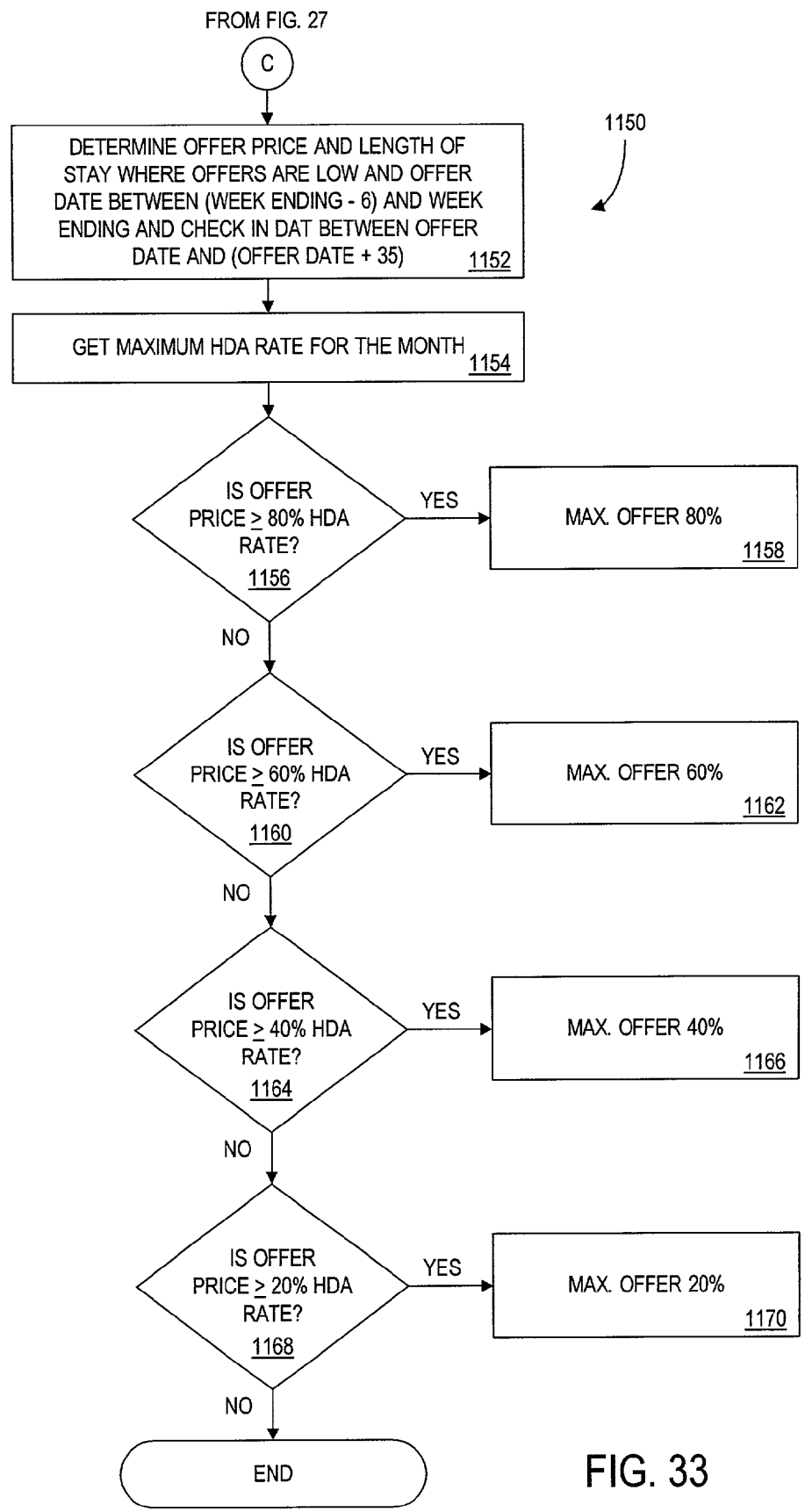

Turning now to FIG. 32, therein is depicted an exemplary process 1100 for determining a daily rate adjustment based on stored demand data. Steps 1102 through 11120 correspond directly to steps 1002 through 1020 of FIG. 33 except that the purchase offer data is retrieved only for a predetermined day in which demand data was collected. A report, such as that Referring now to FIG. 33, therein is depicted an exemplary process 1150 for determining a weekly arrival rate adjustment based on stored demand data. Steps 1152 through 1170 correspond directly to steps 1002 through 1020 of FIG. 30 except that the purchase offer data is for purchase offers received which correspond to a request to stay a predetermined week. Data from this process 1150 may be used to generate a report, such as that presented in FIGS. 38 and 39.

Figure 38:
Figure 39:
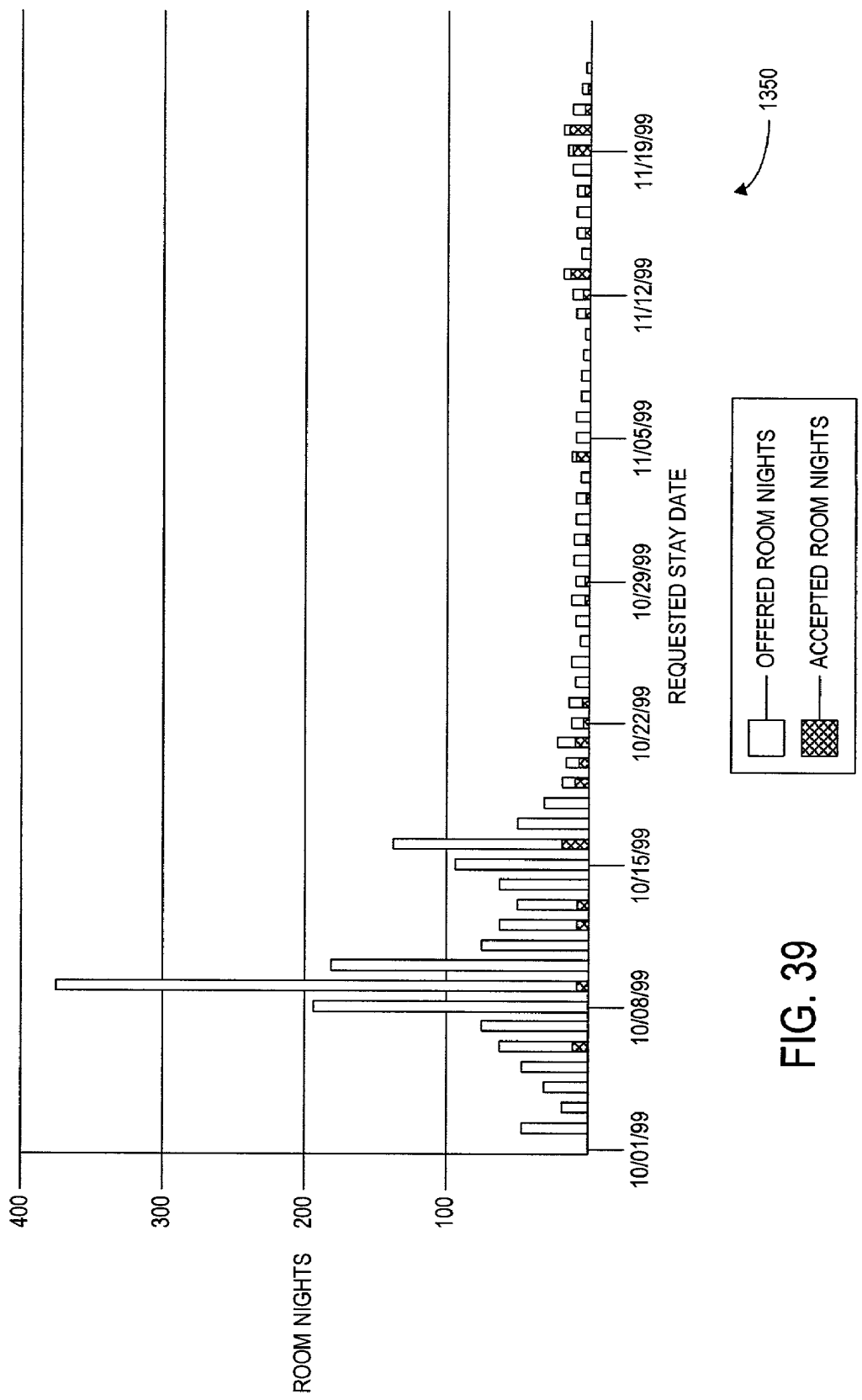
Figure 40:
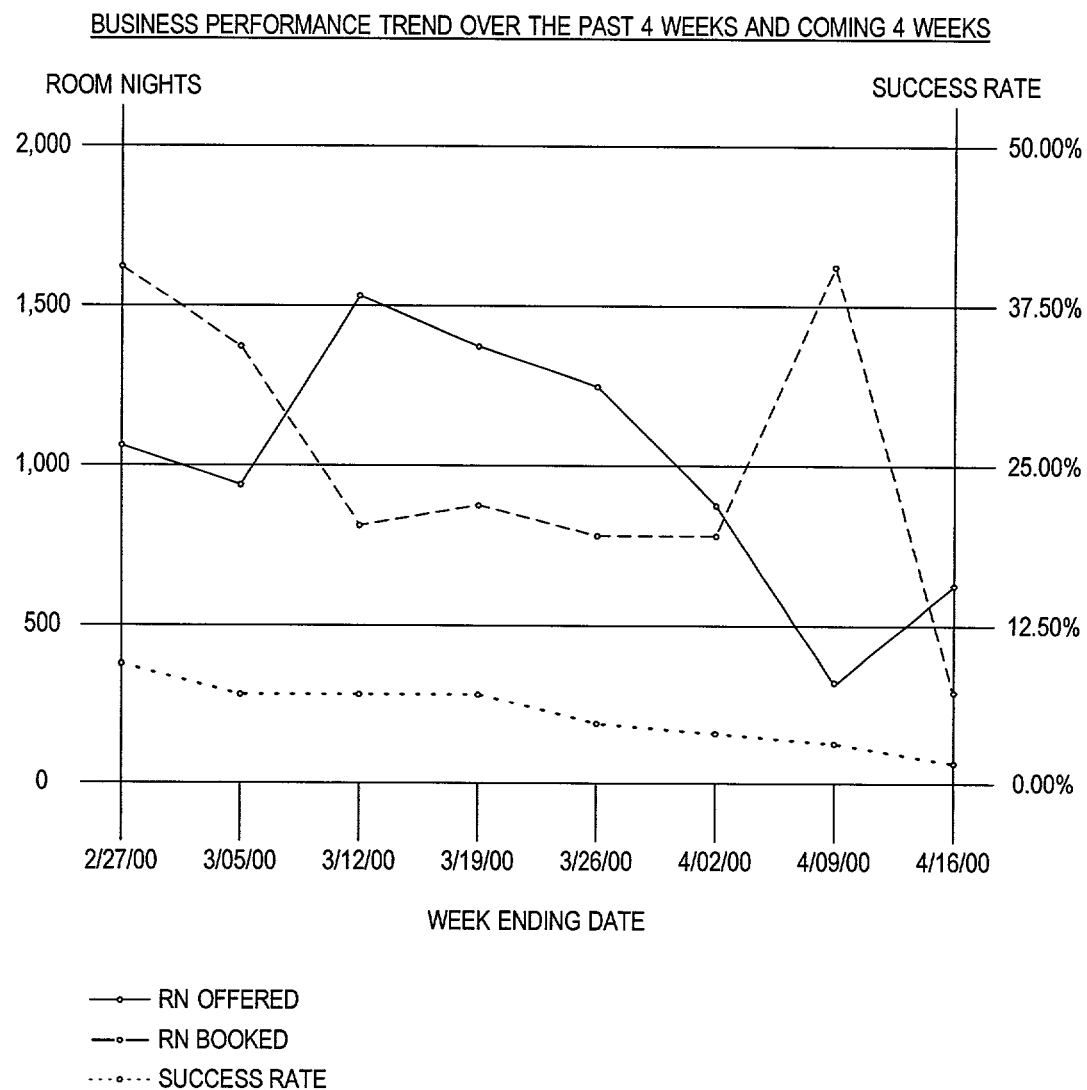
Figure 41:
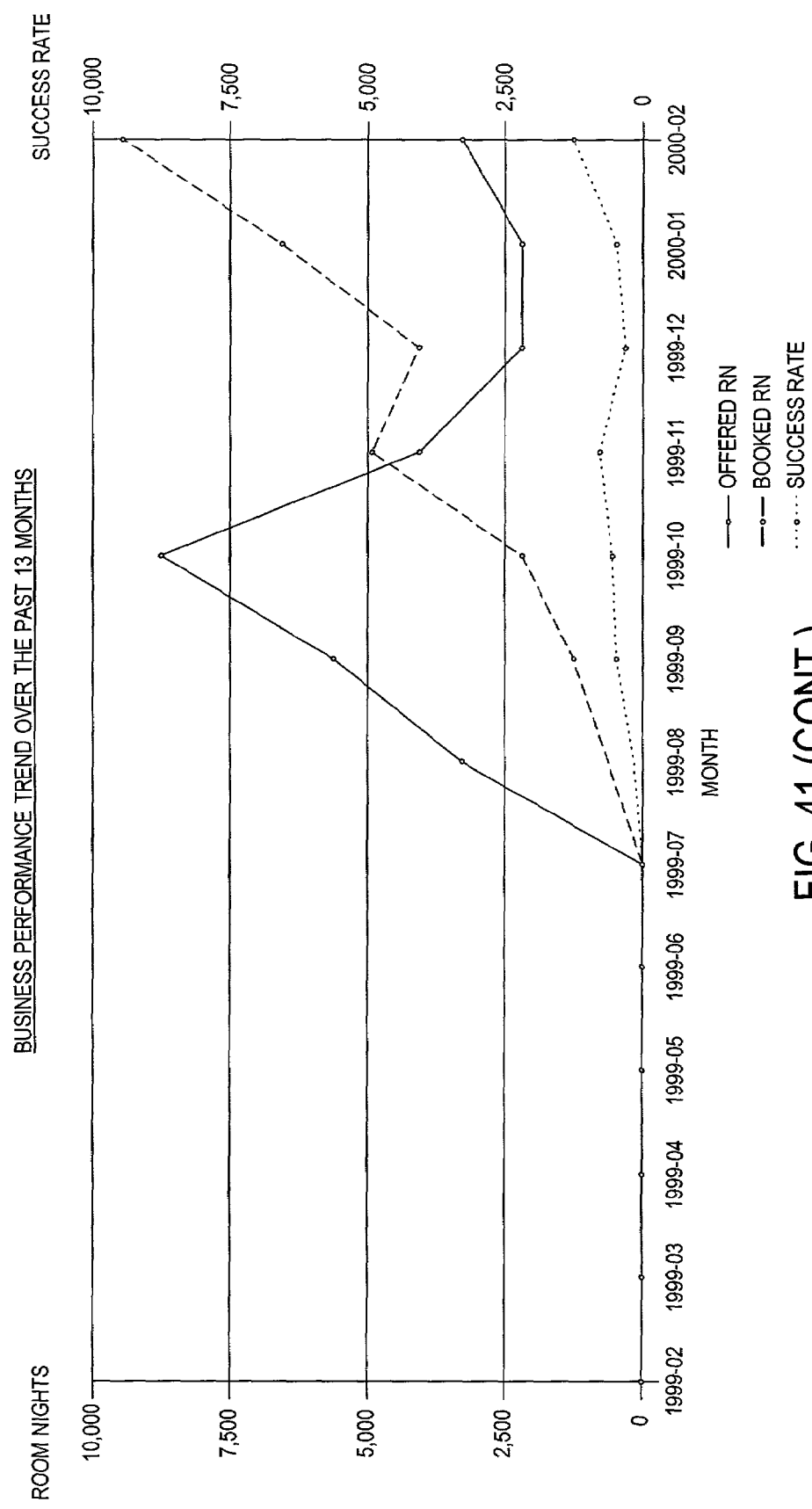
Figure 42:
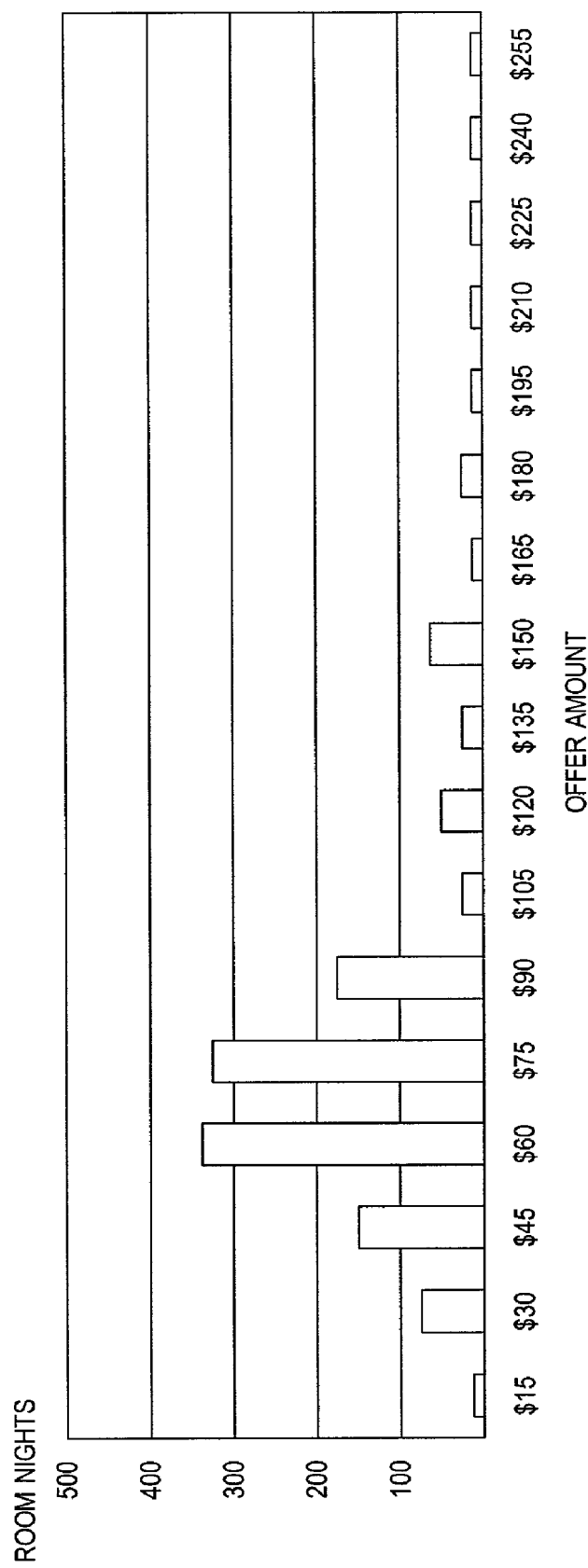
Figure 43:
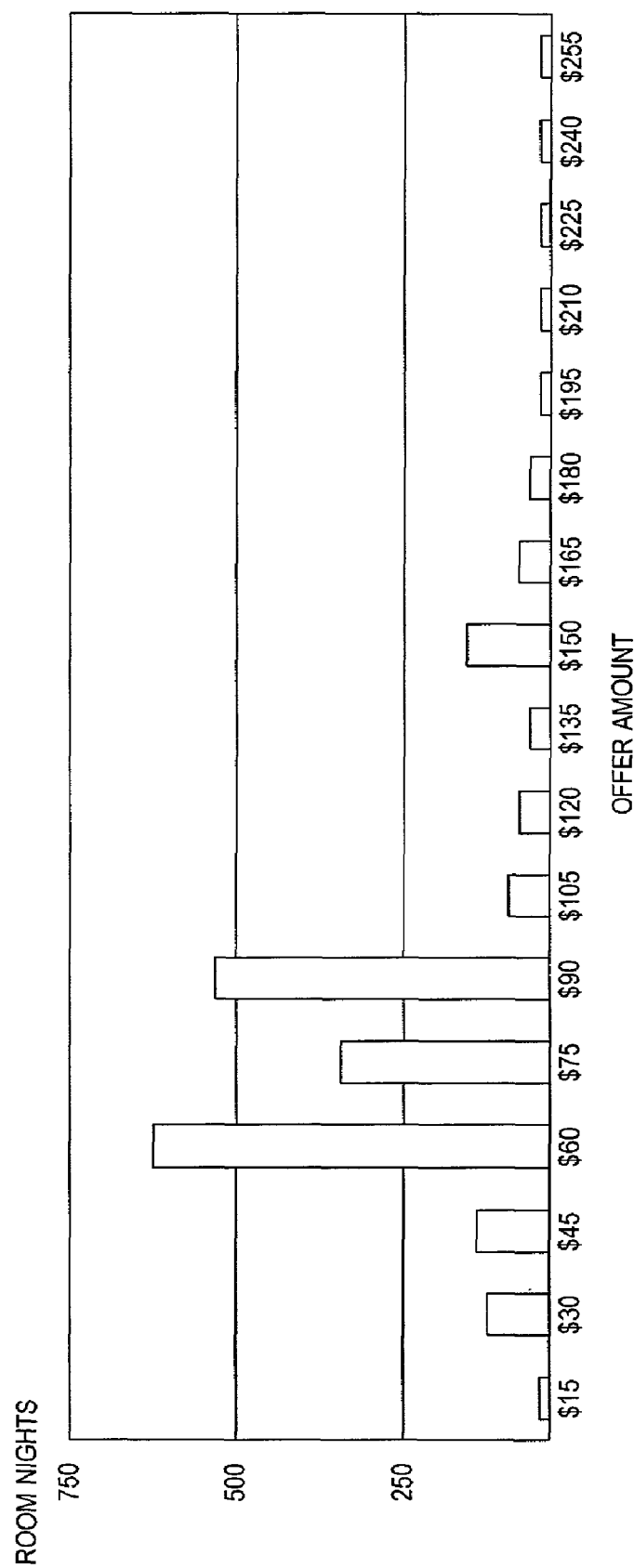

FIGS. 34-47 depict a plurality of reports which may be generated from the second simulation program from the plurality of programs 30 which includes the processes described above. The reports include a daily demand report 1200 as depicted in FIGS. 34-37, a weekly demand report 1300 as depicted in FIGS. 38-39, a weekly business trend report 1400 as depicted in FIG. 40, a monthly business trend report 1500 as depicted in FIG. 41, a monthly business report 1600 as depicted in FIGS. 42 and 43, a monthly detailed booking review 1800 as depicted in FIGS. 44 and 45, a weekly reservation request report 1900 as depicted in FIG. 46 and monthly reservation request report 2000 as depicted in FIG. 47. Each of these reports may be presented to sellers participating in the buyer-driven commerce system. The reports indicate market demand trends as well as presenting reports of revenues or bookings lost due to poorly-selected acceptance parameters. The reports further present information as to how much revenue and bookings may be anticipated based on simulated changes to these acceptance parameters. In this manner, a seller participating in the buyer-driven commerce system may increase revenues and bookings by reviewing the simulated data and adjusting their acceptance parameters accordingly.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for determining an optimized acceptance rate for purchase offers submitted to a buyer-driven commerce system, comprising:
   receiving a plurality of available bookings from a seller, each available booking including an acceptance parameter and at least one of a date of availability, a room type, and a geographic location;
   receiving a plurality of purchase offers for the plurality of bookings;
   storing a plurality of rejected purchase offers from the plurality of purchase offers; and
   determining a number of unaccepted purchase offers which would be accepted based on a change of the acceptance parameter.

2. The method of claim 1, wherein the booking corresponds to a hotel reservation.

3. The method of claim 2, wherein the acceptance parameter comprises at least one of:
   a customer identifier, a payment identifier, a rating for a hotel, a location for a hotel, a number of room nights, an occupancy of the room, a room type and a price.

4. The method of claim 1, wherein said determining further comprises:
   determining a number of the unaccepted purchase offers from a predetermined period of time which would be accepted based on a change of the acceptance parameter.

5. The method of claim 4, wherein the predetermined time is one week.

6. The method of claim 1, wherein said determining further comprises:
   selecting the rejected purchase offers which are original purchase offers; and
   determining a number of the original, rejected purchase offers which would be accepted based on a change of the acceptance parameter.

7. The method of claim 1, wherein the acceptance parameter comprises at least one of:
   a minimum price and a minimum margin amount.

8. The method of claim 7, wherein the change comprises at least one of:
   a second minimum price and a second minimum margin amount.

9. The method of claim 8, wherein the second minimum price is less than the minimum price.

10. The method of claim 8, wherein the second minimum margin is less than the minimum margin amount.

11. The method of claim 1, wherein said determining further comprises:
    receiving a plurality of inputs of simulated changes to the acceptance parameter.

12. The method of claim 11, wherein said determining further comprises:
    determining an optimum value for the acceptance parameter based on the plurality of inputs.

13. The method of claim 12, wherein the optimum value corresponds to a maximum revenue for a predetermined amount of margin.

14. The method of claim 12, wherein the optimum value corresponds to a maximum number of room nights for a predetermined margin amount.

15. The method of claim 12, wherein the optimum value corresponds to a maximum margin for a predetermined number of room nights.

16. The method of claim 1, further comprising:
    changing the acceptance parameter based on a simulated acceptance rate.

17. The method of claim 1, further comprising:
    generating a report including the number.

18. The method of claim 17, further comprising:
    transmitting the report to the seller.

19. The method of claim 18, further comprising, after said transmitting:
    receiving, from the seller, a change to the acceptance parameter.

20. A computer-readable medium encoded with processing instructions for implementing a method for determining an optimized acceptance rate for purchase offers submitted to a buyer-driven commerce system, the method comprising:
    receiving a plurality of available bookings from a seller, each available booking including an acceptance parameter and at least one of a date of availability, a room type, and a geographic location;
    receiving a plurality of purchase offers for the plurality of bookings;
    storing a plurality of rejected purchase offers from the plurality of purchase offers; and
    determining a number of unaccepted purchase offers which would be accepted based on a change of the acceptance parameter.

21. An apparatus for determining an optimized acceptance rate for purchase offers submitted to a buyer-driven commerce system, comprising:
    means for receiving a plurality of available bookings from a seller, each available booking including an acceptance parameter and at least one of a date of availability, a room type, and a geographic location;
    means for receiving a plurality of purchase offers for the plurality of bookings;
    means for storing a plurality of rejected purchase offers from the plurality of purchase offers; and
    means for determining a number of unaccepted purchase offers which would be accepted based on a change of the acceptance parameter.

22. An apparatus for determining an optimized acceptance rate for purchase offers submitted to a buyer-driven commerce system, comprising:
    a processor; and
    a memory in electronic communication with the processor, the memory encoded with processing instructions for directing the processor to:
    receive a plurality of available bookings from a seller, each available booking including an acceptance parameter and at least one of a date of availability, a room type, and a geographic location;
    receive a plurality of purchase offers for the plurality of bookings;
    store a plurality of rejected purchase offers from the plurality of purchase offers; and
    determine a number of unaccepted purchase offers which would be accepted based on a change of the acceptance parameter.

23. A method for determining an optimized acceptance rate for purchase offers submitted to a buyer-driven commerce system, comprising:
    providing a plurality of available bookings, each including an acceptance parameter and at least one of a date of availability, a room type, and a geographic location;

receiving an indication of a plurality of unacceptable purchase offers submitted for at least one of the available bookings; and receiving a second indication of a number of unacceptable purchase offers which would be accepted based on a simulated change of the acceptance parameter.

24. The method of claim 23, wherein the plurality of bookings each comprise a hotel reservation.

25. The method of claim 24, wherein each of the unacceptable purchase offers comprises at least one of:
a customer identifier, a payment identifier, a rating for a hotel, a location for a hotel, a number of room nights, an occupancy of the room, a room type and a price.

26. The method of claim 23, wherein said receiving the second indication further comprises:
receiving a calculation of a simulated acceptance rate based on the simulated change and the plurality of unaccepted purchase offers stored within a predetermined time.

27. The method of claim 26, wherein the predetermined time is one week.

28. The method of claim 23, wherein said receiving the second indication further comprises:
receiving a calculation of a simulated acceptance rate based on the simulated change and the plurality of unaccepted purchase offers.

29. The method of claim 23, wherein said receiving the second indication further comprises:
receiving a calculation of a simulated acceptance rate based on the simulated change and the plurality of unaccepted purchase offers which are not resubmitted purchase offers.

30. The method of claim 23, wherein the acceptance parameter comprises at least one of:
a minimum price and a minimum margin amount.

31. The method of claim 30, wherein the simulated change comprises at least one of:
a second minimum price and a second minimum margin amount.

32. The method of claim 31, wherein the second minimum price is less than the minimum price.

33. The method of claim 31, wherein the second minimum margin is less than the minimum margin amount.

34. The method of claim 23, further comprising:
transmitting a plurality of inputs of simulated changes to the acceptance parameter.

35. The method of claim 24, wherein said receiving a second indication further comprises:
receiving an optimum value for the acceptance parameter based on the plurality of inputs.

36. The method of claim 35, wherein the optimum value corresponds to a maximum revenue for a predetermined amount of margin.

37. The method of claim 35, wherein the optimum value corresponds to a maximum number of room nights for a predetermined margin amount.

38. The method of claim 35, wherein the optimum value corresponds to a maximum margin for a predetermined number of room nights.

39. The method of claim 28, further comprising: changing the acceptance parameter based on the simulated acceptance rate.

40. A computer-readable medium encoded with processing instructions for implementing a method for determining an optimized acceptance rate for purchase offers submitted to a buyer-driven commerce system, the method comprising:

providing a plurality of available bookings, each including an acceptance parameter and at least one of a date of availability, a room type, and a geographic location;

receiving an indication of a plurality of unacceptable purchase offers submitted for at least one of the available bookings; and receiving a second indication of a number of the unacceptable purchase offers which would be accepted based on a simulated change of the acceptance parameter.

41. An apparatus for determining an optimized acceptance rate for purchase offers submitted to a buyer-driven commerce system, comprising:
means for providing a plurality of available bookings, each including an acceptance parameter and at least one of a date of availability, a room type, and a geographic location;
means for receiving an indication of a plurality of unacceptable purchase offers submitted for at least one of the available bookings; and
means for receiving a second indication of a number of the unacceptable purchase offers which would be accepted based on a simulated change of the acceptance parameter.

42. An apparatus for determining an optimized acceptance rate for purchase offers submitted to a buyer-driven commerce system, comprising:
a processor; and
a memory in electronic communication with the processor, the memory for storing a plurality of processing instructions directing the processor to:
provide a plurality of available bookings, each including an acceptance parameter and at least one of a date of availability, a room type, and a geographic location;
receive an indication of a plurality of unacceptable purchase offers submitted for at least one of the available bookings; and
receive a second indication of a number of the unacceptable purchase offers which would be accepted based on a simulated change of the acceptance parameter.

43. A method for optimizing performance of a buyer-driven commerce system, comprising:
receiving a plurality of available bookings from a seller, the plurality of bookings having an acceptance parameter;
receiving a plurality of purchase offers for the available bookings from at least one user;
determining which of the plurality of purchase offers are rejected;
storing demand data associated with the rejected purchase offers;
entering a simulated change of the acceptance parameter; and
determining a simulated acceptance rate based on the stored demand data and the simulated change.

44. The method of claim 43, wherein each of the bookings corresponds to a hotel reservation.

45. The method of claim 43, wherein the demand data comprises at least one of:
a customer identifier, a payment identifier, a rating for a hotel, a location for a hotel, a number of room nights, an occupancy of the room, a room type and a price.

46. The method of claim 43, wherein said determining further comprises:
calculating a simulated acceptance rate based on the simulated change and the demand data stored within a predetermined time.

47. The method of claim 46, wherein the predetermined time is one week.

48. The method of claim 43, wherein said determining further comprises:
calculating a simulated acceptance rate based on the simulated change and the demand data corresponding to rejected purchase offers which are not resubmitted purchase offers.

49. The method of claim 43, wherein the acceptance parameter comprises at least one of:
a minimum price and a minimum margin amount.

50. The method of claim 49, wherein the simulated change comprises at least one of:
a second minimum price and a second minimum margin amount.

51. The method of claim 50, wherein the second minimum price is less than the minimum price.

52. The method of claim 50, wherein the second minimum margin is less than the minimum margin amount.

53. The method of claim 43, further comprising:
receiving a plurality of inputs of simulated changes to the acceptance parameter.

54. The method of claim 53, wherein said determining further comprises:
determining an optimum value for the acceptance parameter based on the plurality of inputs.

55. The method of claim 54, wherein the optimum value corresponds to a maximum revenue for a predetermined amount of margin.

56. The method of claim 54, wherein the optimum value corresponds to a maximum number of room nights for a predetermined margin amount.

57. The method of claim 54, wherein the optimum value corresponds to a maximum margin for a predetermined number of room nights.

58. The method of claim 43, further comprising:
changing the acceptance parameter based on the simulated acceptance rate.

59. A computer-readable medium encoded with processing instructions for implementing a method for optimizing performance of a buyer-driven commerce system, comprising:
receiving a plurality of available bookings from a seller, the plurality of bookings having an acceptance parameter;
receiving a plurality of purchase offers for the available bookings from at least one user;
determining which of the plurality of purchase offers are rejected;
storing demand data associated with the rejected purchase offers;
entering a simulated change of the acceptance parameter; and
determining a simulated acceptance rate based on the stored demand data and the simulated change.

60. An apparatus for optimizing performance of a buyer-driven commerce system, comprising:
means for receiving a plurality of available bookings from a seller, the plurality of bookings having an acceptance parameter;
means for receiving a plurality of purchase offers for the available bookings from at least one user;
means for determining which of the plurality of purchase offers are rejected; means for storing demand data associated with the rejected purchase offers; means for entering a simulated change of the acceptance parameter; and
means for determining a simulated acceptance rate based on the stored demand data and the simulated change.

61. An apparatus for optimizing performance of a buyer-driven commerce system, comprising:
a processor; and
a memory in electronic communication with the processor, the memory for storing a plurality of processing instructions directing the processor to:
receive a plurality of available bookings from a seller, the plurality of bookings having an acceptance parameter;
receive a plurality of purchase offers for the available bookings from at least one user;
determine which of the plurality of purchase offers are rejected; store demand data associated with the rejected purchase offers; receive a simulated change of the acceptance parameter; and
determine a simulated acceptance rate based on the stored demand data and the simulated change.

62. A method for optimizing an acceptance parameter in a buyer-driven commerce system, comprising:
receiving a booking from a seller and an acceptance parameter corresponding to the booking;
collecting demand data for a predetermined period of time, the demand data including at least one purchase offer corresponding to the booking which is not accepted by a seller based on the acceptance parameter; and
generating a report for the seller, the report including at least one new acceptance parameter and an estimated number of bookings corresponding to the new acceptance parameter based on the demand data.

63. The method of claim 62, further comprising:
transmitting the report to the seller.

64. The method of claim 63, further comprising:
receiving a changed acceptance parameter from the seller based on the report; and
inputting the changed acceptance parameter into the buyer-driven commerce system.

65. The method of claim 62, wherein the acceptance parameter comprises at least one of: a minimum price for the booking and a minimum margin amount for the booking.

66. The method of claim 62, wherein the booking corresponds to a hotel reservation at a predetermined hotel property.

67. The method of claim 62, wherein the estimated number of bookings is expressed as at least one of: an estimated change in revenue, an estimated amount of revenue, an estimated acceptance rate, an estimated change in an acceptance rate, and an estimated change in the number of bookings.

68. A computer readable medium encoded with processing instructions for implementing a method, performed by a computer, for optimizing an acceptance parameter in a buyer-driven commerce system, the method comprising:
receiving a booking from a seller and an acceptance parameter corresponding to the booking;
collecting demand data for a predetermined period of time, the demand data including at least one purchase offer corresponding to the booking which is not accepted by a seller based on the acceptance parameter; and
generating a report for the seller, the report including at least one new acceptance parameter and an estimated number of bookings corresponding to the new acceptance parameter based on the demand data.

69. An apparatus for optimizing an acceptance parameter in a buyer-driven commerce system, comprising:
- means for receiving a booking from a seller and an acceptance parameter corresponding to the booking;
- means for collecting demand data for a predetermined period of time, the demand data including at least one purchase offer corresponding to the booking which is not accepted by a seller based on the acceptance parameter; and
- means for generating a report for the seller, the report including at least one new acceptance parameter and an estimated number of bookings corresponding to the new acceptance parameter based on the demand data.

70. An apparatus for optimizing an acceptance parameter in a buyer-driven commerce system, comprising:
- a processor; and
- a memory in operative communication with the processor, the memory for storing a plurality of processing instructions for directing the processor to:
    - receive a booking from a seller and an acceptance parameter corresponding to the booking;
    - collect demand data for a predetermined period of time, the demand data including at least one purchase offer corresponding to the booking which is not accepted by a seller based on the acceptance parameter; and
    - generate a report for the seller, the report including at least one new acceptance parameter and an estimated number of bookings corresponding to the new acceptance parameter based on the demand data.

71. A method for optimizing bookings received through a buyer-driven commerce system, comprising:
- submitting a booking and an acceptance parameter to a buyer-driven commerce system;
- receiving a report including an estimated change in an acceptance of a plurality of purchase offers based on the collected demand data and a proposed acceptance parameter; and
- changing the acceptance parameter after said receiving the report.

72. The method of claim 71, wherein said changing further comprises:
- changing the acceptance parameter to the proposed acceptance parameter.

73. The method of claim 71, wherein said report further includes a number of actual acceptances which relates to the booking.

74. The method of claim 71, wherein the acceptance parameter comprises at least one of: a minimum price for the booking and a minimum margin amount for the booking.

* * * * *